(12) United States Patent
Pandya

(10) Patent No.: US 8,051,022 B2
(45) Date of Patent: Nov. 1, 2011

(54) EMBEDDED PROGRAMMABLE INTELLIGENT SEARCH MEMORY (PRISM) THAT SIMULTANEOUSLY PERFORMS REGULAR EXPRESSION BASED SEARCH AND SIGNATURE PATTERN BASED SEARCH

(76) Inventor: Ashish A. Pandya, El Dorado Hills, CA (US)

( * ) Notice: Subject to any disclaimer, the term of this patent is extended or adjusted under 35 U.S.C. 154(b) by 644 days.

(21) Appl. No.: 11/952,028

(22) Filed: Dec. 6, 2007

(65) Prior Publication Data

US 2008/0140661 A1 Jun. 12, 2008

Related U.S. Application Data

(60) Provisional application No. 60/965,267, filed on Aug. 17, 2007, provisional application No. 60/965,170, filed on Aug. 17, 2007, provisional application No. 60/963,059, filed on Aug. 1, 2007, provisional application No. 60/961,596, filed on Jul. 23, 2007, provisional application No. 60/933,313, filed on Jun. 6, 2007, provisional application No. 60/933,332, filed on Jun. 6, 2007, provisional application No. 60/930,607, filed on May 17, 2007, provisional application No. 60/928,883, filed on May 10, 2007, provisional application No. 60/873,632, filed on Dec. 8, 2006, provisional application No. 60/873,889, filed on Dec. 8, 2006.

(51) Int. Cl.
*G06F 17/00* (2006.01)
(52) U.S. Cl. .......................................................... 706/45
(58) Field of Classification Search .............. 706/45–47, 706/62; 711/100, 103, 108; 707/706, 758, 707/736, 769
See application file for complete search history.

(56) References Cited

U.S. PATENT DOCUMENTS

| | | | |
|---|---|---|---|
| 6,778,557 B1 | 8/2004 | Yuki et al. | |
| 6,892,237 B1 | 5/2005 | Gai et al. | |
| 7,353,332 B2 | 4/2008 | Miller et al. | |
| 7,406,470 B2 | 7/2008 | Mathur et al. | |
| 7,464,254 B2 | 12/2008 | Sharangpani et al. | |
| 7,472,285 B2 | 12/2008 | Graunke et al. | |
| 7,644,080 B2 | 1/2010 | Mammen et al. | |
| 7,660,140 B1 | 2/2010 | Joshi et al. | |
| 7,685,254 B2 | 3/2010 | Pandya | |
| 7,827,190 B2 * | 11/2010 | Pandya | 707/758 |
| 7,831,606 B2 * | 11/2010 | Pandya | 707/758 |
| 7,831,607 B2 * | 11/2010 | Pandya | 707/758 |

(Continued)

OTHER PUBLICATIONS

Ville Laurikari, "NFAs with Tagged Transitions, Their Conversion to Deterministic Automata and Application to Regular Expressions", Seventh International Symposium on String Processing Infomratino Retrieval (SPIRE'00), Sep. 27-29, 2000.

(Continued)

*Primary Examiner* — David R Vincent
(74) *Attorney, Agent, or Firm* — DLA Piper LLP US

(57) ABSTRACT

Memory architecture provides capabilities for high performance content search. The architecture creates an innovative memory that can be programmed with content search rules which are used by the memory to evaluate presented content for matching with the programmed rules. When the content being searched matches any of the rules programmed in the Programmable Intelligent Search Memory (PRISM) action(s) associated with the matched rule(s) are taken. The PRISM content search memory is embedded in a single core or multi-core processors or in multi-processor systems to perform content search. PRISM accelerates content search by offloading the content search tasks from the processors. Content search rules comprise of regular expressions which are converted to finite state automata and then programmed in PRISM for evaluating content with the search rules.

6 Claims, 30 Drawing Sheets

PRISM Block Diagram

U.S. PATENT DOCUMENTS

| | | | |
|---|---|---|---|
| 7,890,692 B2 | 2/2011 | Pandya | |
| 7,899,976 B2* | 3/2011 | Pandya | 711/103 |
| 7,899,977 B2* | 3/2011 | Pandya | 711/103 |
| 7,899,978 B2* | 3/2011 | Pandya | 711/103 |
| 7,912,808 B2* | 3/2011 | Pandya | 706/62 |
| 2002/0161664 A1 | 10/2002 | Shaya et al. | |
| 2004/0059443 A1 | 3/2004 | Sharangpani | |
| 2004/0083387 A1 | 4/2004 | Dapp et al. | |
| 2004/0215593 A1* | 10/2004 | Sharangpani et al. | 707/1 |
| 2005/0012521 A1 | 1/2005 | Sharangpani et al. | |
| 2005/0052934 A1 | 3/2005 | Tran | |
| 2005/0108518 A1 | 5/2005 | Pandya | |
| 2005/0216770 A1 | 9/2005 | Rowett et al. | |
| 2006/0085533 A1 | 4/2006 | Hussain et al. | |
| 2006/0136570 A1 | 6/2006 | Pandya | |
| 2006/0253816 A1 | 11/2006 | Gould et al. | |
| 2007/0038798 A1 | 2/2007 | Bouchard et al. | |
| 2007/0061884 A1 | 3/2007 | Dapp et al. | |
| 2007/0255894 A1* | 11/2007 | Hessel et al. | 711/105 |
| 2008/0008202 A1 | 1/2008 | Terrell et al. | |
| 2008/0046423 A1 | 2/2008 | Khan Alicherry et al. | |
| 2008/0071780 A1 | 3/2008 | Ichiriu et al. | |
| 2008/0133517 A1 | 6/2008 | Kapoor et al. | |
| 2008/0140600 A1 | 6/2008 | Pandya | |
| 2008/0140911 A1 | 6/2008 | Pandya | |
| 2008/0140912 A1 | 6/2008 | Pandya | |
| 2008/0140991 A1 | 6/2008 | Pandya | |
| 2008/0255839 A1* | 10/2008 | Larri et al. | 704/238 |
| 2009/0100055 A1 | 4/2009 | Wang | |
| 2010/0198850 A1 | 8/2010 | Cytron et al. | |

OTHER PUBLICATIONS

Gerard Berry et al., "From Regular Expressions to Deterministic Automata", Theoretical Computer Science, vol. 48, pp. 117-126 (1986).

Bruce W. Watson, "A Taxonomy of Finite Automata Contruction Algorithms", Computing Science, May 18, 1994.

Sailesh Kumar et al., "Algorithms to Accelerate Multiple Regular Expression Matching for Deep Packet Inspection", SIGCOMM'06, Sep. 11-15, 2006, Pisa, Italy, pp. 339-350.

Reetinder Sidhu et al., "Fast Regular Expression Matching Using FPGAs", Proceedings of the 9th Annual IEEE Symposium of Field-Programmable Custom Computing Machines, pp. 227-238 (2001).

Alfred V. Aho et al., "Efficient String Matching: An Aid to Bibliographic Search", Communication of the ACM, vol. 18, No. 6, pp. 333-340, Jun. 1975.

James Moscola et al., "Implementation of a Content-Scanning Module for an Internet Firewall", Proceedings of the 11th Annual IEEE Symposium on Field-Programmable Custom Computing Machines, pp. 31, 2003 (9 pages).

Sarang Dhamapurikar et al., "Deep Packet Inspection Using Parallell Bloom Filters", Hot Interconnects 11, IEEE Computer Society, pp. 52-61, Jan. 2004.

Ken Thompson, "Regular Expression Search Algorithm", Communication of the ACM, vol. 11, No. 6, pp. 419-422, Jun. 1968.

S.C. Kleene, "Representation of Events in Nerve Nets and Finite Automata", In Automata Studies, C.E. Shannon and J. McCarthy (eds.), Princeton, University Press, 1956, pp. 3-40.

M. O. Rabin et al., "Finite Automata and Their Decision Problems", IBM Journal, pp. 114-125, Apr. 1959.

John E. Hopcroft et al., "Introduction to Automata Theory, Language, and Computation", Addison-Wesley Publishing Company, 1979.

Alfred V. Aho et al., "Compilers: Principles, Techniques, and Tools", Pearson Education Inc., 2007.

File History of U.S. Appl. No. 11/952,043.
File History of U.S. Appl. No. 11/952,103.
File History of U.S. Appl. No. 11/952,104.
File History of U.S. Appl. No. 11/952,108.
File History of U.S. Appl. No. 11/952,110.
File History of U.S. Appl. No. 11/952,111.
File History of U.S. Appl. No. 11/952,112.
File History of U.S. Appl. No. 11/952,114.
File History of U.S. Appl. No. 11/952,117.

PCT International Search Report and Written Opinion of the International Searching Authority mailed on Apr. 30, 2008 regarding PCT/US2007/86785 filed on Dec. 7, 2007, (13 pgs.).

File History of U.S. Appl. No. 11/952,103.
File History of U.S. Appl. No. 11/952,104.
File History of U.S. Appl. No. 11/952,112.
File History of U.S. Appl. No. 11/952,108.
File History of U.S. Appl. No. 11/952,110.
File History of U.S. Appl. No. 11/952,114.
File History of U.S. Appl. No. 11/952,117.

Office Action issued in U.S. Appl. No. 11/952,111, mailed Sep. 20, 2010.

Notice of Allowance issued in U.S. Appl. No. 11/952,110, mailed Oct. 14, 2010.

Notice of Allowance issued in U.S. Appl. No. 11/952,108, mailed Sep. 24, 2010.

Notice of Allowance issued in U.S. Appl. No. 11/952,117, mailed Oct. 28, 2010.

Notice of Allowance issued in U.S. Appl. No. 11/952,114, mailed Oct. 22, 2010.

Notice of Allowance issued in U.S. Appl. No. 11/952,043, mailed Nov. 22, 2010.

File History of U.S. Appl. No. 12/899,336.
File History of U.S. Appl. No. 12/902,485.
File History of U.S. Appl. No. 12/902,500.
File History of U.S. Appl. No. 12/976,881.
File History of U.S. Appl. No. 13/006,265.
File History of U.S. Appl. No. 13/011,681.
File History of U.S. Appl. No. 13/011,692.
File History of U.S. Appl. No. 13/029,782.

* cited by examiner

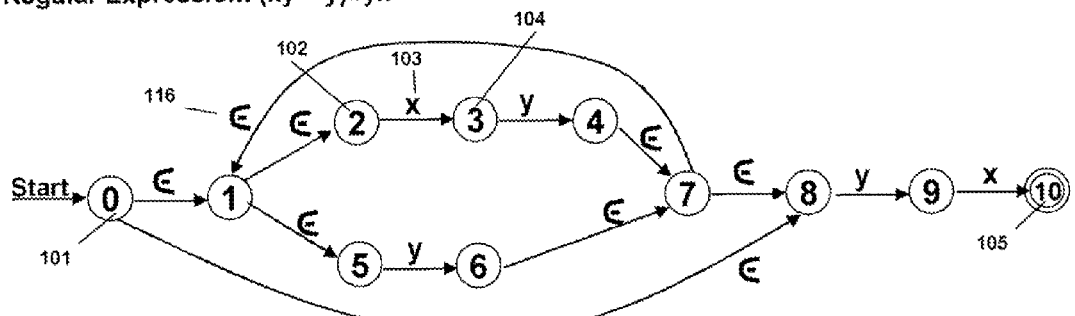
Fig. 1a Thompson's NFA (Prior Art)
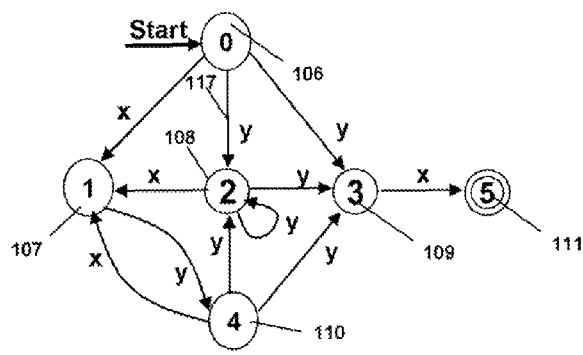
Fig. 1b Berry-Sethi NFA (Prior Art)
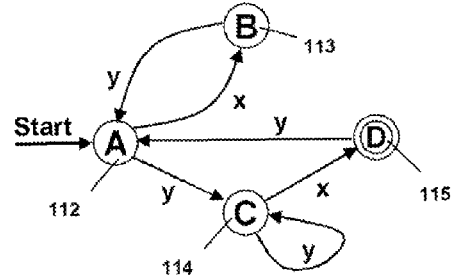
Fig. 1c DFA (Prior Art)

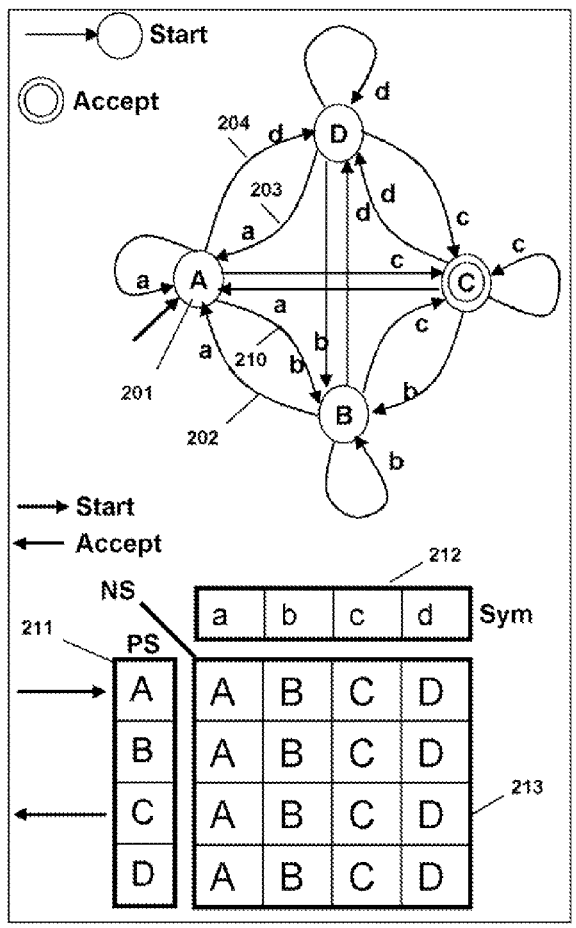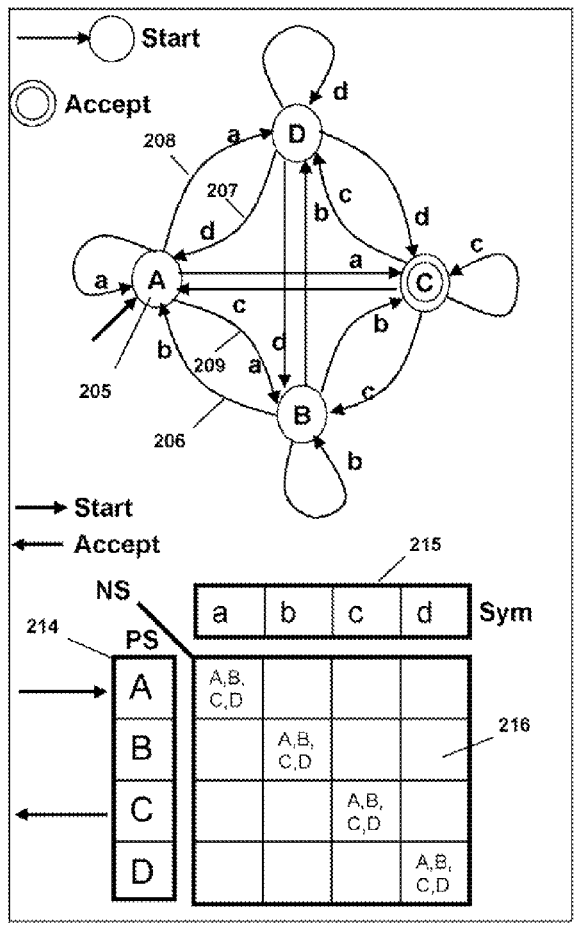
Fig. 2a A Left-biased NFA & State Transition Table (Prior Art)
Fig. 2b A Right-biased NFA & State Transition Table (Prior Art)

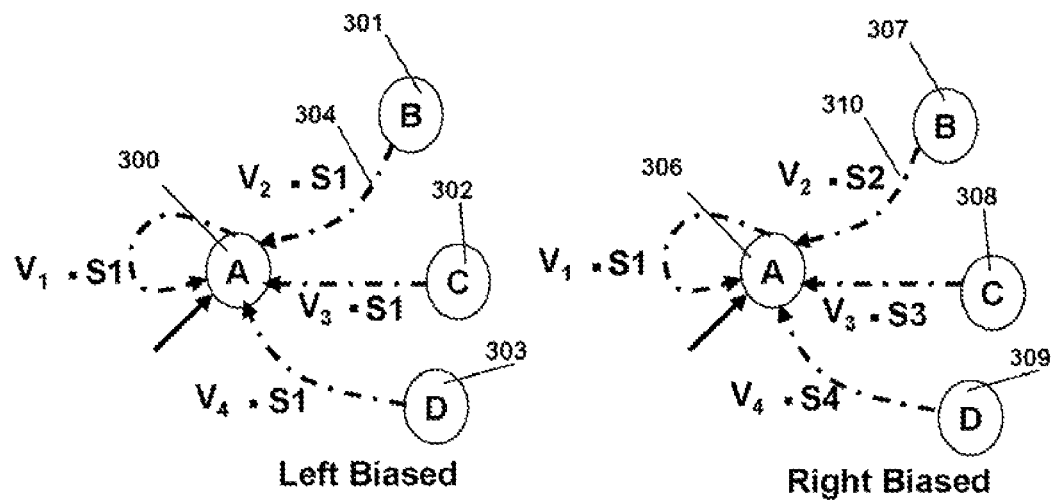
Fig. 3a State Transition Controls
Fig. 3b Configurable Next State Table per State
State Prop: LB, RB, SDV, Start, Accept, Action

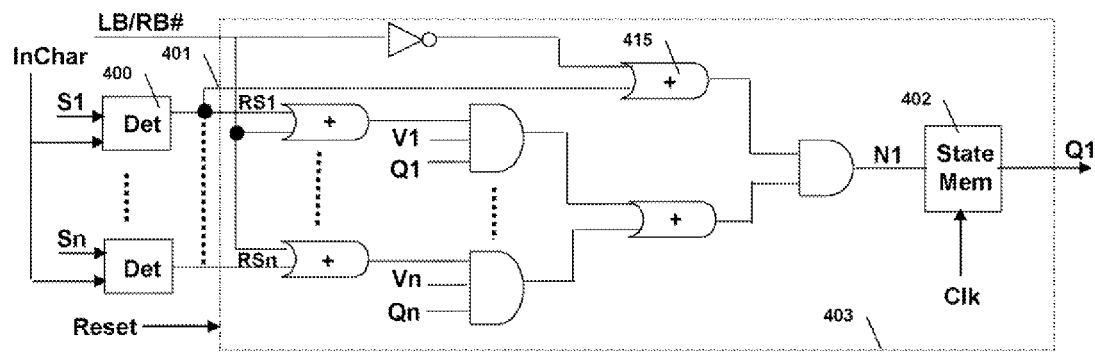
Fig. 4a State transition logic (STL) for a state
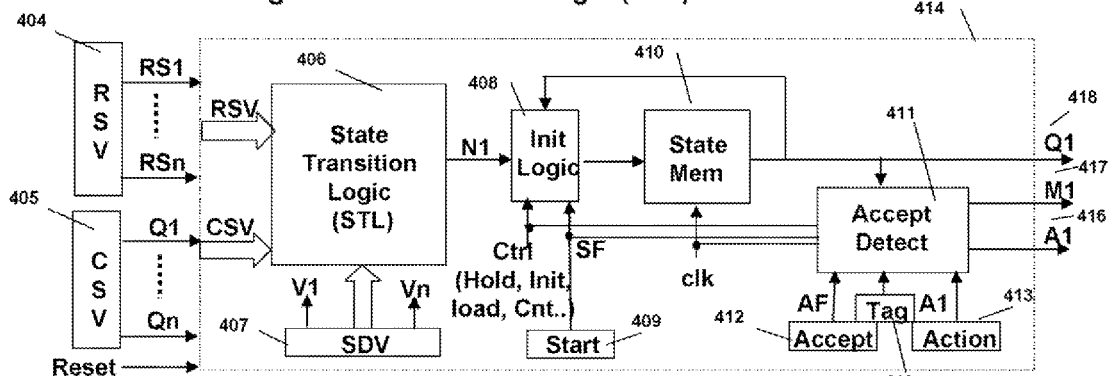
Fig. 4b A State Logic Block

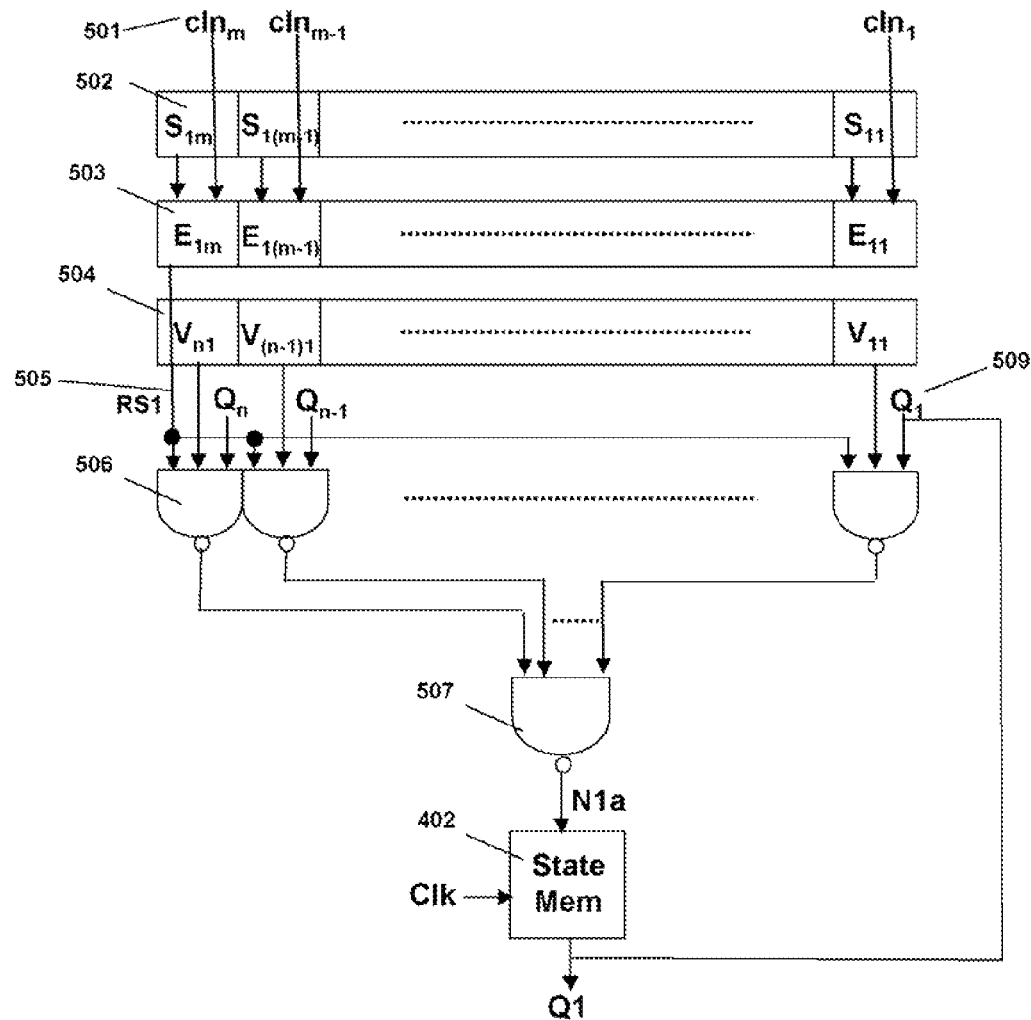
Fig. 5a State transition logic (STL) for a state in Left-biased FSA

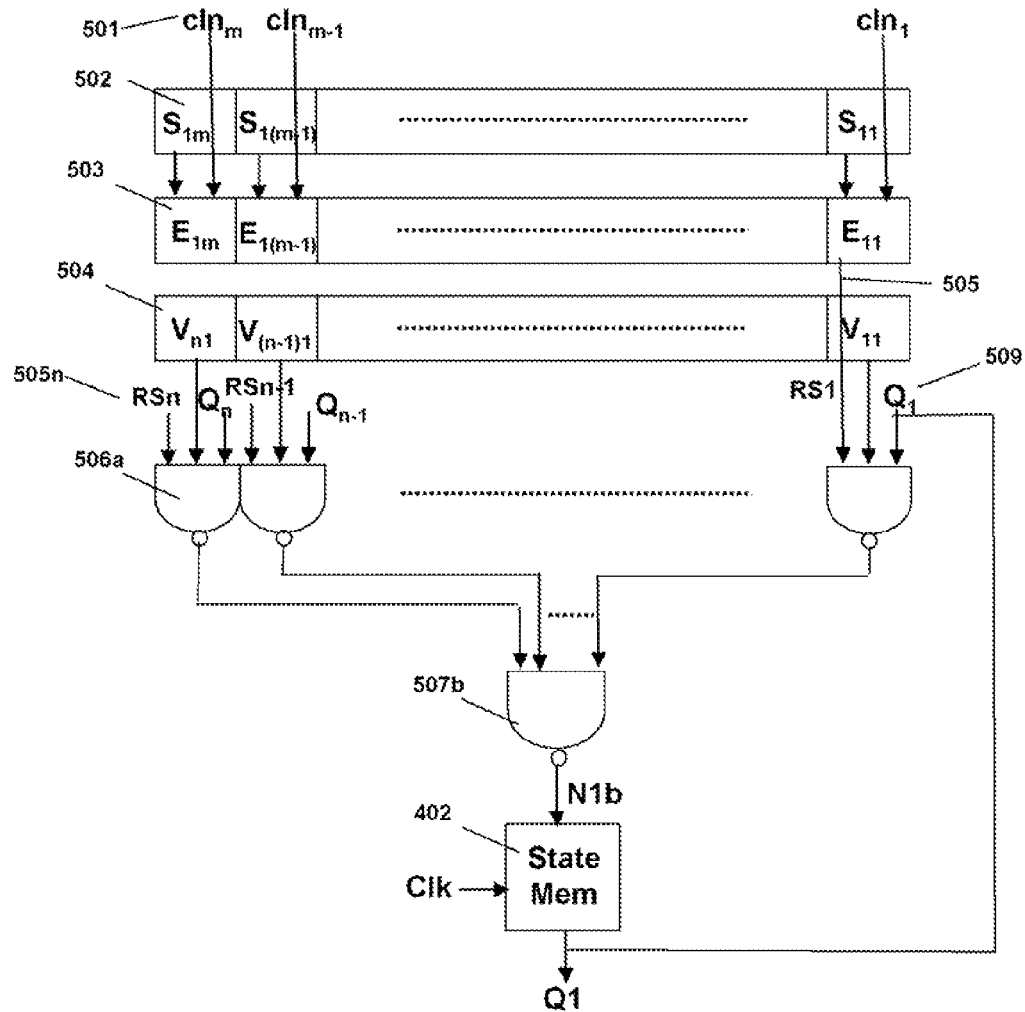
Fig. 5b State transition logic (STL) for a state in Right-biased FSA

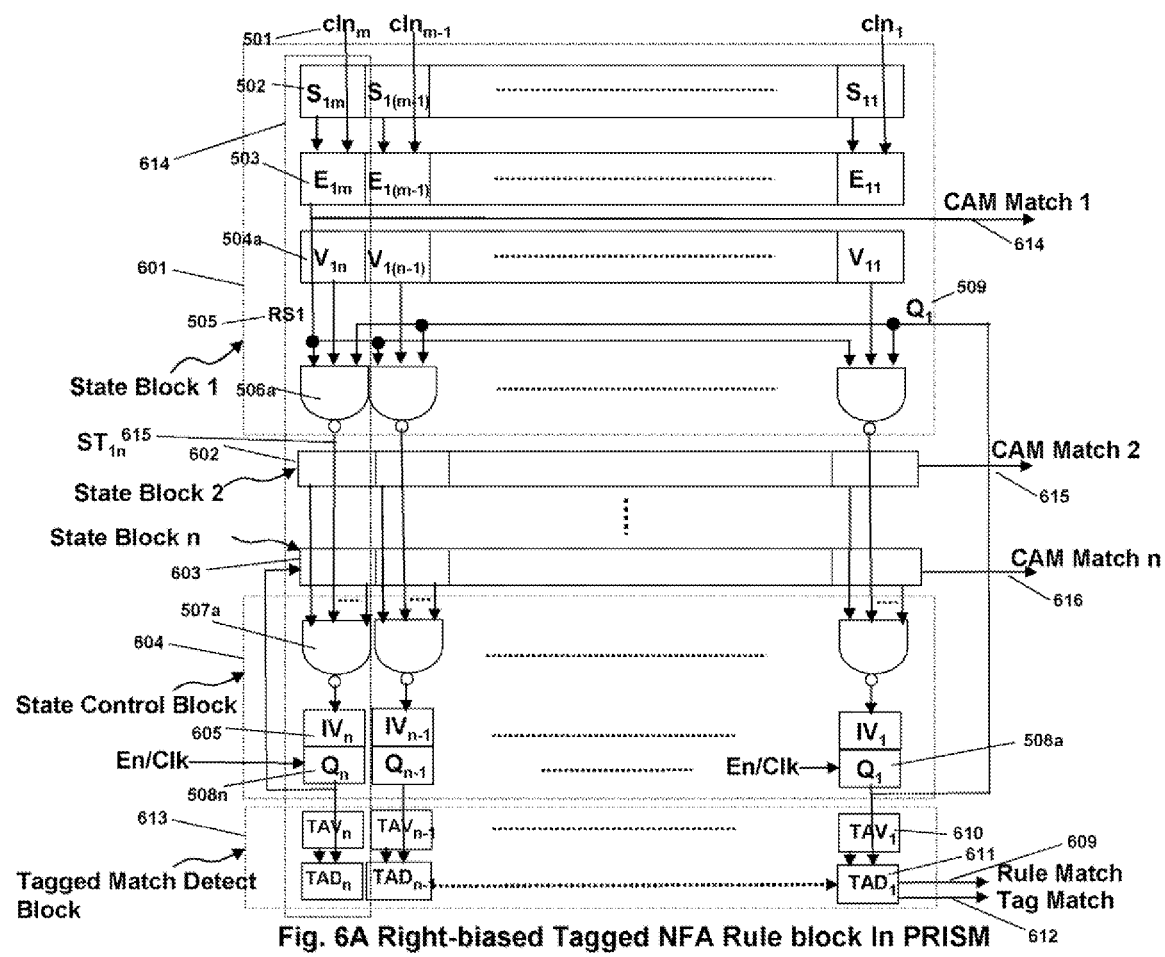
Fig. 6A Right-biased Tagged NFA Rule block in PRISM

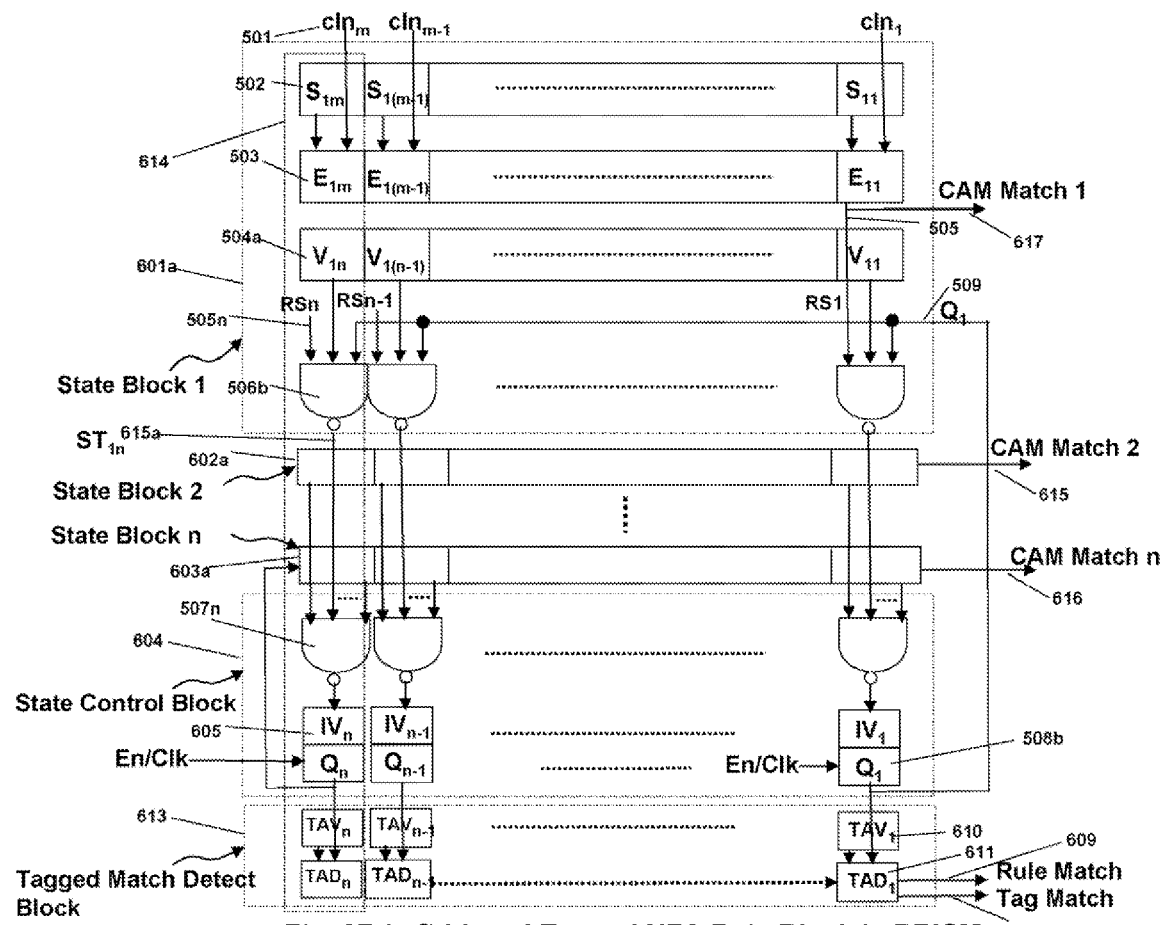
Fig. 6B Left-biased Tagged NFA Rule Block in PRISM

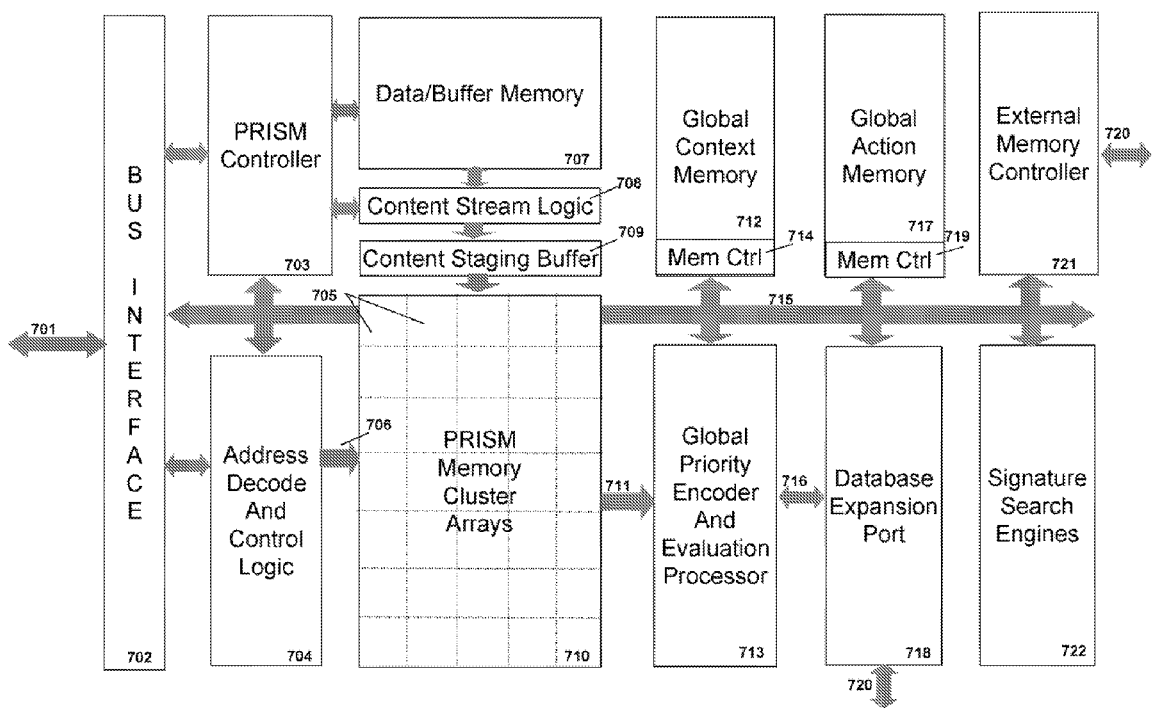
Fig. 7 PRISM Block Diagram

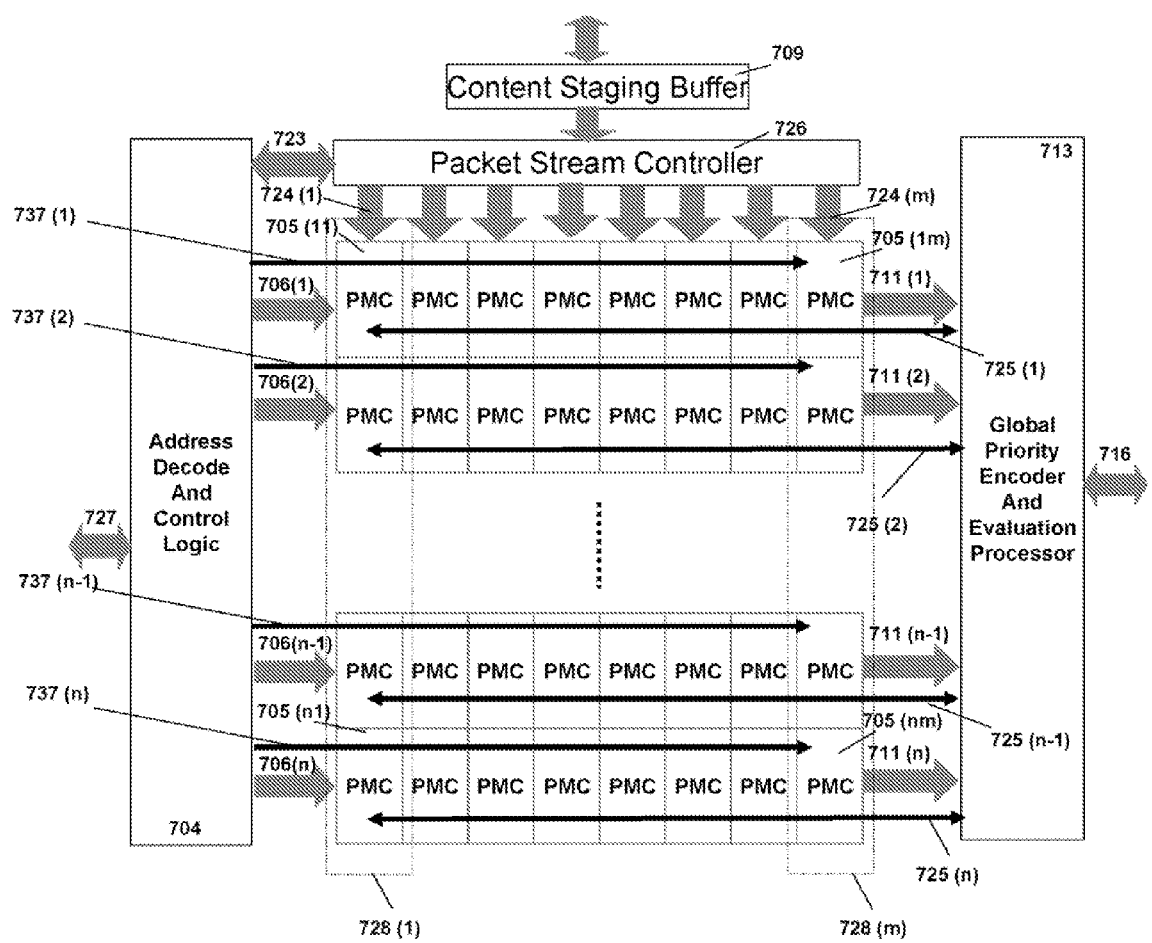
Fig. 7b PRISM Memory Cluster (PMC) Array

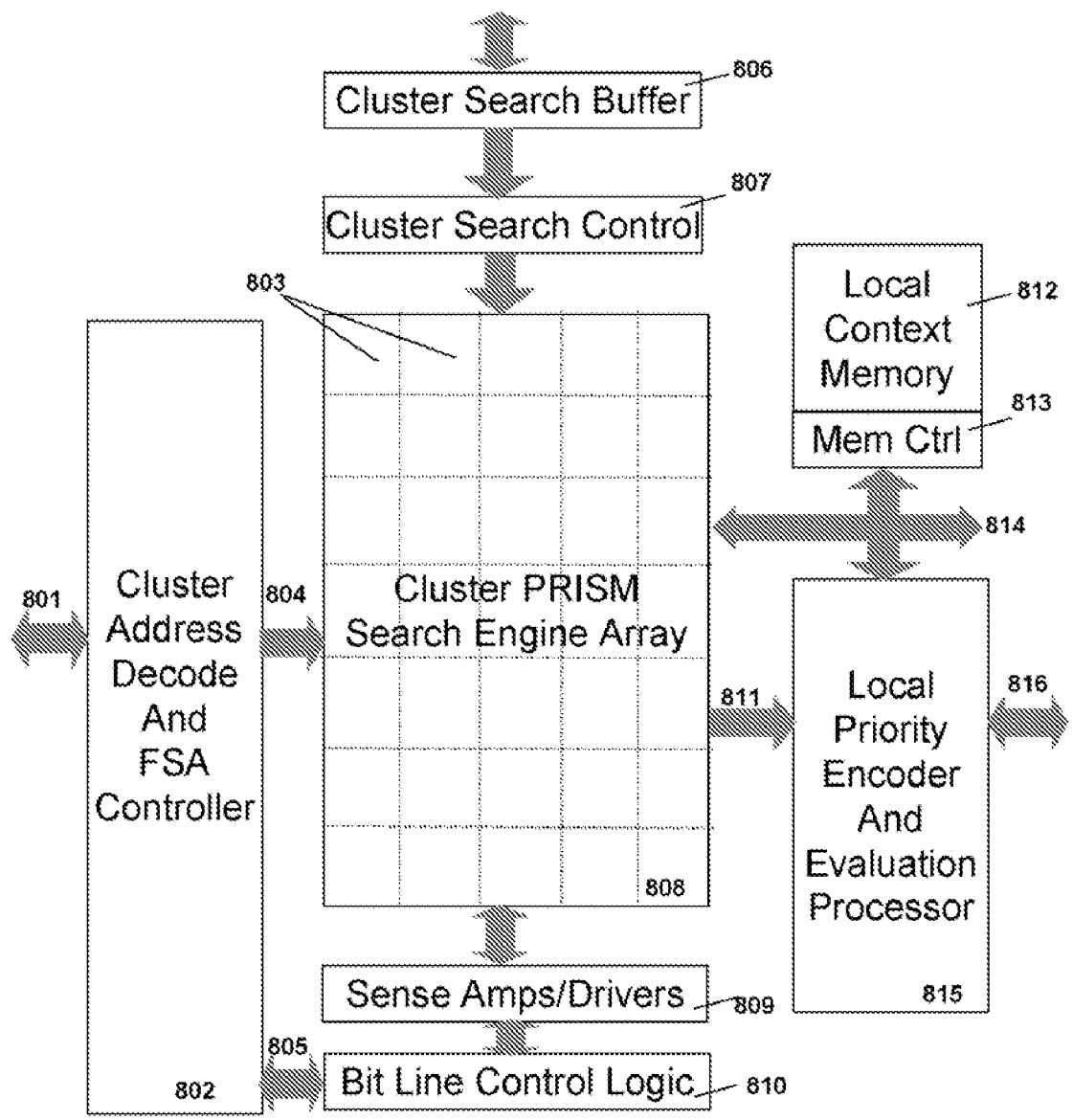
Fig. 8a PRISM Memory Cluster Block Diagram

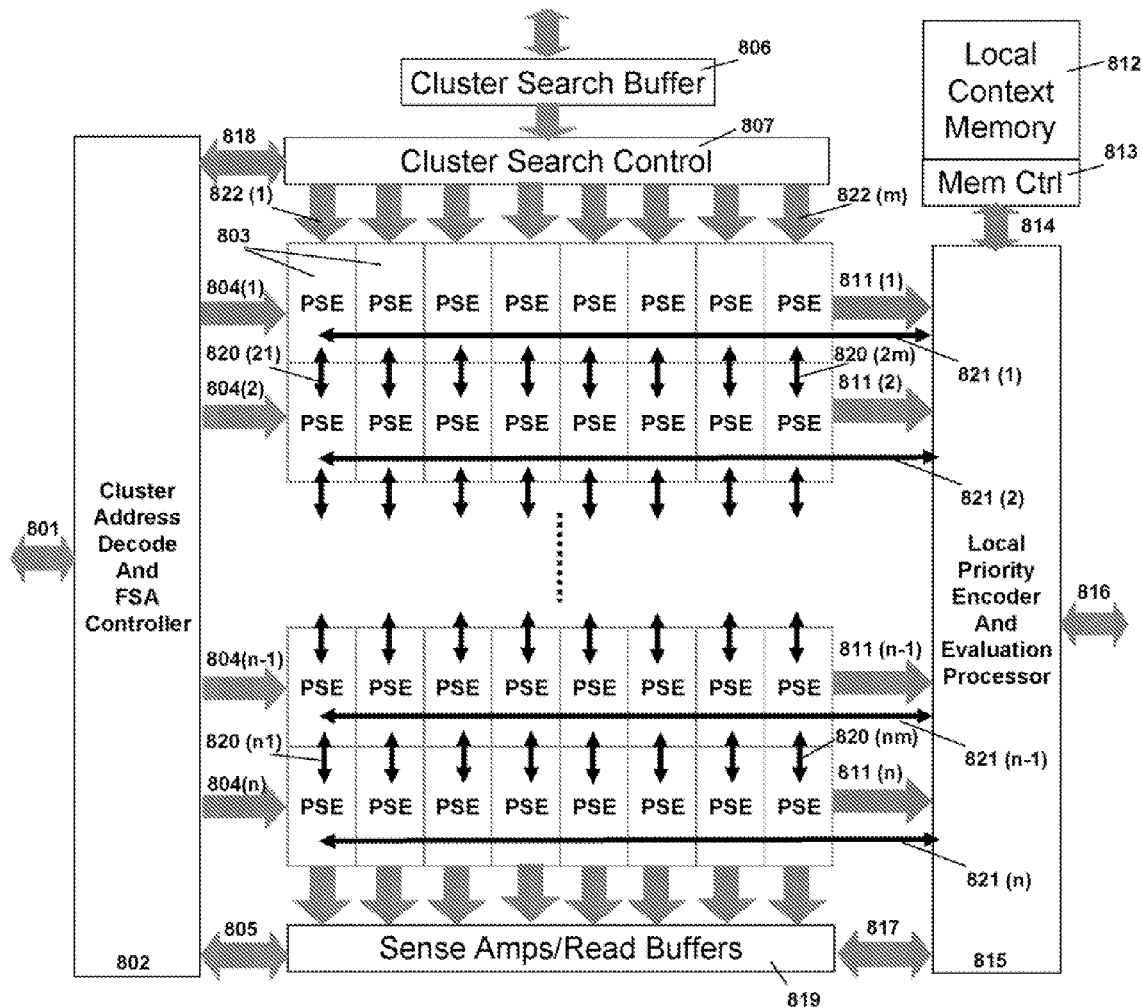
Fig. 8b PRISM Memory Cluster Detailed Block Diagram

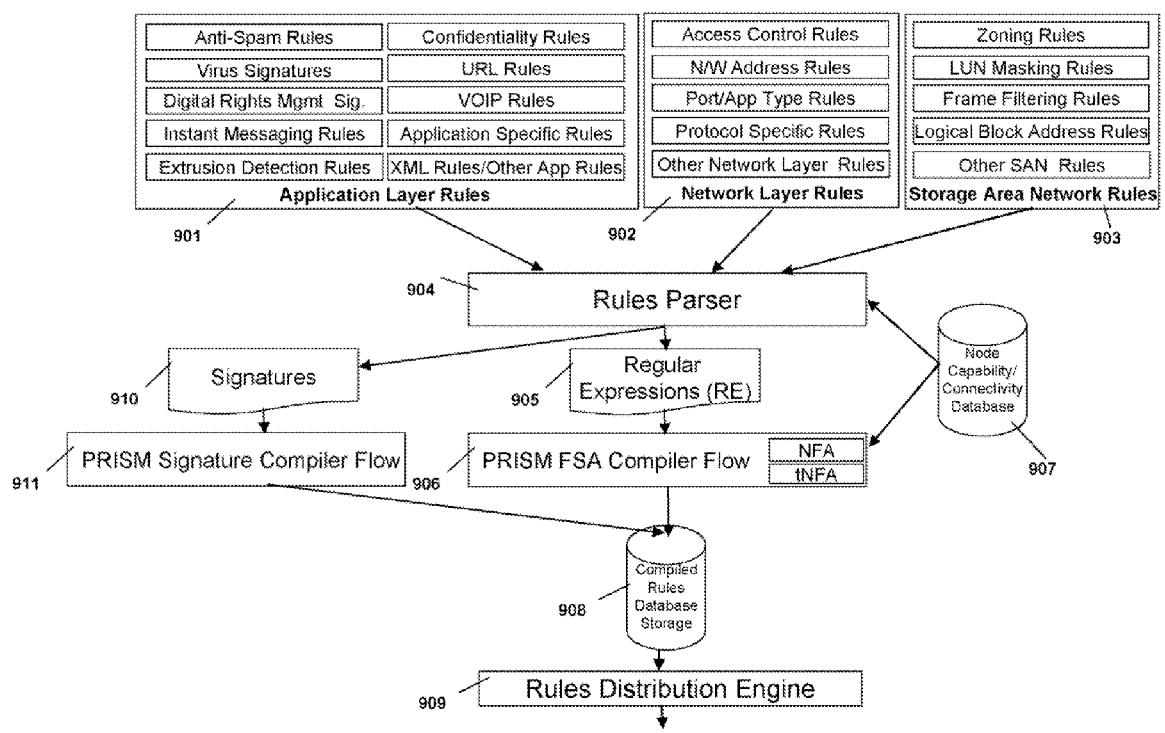
Fig. 9 PRISM Search compiler flow (full + incremental rule distribution)

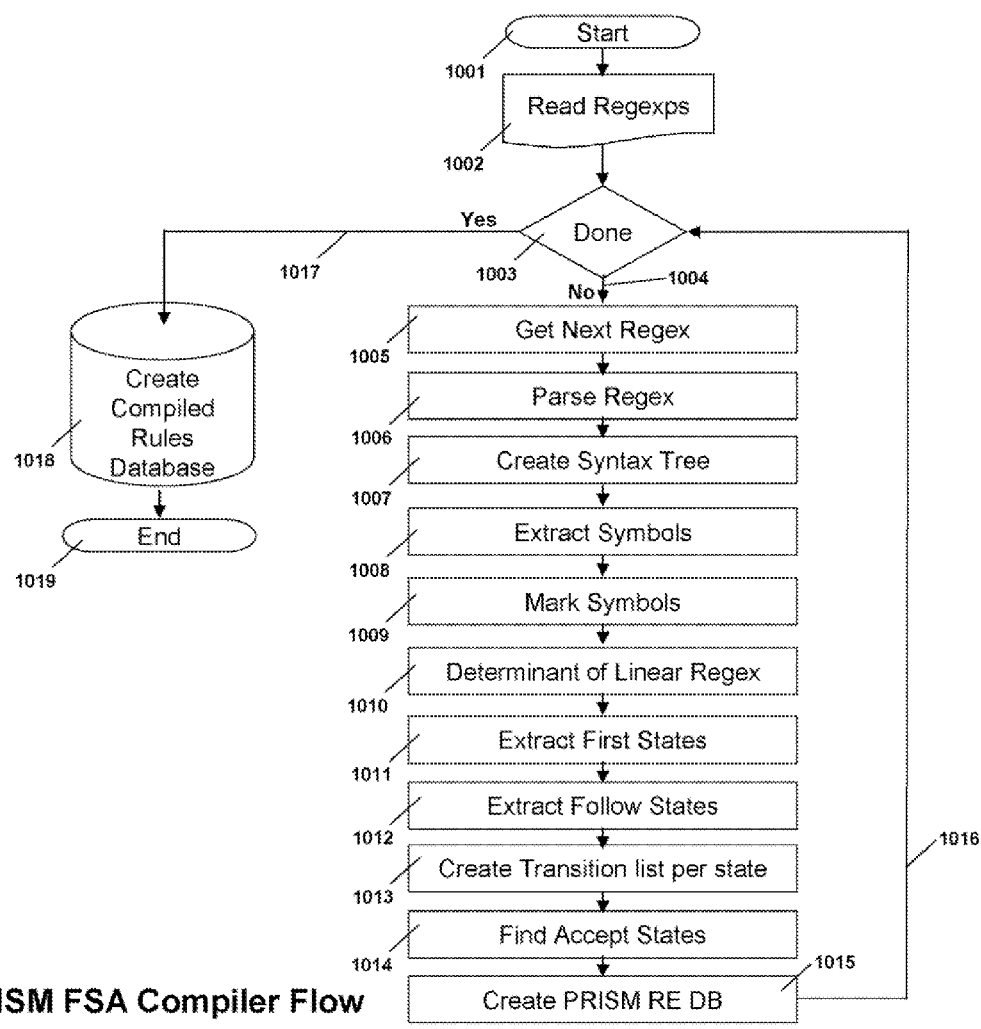
Fig. 10 PRISM FSA Compiler Flow

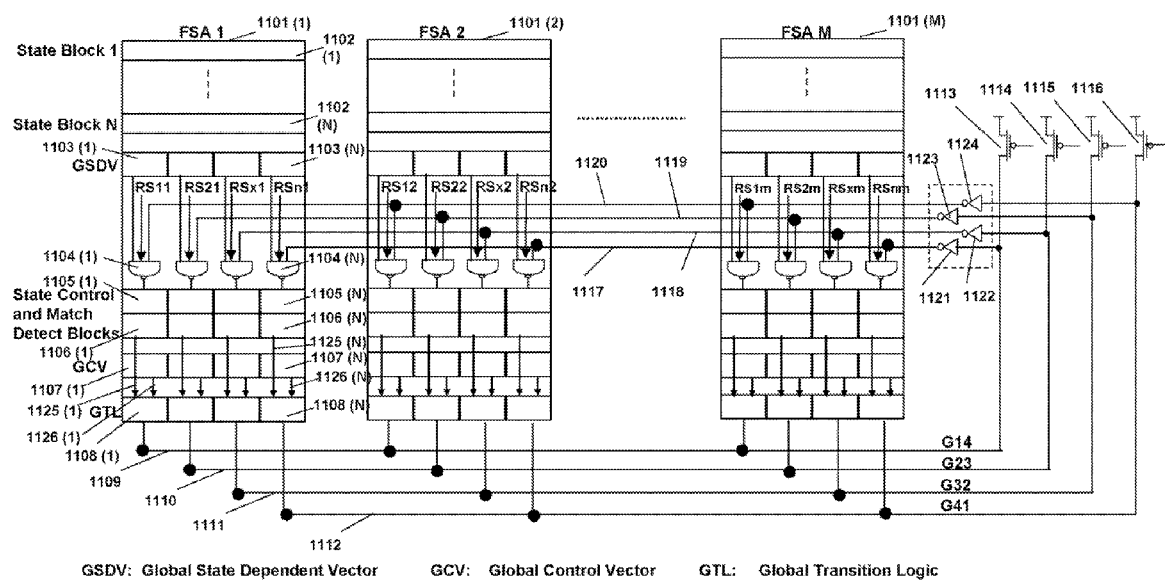
Fig. 11 PRISM Row-Wise FSA Extension

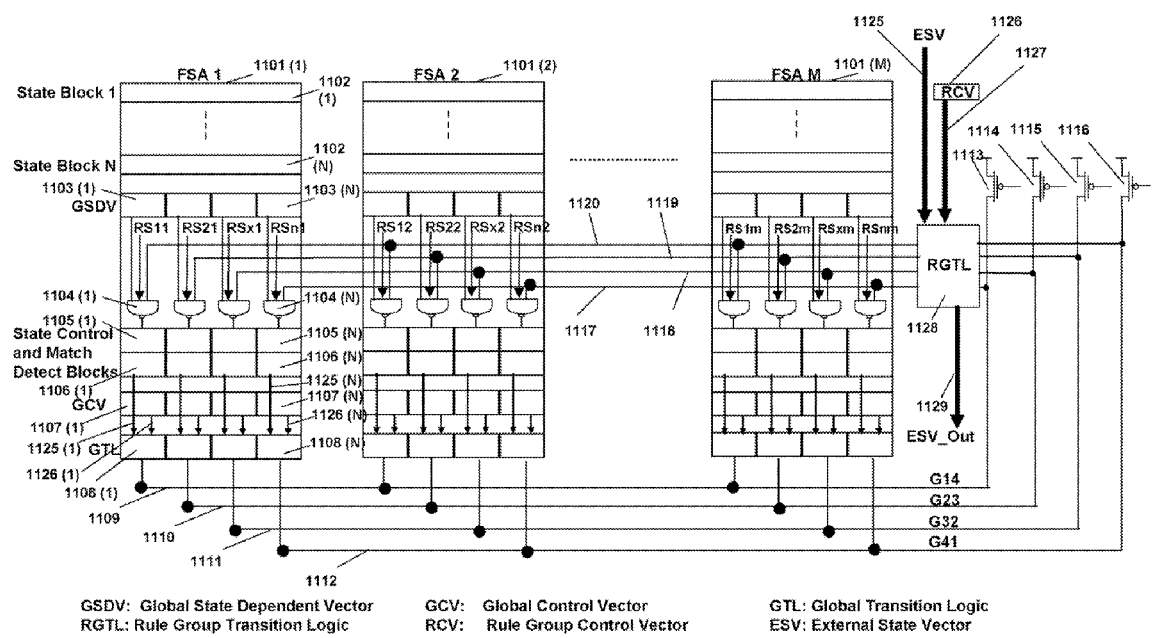
Fig. 11A PRISM Rule Group FSA Extension

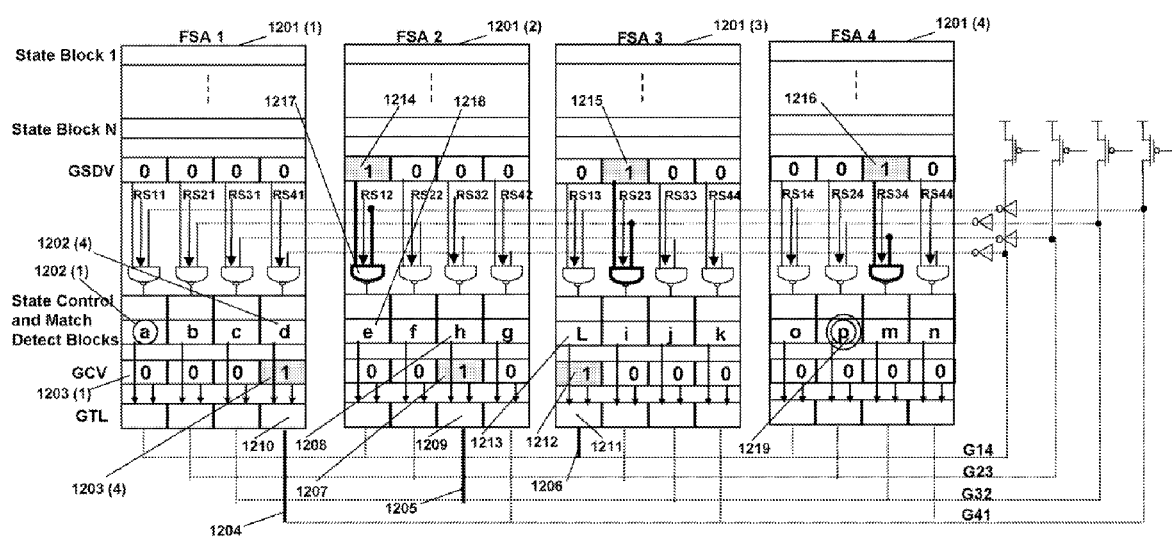
Fig. 12 PRISM Row-Wise FSA Extension Example #1

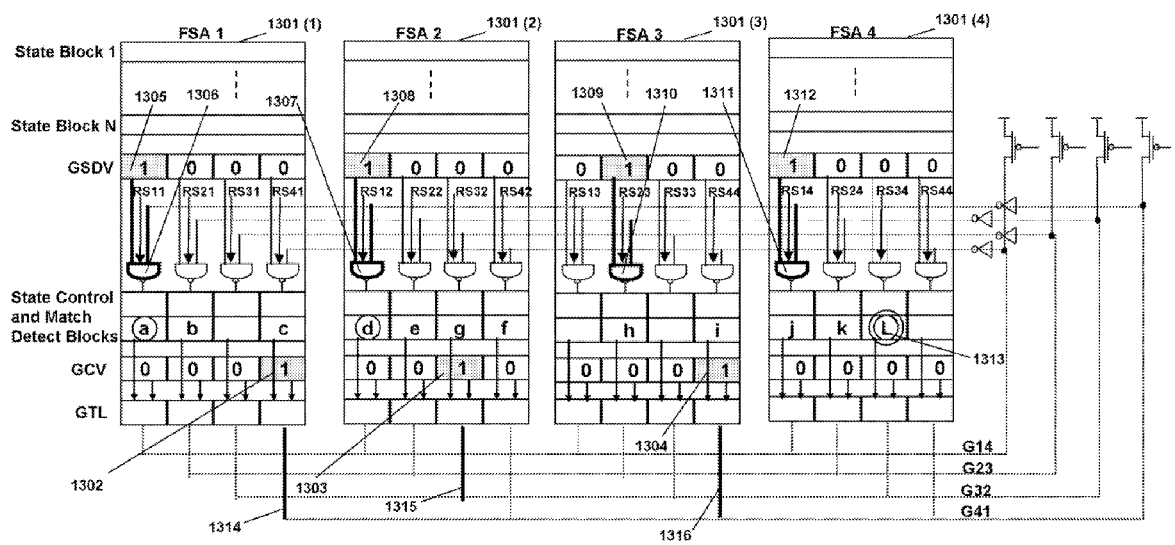
Fig. 13 PRISM Row-wise FSA Extension Example #2

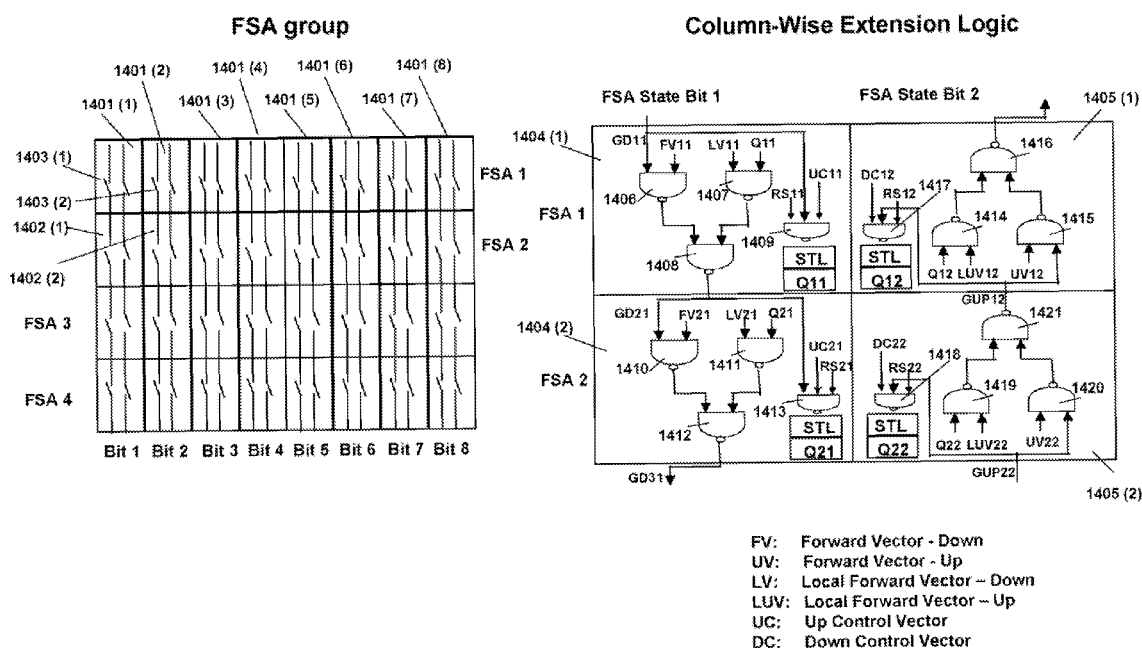
Fig. 14 PRISM Column-Wise FSA Extension

RE1: (abc | defghi)+ jkL
RE2: abcdefghijkLmnop
RE3: (xyz | defghi)+ jkL
RE4: xyzdefghijkLmnop
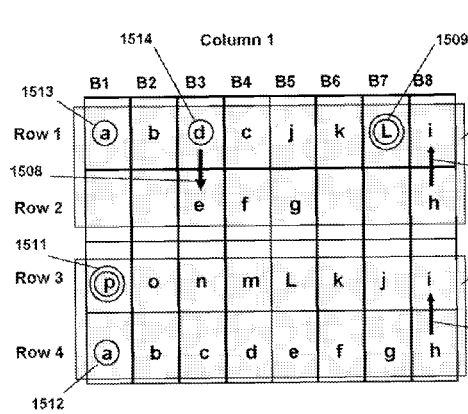
Column-Wise Extension
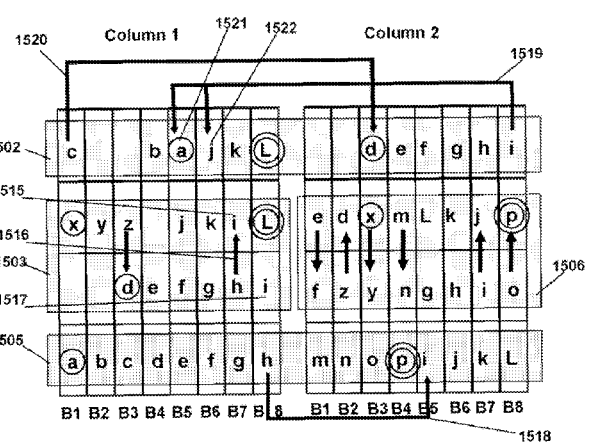
Row-Wise and Column-Wise Extension
Fig. 15 PRISM FSA Extension Example #1

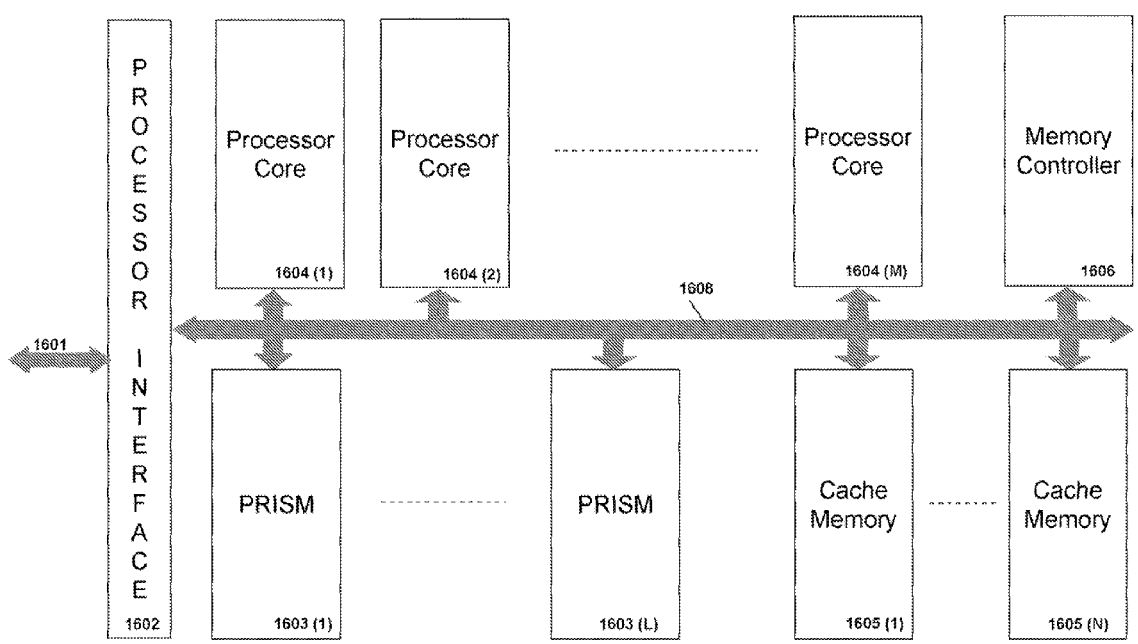
Fig. 16A An integrated circuit processor with embedded PRISM

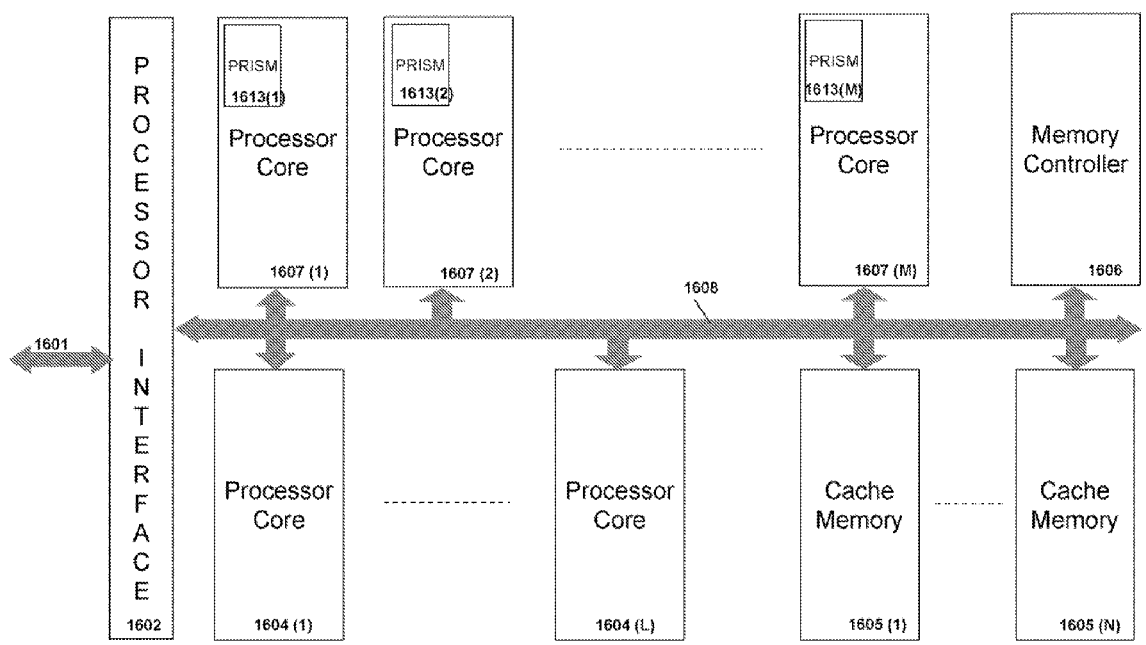
Fig. 16B An integrated circuit processor with processor core using PRISM

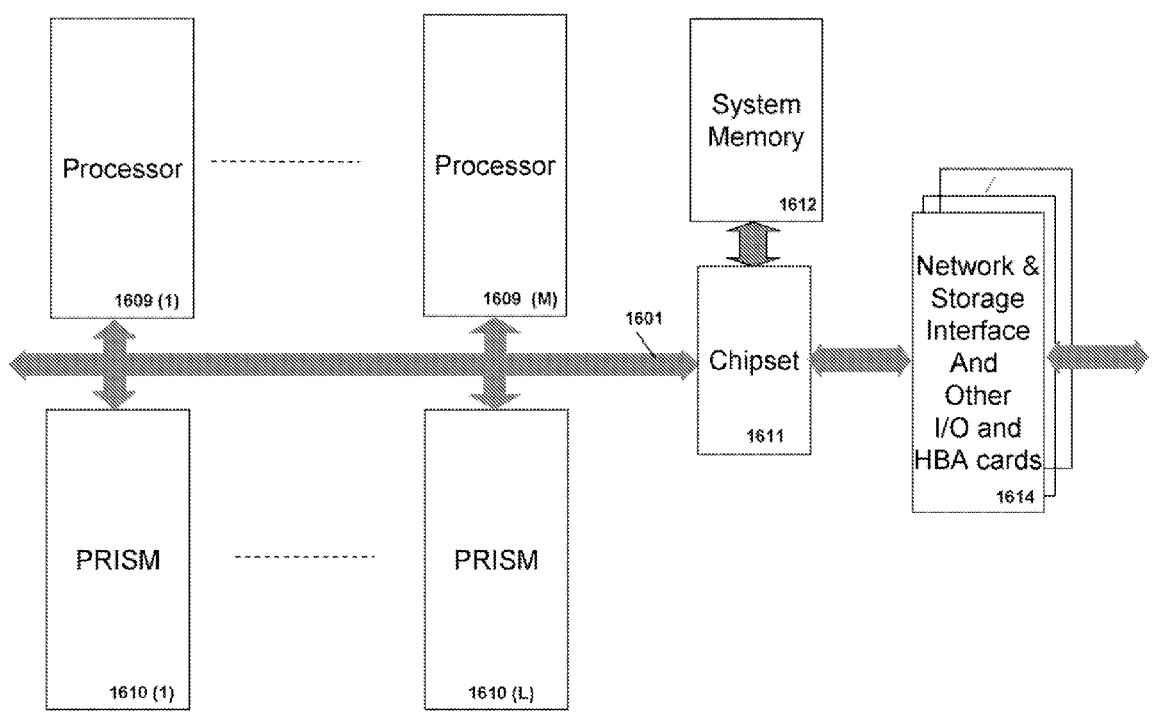
Fig. 16C A Multi-processor system with PRISM

Regular Expression: ba[3,5]c
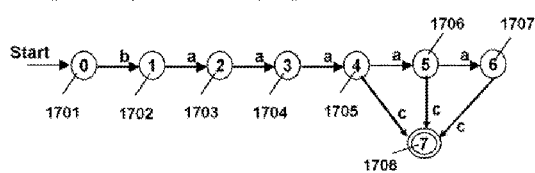
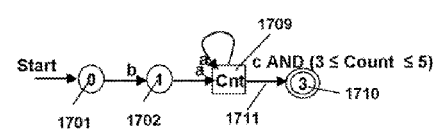
17A PRISM FSA without Interval Symbol
Fig. 17B PRISM FSA with Interval Symbol
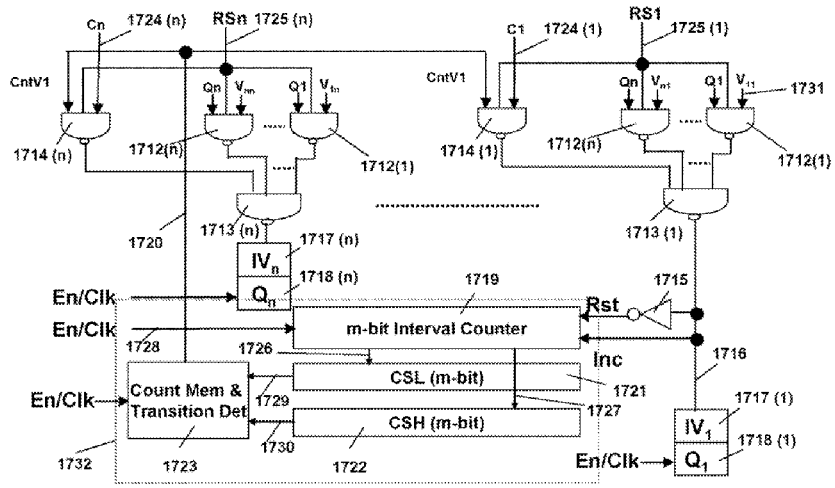
Fig. 17C PRISM FSA Interval Symbol State Counter Block

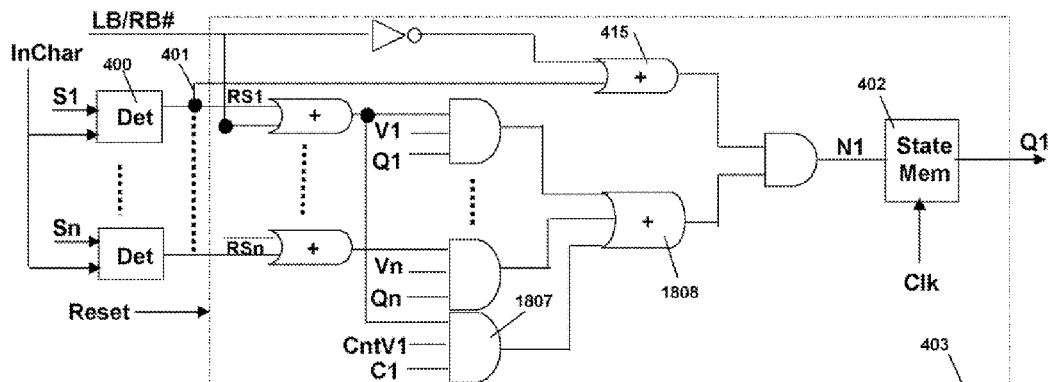
FIG 18A. State transition logic (STL) for a state in PRISM with interval symbol
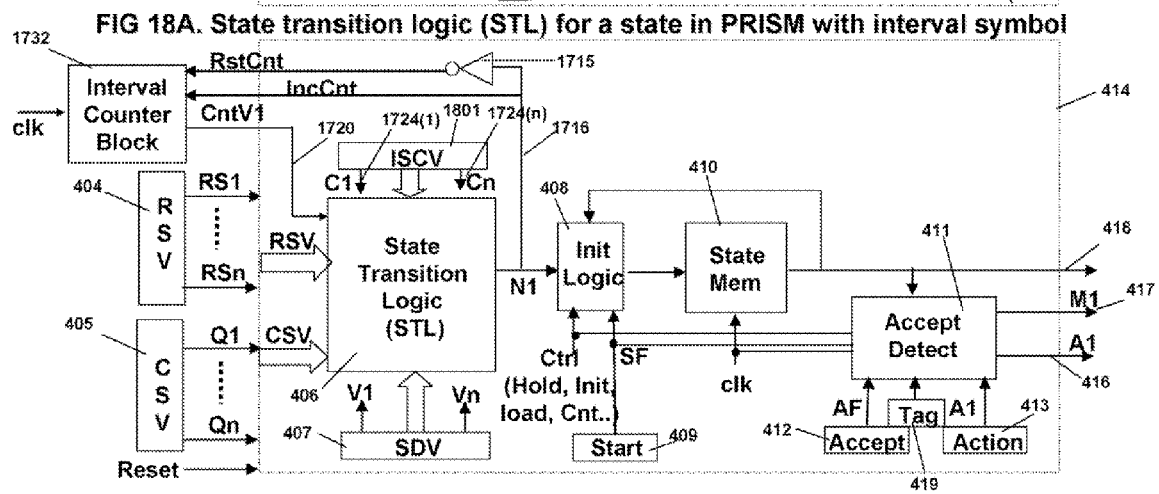
FIG 18B. A State Logic Block for a state in PRISM with interval symbol

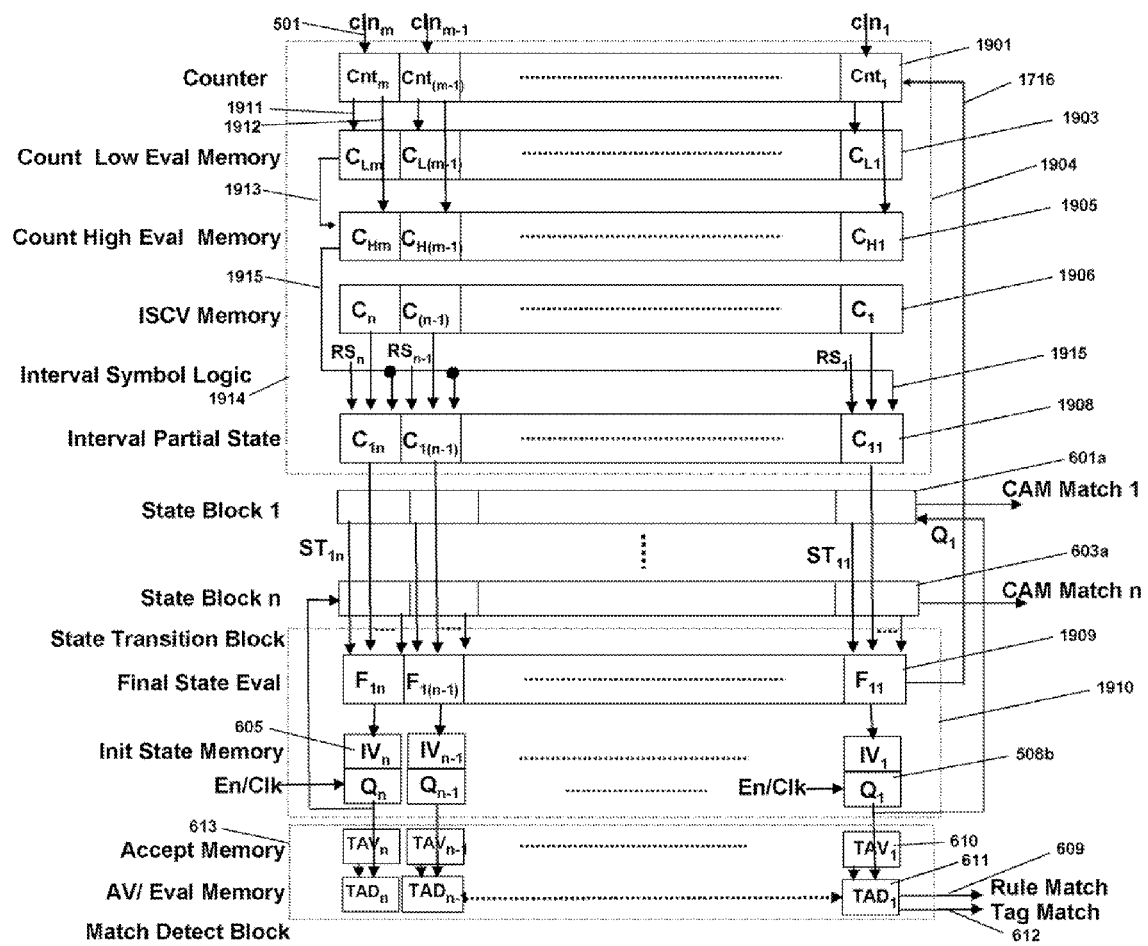
Fig. 19 PRISM Search Engine with Interval Symbol

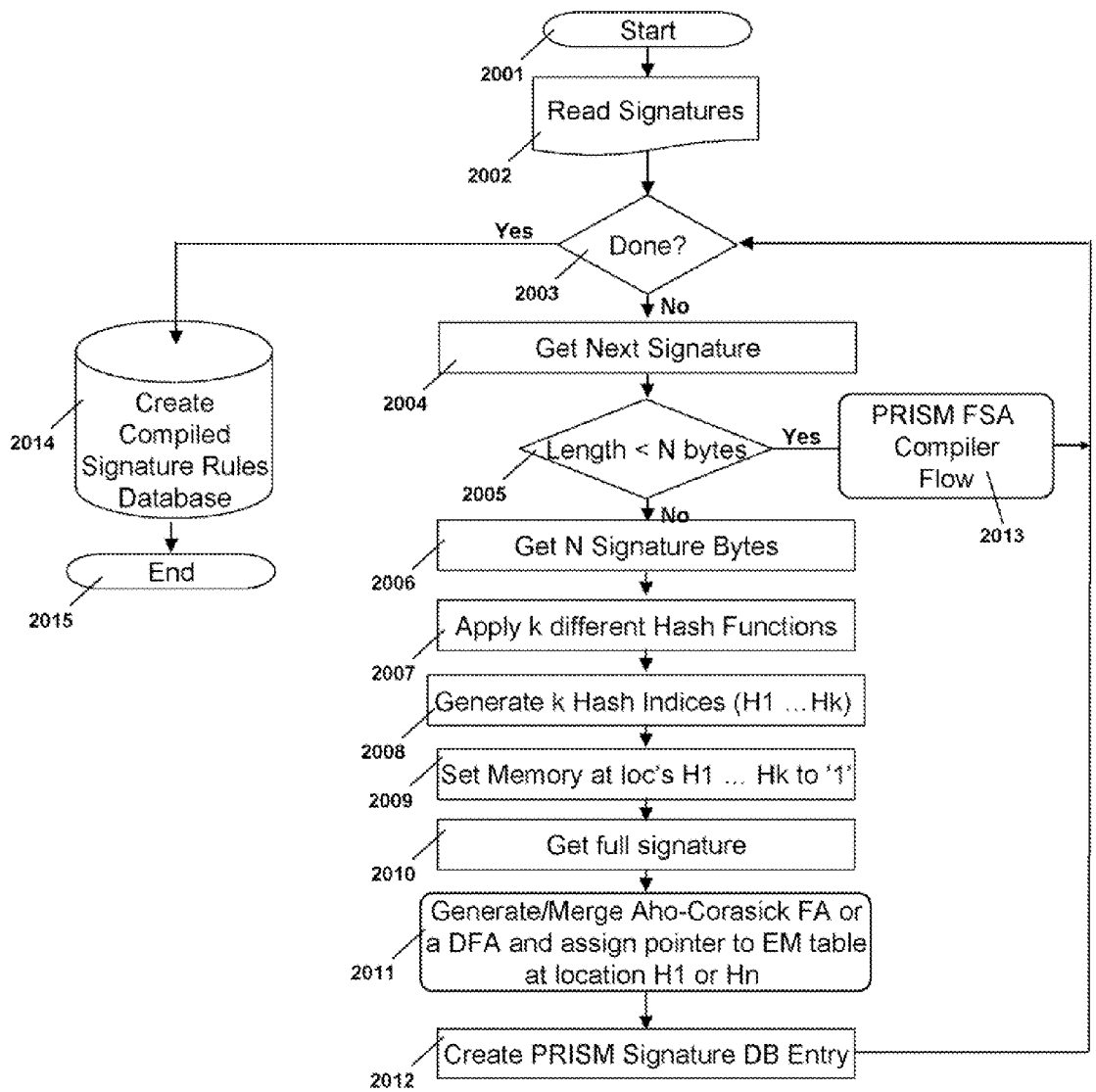
Fig. 20 PRISM Signature Compiler Flow

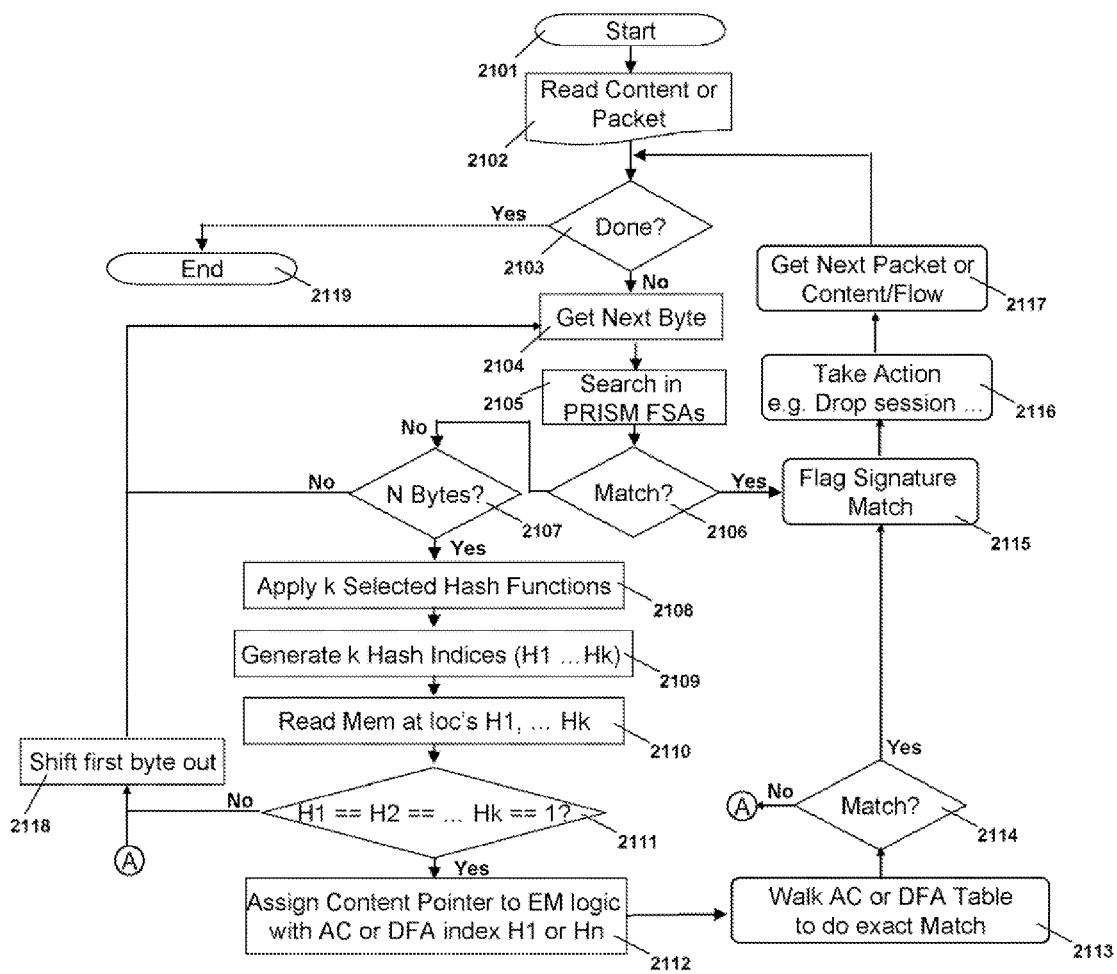
Fig. 21 PRISM Signature Search Flow

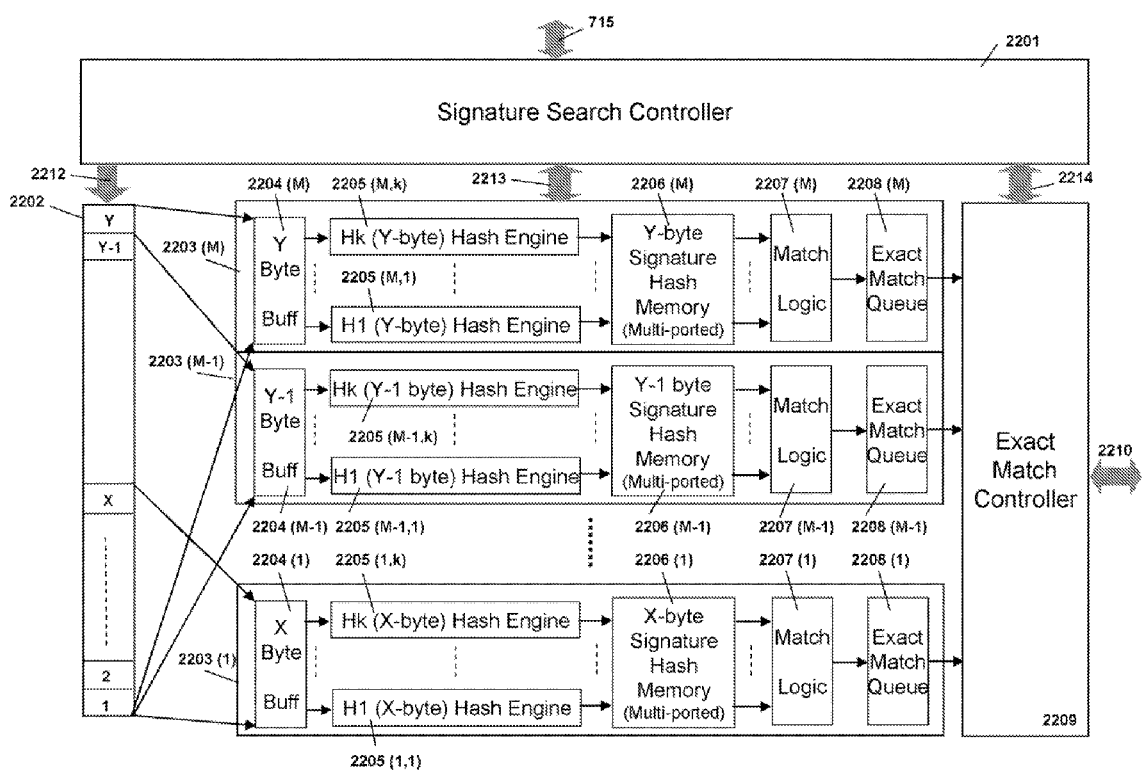
Fig. 22 PRISM Signature Search Engine for variable length signatures

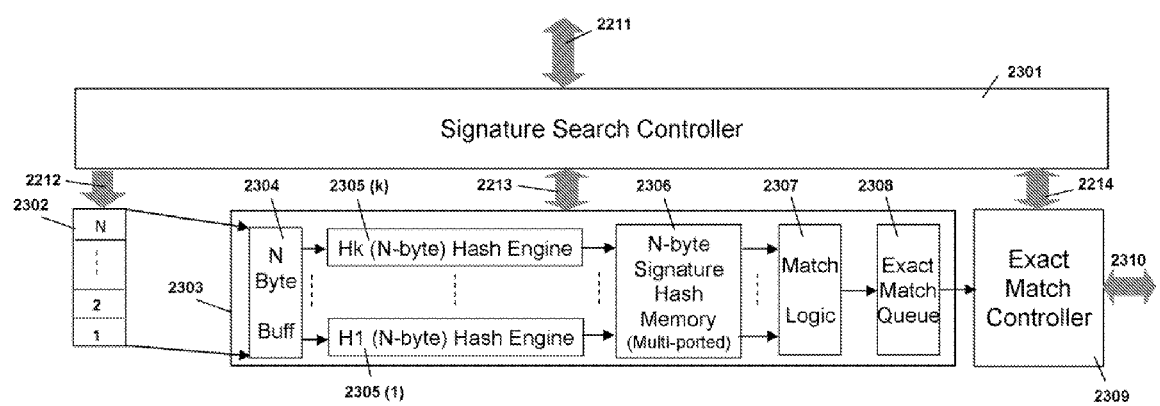
Fig. 23 PRISM Signature Search Engine using PRISM FSA for variable length signatures

EMBEDDED PROGRAMMABLE INTELLIGENT SEARCH MEMORY (PRISM) THAT SIMULTANEOUSLY PERFORMS REGULAR EXPRESSION BASED SEARCH AND SIGNATURE PATTERN BASED SEARCH

RELATED APPLICATIONS

Priority is claimed to Provisional Application Ser. No. 60/965,267 filed on Aug. 17, 2007 entitled Embedded programmable intelligent search memory, Provisional Application Ser. No. 60/965,170 fitted on Aug. 17, 2007 entitled 100 Gbps security and search architecture using programmable intelligent search memory, Provisional Application Ser. No. 60/963,059 filed on Aug. 1, 2007 entitled Signature search architecture for programmable intelligent search memory, Provisional Application Ser. No. 60/961,596 filed on Jul. 23, 2007 entitled interval symbol architecture for programmable intelligent search memory, Provisional Application Ser. No. 60/933,313 filed on Jun. 6, 2007 entitled FSA context switch architecture for programmable intelligent search memory, Provisional Application Ser. No. 60/933,332 filed on Jun. 6, 2007 entitled FSA extension architecture for programmable intelligent search memory, Provisional Application Ser. No. 60/930,607 filed on May 17, 2007 entitled Computer for programmable intelligent search memory, Provisional Application Ser. No. 60/928,883 filed on May 10, 2007 entitled Complex symbol evaluation for programmable intelligent search memory, Provisional Application Ser. No. 60/873,632 filed on Dec. 8, 2006 entitled Programmable intelligent search memory, Provisional Application Ser. No. 60/873,889 filed on Dec. 8, 2006 entitled Dynamic programmable intelligent search memory, which are all incorporated herein by reference in their entirety as if fully set forth herein.

Priority is also claimed to U.S. patent application Ser. No. 11/952,043 filed on Dec. 6, 2007 entitled 100 Gbps security and search architecture using programmable intelligent search memory, U.S. patent application Ser. No. 11/952,103 filed on Dec. 6, 2007 entitled Signature search architecture for programmable intelligent search memory, U.S. patent application Ser. No. 11/952,104 filed on Dec. 6, 2007 entitled Interval symbol architecture for programmable intelligent search memory, U.S. patent application Ser. No. 11/952,108 filed on Dec. 6, 2007 entitled FSA context switch architecture for programmable intelligent search memory, U.S. patent application Ser. No. 11/952,110 filed on Dec. 6, 2007 entitled FSA extension architecture for programmable intelligent search memory, U.S. patent application Ser. No. 11/952,111 filed on Dec. 6, 2007 entitled Compiler for programmable intelligent search memory, U.S. patent application Ser. No. 11/952,112 filed on Dec. 6, 2007 entitled Complex symbol evaluation for programmable intelligent search memory, U.S. patent application Ser. No. 11/952,114 filed on Dec. 6, 2007 entitled Programmable intelligent search memory, U.S. patent application number not yet assigned filed on Dec. 6, 2007 entitled Dynamic programmable intelligent search memory which are all co-pending U.S. patent applications of common ownership.

BACKGROUND OF THE INVENTION

This invention relates generally to memory technology and in particular to a new high performance intelligent content search memories for signature search, regular expression search and a compiler for it.

Many modern applications depend on fast information search and retrieval, With the advent of the world-wide-web and the phenomenal growth in its usage, content search has become a critical capability. A large number of servers get deployed in web search applications due to the performance limitations of the state of the art microprocessors for regular expression driven search.

There have been significant research and development resources devoted to the topic of searching of lexical information or patterns in strings. Regular expressions have been used extensively since the mid 1950s to describe the patterns in strings for content search, lexical analysis, information retrieval systems and the like. Regular expressions were first studied by S. C. Kleene in mid-1950s to describe the events of nervous activity. It is well understood in the industry that regular expression (RE) can also be represented using finite state automata (FSA). Non-deterministic FSA (NFA) and deterministic FSA (DFA) are two types of FSAs that have been used extensively over the history of computing. Rabin and Scott were the first to show the equivalence of DFA and NFA as far as their ability to recognize languages in 1959. In general a significant body of research exists on regular expressions. Theory of regular expressions can be found in "Introduction to Automata Theory, Languages and Computation" by Hopcroft and Ullman and a significant discussion of the topics can also be found in book "Compilers: Principles, Techniques and Tools" by Aho, Sethi and Ullman.

Computers are increasingly networked within enterprises and around the world. These networked computers are changing the paradigm of information management and security. Vast amount of information, including highly confidential, persona and sensitive information is now being generated, accessed and stored over the network. This information needs to be protected from unauthorized access. Further, there is a continuous onslaught of spam, viruses, and other inappropriate content on the users through email, web access, instant messaging, web download and other means, resulting in significant loss of productivity and resources.

Enterprise and service provider networks are rapidly evolving from 10/100 Mbps line rates to 1 Gbps, 10 Gbps and higher line rates. Traditional model of perimeter security to protect information systems pose many issues due to the blurring boundary of an organization's perimeter. Today as employees, contractors, remote users, partners and customers require access to enterprise networks from outside, a perimeter security model is inadequate. This usage model poses serious security vulnerabilities to critical information and computing resources for these organizations. Thus the traditional model of perimeter security has to be bolstered with security at the core of the network. Further, the convergence of new sources of threats and high line rate networks is making software based perimeter security to stop the external and internal attacks inadequate. There is a clear need for enabling security processing in hardware inside core or end systems beside a perimeter security as one of the prominent means of security to thwart ever increasing security breaches and attacks.

FBI and other leading research institutions have reported in recent years that over 70% of intrusions in organizations have been internal. Hence a perimeter defense relying on protecting an organization from external attacks is not sufficient as discussed above. Organizations are also required to screen outbound traffic to prevent accidental or malicious disclosure of proprietary and confidential information as well as to prevent its network resources from being used to proliferate spam, viruses, worms and other malware. There is a clear need to inspect the data payloads of the network traffic to protect and secure an organization's network for inbound and outbound security.

Data transported using TCP/IP or other protocols is processed at the source, the destination or intermediate systems in the network or a combination thereof to provide data security or other services like secure sockets layer (SSL) for socket layer security, Transport layer security, encryption/decryption, RDMA, RDMA security, application layer security, virtualization or higher application layer processing, which may further involve application level protocol processing (for example, protocol processing for HTTP, HTTPS, XML, SGML, Secure XML, other XML derivatives, Telnet, FTP, IP Storage, NFS, CIFS, DAFS, and the like), Many of these processing tasks put a significant burden on the host processor that can have a direct impact on the performance of applications and the hardware system. Hence, some of these tasks need to be accelerated using dedicated hardware for example SSL, or TLS acceleration. As the usage of XML increases for web applications, it is creating a significant performance burden on the host processor and can also benefit significantly from hardware acceleration. Detection of spam, viruses and other inappropriate content require deep packet inspection and analysis. Such tasks can put huge processing burden on the host processor and can substantially tower network line rate. Hence, deep packet content search and analysis hardware is also required.

Internet has become an essential tool for doing business at small to large organizations. HTML based static web is being transformed into a dynamic environment over last several years with deployment of XML based services. XML is becoming the lingua-franca of the web and its usage is expected to increase substantially. XML is a descriptive language that offers many advantages by making the documents self-describing for automated processing but is also known to cause huge performance overhead for best of class server processors. Decisions can be made by processing the intelligence embedded in XML documents to enable business to business transactions as well as other information exchange. However due to the performance overload on the best of class server processors from analyzing XML documents, they cannot be used in systems that require network line rate XML processing to provide intelligent networking. There is a clear need for acceleration solutions for XML document parsing and content inspection at network line rates which are approaching 1 Gbps and 10 Gbps, to realize the benefits of a dynamic web based on XML services.

Regular expressions can be used to represent the content search strings for a variety of applications like those discussed above. A set of regular expressions can then form a rule set for searching for a specific application and can be applied to any document, file, message, packet or stream of data for examination of the same. Regular expressions are used in describing anti-spam rules, anti-virus rules, anti-spyware rules, anti-phishing rules, intrusion detection rules, extrusion detection rules, digital rights management rules, legal compliance rules, worm detection rules, instant message inspection rules, VoIP security rules, XML document security and search constructs, genetics, proteomics, XML based protocols like XMPP, web search, database search, bioinformatics, signature recognition, speech recognition, web indexing and the like. These expressions get converted into NFAs or DFAs for evaluation on a general purpose processor. However, significant performance and storage limitations arise for each type of the representation. For example an N character regular expression can take up to the order of $2^N$ memory for the states of a DFA, while the same for an NFA is in the order of N. On the other hand the performance for the DFA evaluation for an M byte input data stream is in the order of M memory accesses and the order of (N*M) processor cycles for the NFA representation on modern microprocessors.

When the number of regular expressions increases, the impact on the performance deteriorates as well. For example, in an application like anti-spam, there may be hundreds of regular expression rules. These regular expressions can be evaluated on the server processors using individual NFAs or DFAs. It may also be possible to create a composite DFA to represent the rules. Assuming that there are X REs for an application, then a DFA based representation of each individual RE would result up to the order of $(X*2^N)$ states however the evaluation time would grow up to the order of (X*N) memory cycles. Generally, due to the potential expansion in the number of states for a DFA they would need to be stored in off chip memories. Using a typical access time latency of main memory systems of 60 ns, it would require about (X*60 ns*N*M) time to process an X RE DFA with N states over an M byte data stream. This can result in tens of Mbps performance for modest size of X, N & M. Such performance is obviously significantly below the needs of today's network line rates of 1 Gbps to 10 Gbps and beyond. On the other hand, if a composite DFA is created, it can result in an upper bound of storage in the order of $2^{N*X}$ which may not be within physical limits of memory size for typical commercial computing systems even for a few hundred REs. Thus the upper bound in memory expansion for DFAs can be a significant issue. Then on the other hand NFAs are non-deterministic in nature and can result in multiple state transitions that can happen simultaneously. NFAs can only be processed on a state of the an microprocessor in a scalar fashion, resulting in multiple executions of the NFA for each of the enabled paths. X REs with N characters on average can be represented in the upper bound of (X*N) states as NFAs. However, each NFA would require M iterations for an M-byte stream, causing an upper bound of (X*N*M* processor cycles per loop). Assuming the number of processing cycles are in the order of 10 cycles, then for a best of class processor at 4 GHz, the processing time can be around (X*N*M*2.5 ns), which for a nominal N of 8 and X in tens can result in below 100 Mbps performance. There is a clear need to create high performance regular expression based content search acceleration which can provide the performance in line with the network rates which are going to 1 Gbps and 10 Gbps.

The methods for converting a regular expression to Thompson's NFA and DFA are well known. The resulting automata are able to distinguish whether a string belongs to the language defined by the regular expression however it is not very efficient to figure out if a specific sub-expression of a regular expression is in a matching string or the extent of the string. Tagged NFAs enable such queries to be conducted efficiently without having to scan the matching string again. For a discussion on Tagged NFA refer to the paper "NFAs with Tagged Transitions, their Conversion to Deterministic Automata and Application to Regular Expressions", by Ville Launkari, Helsinki University of Technology, Finland.

SUMMARY OF THE INVENTION

A programmable intelligent search memory (PRISM) of my invention is a memory technology that supports orders of magnitude larger number of regular expressions in a single chip for current and emerging content search applications. PRISM memory supports FSAs of a number of states 'n' which may be any integer like 8, 16, 32 and the like. However, at times there may be a need to support regular expressions with number of states which are more than that represented in a single PRISM FSA. For such cases it may be necessary to allow multiple PRISM FSAs to be coupled together to support the bigger REs. Further, there are certain applications where the rules are specified as a group of rules that are evaluated together and there may be nesting amongst the rule groups. Such applications may have groups of rules that may be evaluated simultaneously or one after the other and need a means of communicating from one FSA to another. My invention describes an architecture that enables creation of extensible FSAs to support needs such as the ones described above and the like. Modern programming languages and Operating systems like Pert and POSIX allow for regular expressions with an interval or a range. For example if in a regular expression the symbol 'a' appears 5 consecutive times, then it is possible to represent that as 'a[5]'. In general such expressions can be 'a[x,y]', which means symbol 'a' must appear in the expression from 'x' to 'y' times or 'a[x,]' which means the symbol 'a' must appear at least 'x' times for this expression to be valid or 'a[x]' which means the symbol 'a' must appear exactly 'x' times for this expression to be valid. My invention also describes an architecture that enables the creation of such complex regular expressions with interval representation in an efficient way without using up a large number of states depending on the interval range 'x' and 'y' in the expressions like 'a[x,y]' or 'a[x,]' or 'a[x]' or the like. There is a need for creating a compiler flow that can target converting regular expression rules in to a form that PRISM based search engines can use to process input data for content specified by the regular expression rules. My invention describes a compiler for regular expressions that can be used for PRISM.

Many applications also represent content search rules as a set of signature patterns like those used for anti-virus application. Modern anti-virus solutions have in the order of 100,000 or more signatures. A big portion of these signatures are typically represented as a string of characters. However, a smaller portion of the signatures may also comprise of regular expressions. Bloom fitters have been suggested in literature as a way to test set membership of any content within a list of large fixed patterns or signatures. Bloom filters cannot handle regular expressions and hence for applications like anti-virus, other solutions have to be used for those signatures with regular expressions which may be a relatively large number from a composite DFA based realization for high performance. My invention describes a way to evaluate a large number of signature patterns comprising fixed patterns and regular expression based patterns like those in anti-virus applications in a compact and efficient way.

I describe a FSA extension architecture, a complex regular expressions with interval architecture, signature recognition architecture and a high performance Programmable Intelligent Search Memory™ (PRISM™) for searching content with regular expressions as well as other pattern searches like signatures, I describe an architecture that can be used to achieve security and search performance from below 1 Gbps to over 100 Gbps using PRISM. Programmable intelligent search memory of this patent can have many uses wherever any type of content needs to be searched for example in networking, storage, security, web search applications, XML processing, bio informatics, signature recognition, genetics, proteomics, speech recognition, database search, enterprise search and the like. The programmable intelligent search memory of my invention may be embodied as independent PRISM memory integrated circuits working with or may also be embodied within microprocessors, multi-core processors, network processors, TCP Offload Engines, network packet classification engines, protocol processors, regular expression processors, content search processors, network search engines, content addressable memories, mainframe computers, grid computers, servers, workstations, personal computers, laptops, notebook computers, PDAs, handheld devices cellular phones, wired or wireless networked devices, switches, routers, gateways, unified threat management devices, firewalls, VPNs, intrusion detection and prevention systems, extrusion detection systems, compliance management systems, wearable computers, data warehouses, storage area network devices, storage systems, data vaults, chipsets and the like or their derivatives or any combination thereof.

The regular expressions may optionally be tagged to detect sub expression matches beside the full regular expression match. The regular expressions are converted into equivalent NFAs and optionally into tagged NFAs. The PRISM memory also optionally provides ternary content addressable memory functionality. So fixed string searches may optionally be programmed into the PRISM™ memory of my invention. PRISM memory of this invention enables a very efficient and compact realization of intelligent content search using FSA to meet the needs of current and emerging content search applications. For clarity, as used in this patent the terms "programmable intelligent search memory", "search memory", "content search memory", or "PRISM memory" are used interchangeably and have the same meaning unless specifically noted. Further for clarity, as used in this patent the term "memory" when used independently is used to refer to random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories.

The PRISM memory performs simultaneous search of regular expressions and other patterns (also referred to as "rules" or "regular expression rules" or "pattern search rules" or "patterns" or "regular expressions" in this patent) against the content being examined. The content may be presented to the search memory by a companion processor or PRISM controller or content stream logic or a master processor or the like which may be on the same integrated circuit chip as the PRISM memory or may be on a separate device. The content to be searched may be streaming content or network packets or data from a master processor or data from a disk or a file or reside in on-chip memory or off-chip memory or buffers or the like from which a controller may present it to the search memory arrays for examination. The content search memory arrays may initially be configured with the regular expression rules converted into NFAs or tagged NFAs and optionally other pattern search rules. I describe a compiler for converting regular expressions into rules supported by PRISM. I also describe architecture for compact, efficient and high speed implementation for programming, compiling and searching a large number of signature patterns for applications like anti-virus. PRISM memory may optionally comprise of configuration control logic which may be distributed or central or a combination thereof. The configuration control logic may optionally address PRISM memory cells to read and/or write FSA rules or other patterns to be searched. Once the PRISM memory is setup with all the related information about the NFAs and other rules, the content to be examined can be presented to the PRISM memory. PRISM memory provides capabilities to update rules or program new rules or additional rules, in line with the content examination within a few clock cycles unlike the current regular expression processors which require the content evaluation to stop for long periods of time until large tables of composite DFAs are updated in an external or internal memory. Typically the content is presented as a stream of characters or symbols which get examined against the rules in the PRISM memory simultaneously and whenever a rule is matched the PRISM memory array provides that indication as a rule match signal which is interpreted by the control logic of the PRISM. There may be multiple rule matches simultaneously in which case a priority encoder which may also be programmable is used to select one or more matches as the winner(s). The priority encoder may then provide a tag or an address or an action or a combination that may have already been programmed in the priority encoder which may be used to look-up related data from associated on-chip or off-chip memory that may optionally determine the next set of actions that may need to be taken on the content being examined. For example, in case of a security application if a set of regular expressions are defined and programmed for spam detection, then if one or more of these rules when matched can have action(s) associated with them that the message or content may need to quarantined for future examination by a user or it can have an action that says the content should be dropped or enable a group of regular expressions in the PRISM memory to be applied to the content or the like depending on the specific application. The PRISM memory architecture comprises of means or circuits or the like for programming and reprogramming of the FSA rules and optionally CAM signatures and masks. It further comprises of means or circuits or the like to stream the content to be searched to the PRISM memory arrays. It may further comprise of priority encoder which may optionally be programmable. The PRISM memory may optionally comprise of random access memory (on-chip or off-chip) which is used to store actions associated with specific rule matches. The PRISM memory may optionally comprise of database extension ports which may be optionally used when the number of rules is larger than those that may fit in a single integrated circuit chip. The PRISM memory may optionally comprise of clusters of PRISM memory cells that enable a group of FSA rules to be programmed per cluster. The PRISM memory clusters may optionally comprise of context memory for fast storage and retrieval of FSA states for examination of content that belongs to different streams or contexts or flows or sessions or the like as described below referred to as context memory. For clarity, context memory or global context memory or local context memory or cluster context memory, all comprise of memory like random access memory or RAM or Dynamic RAM (DRAM) or DDR or QDR or RLDRAM or RDRAM or FCRAM or Static RAM (SRAM) or read only memory (ROM) or FLASH or cache memory or the like or any future derivatives of such memories as discussed above. The PRISM memory may optionally comprise of global context memory beside the local cluster context memory for storage and retrieval of FSA states of different contexts and enable supporting a large number of contexts. The cluster context memory may optionally cache a certain number of active contexts while the other contexts may be stored in the global context memory. There may optionally be off-chip context memory as well, which can be used to store and retrieve FSA states for much larger number of contexts. The PRISM memory may optionally comprise of cache or context control logic (also referred as "context controller") that manages the cluster, global or external context memory/cache or a combination thereof. The cache or context control logic may optionally be distributed per cluster or may be central for the PRISM memory or any combination thereof. The PRISM controller or the content stream logic that streams the content to be searched may be provided with an indication of the context of the content being searched or it may detect the context of the content or a combination thereof, and may optionally direct the context memory and associated control logic ides the context controller to get the appropriate context ready, Once the context memory has the required context available an indication may be provided to PRISM configuration control logic that it may program or load the context states in the PRISM memory. The PRISM configuration control logic (also referred as "configuration controller" in this patent) may optionally first save the current context loaded in the set of active FSA blocks before loading the new context. The configuration controller(s) and the context controller(s) may thus optionally store and retrieve appropriate contexts of the FSAs and start searching the content against the programmed rules with appropriate context states of the FSAs restored. Thus PRISM memory may optionally dynamically reconfigure itself at run-time based on the context of the content or the type of the application or the like or a combination thereof enabling run-time adaptable PRISM memory architecture. The contexts as referred to in this patent may, as examples without limitation, be related to specific streams, or documents, or network connections or message streams or sessions or the like. The PRISM memory may process content from multiple contexts arriving in data groups or packets or the like. For content search in applications where the content belonging to one context may arrive interspersed with content from other contexts, it may be important to maintain the state of the content searched for a context up to the time when content from a different context gets searched by PRISM memory. The context memory or cache with the associated controllers as described in this patent enable handling of multiple contexts.

For clarification, the description in this patent application uses term NFA to describe the NFAs and optionally, when tagging is used in regular expressions, to describe tagged NFA unless tagged NFA is specifically indicated. All NFAs may optionally be tagged to form tagged NFAs, hence the description is not to be used as a limiter to apply only to tagged NFAs. The descriptions of this patent are applicable for non-tagged NFAs as well and tagging is an optional function which may or may not be implemented or used, and thus non-tagged NFAs are covered by the teachings of this patent as will be appreciated by one skilled in the art. At various places in this patent application the term content search memory, content search memory, search memory and the like are used interchangeably for programmable intelligent search memory or PRISM memory. These usages are meant to indicate the content search memory or PRISM memory of this invention without limitation.

Berry and Sethi in their paper "From Regular Expressions to Deterministic Automata" Published in Theoretical Computer Science in 1986, showed that regular expressions (REs) can be represented by NFAs such that a given state in the state machine is entered by one symbol, unlike the Thompson NFA. Further, the Berry-Sethi NFAs are ϵ-free. A 'V' term RE can be represented using 'V+1' states NFA using Berry-Sethi like NFA realization method. The duality of Berry-Sethi method also exists where all transitions that lead the machine out of a state are dependent on the same symbol. This is shown in the paper "A Taxonomy of finite automata construction algorithms" by Bruce Watson published in 1994 in section 4.3. I show a method of creating NFA search architecture in a memory leveraging the principles of Berry-Sethi's NFA realization and the dual of their construct. The NFA search memory is programmable to realize an arbitrary regular expression using the compiler flow of this invention to convert a regular expression to that usable by PRISM. The compiler of this invention follows the principles of Berry-Sethi FSA construction to convert regular expressions into an FSAs and creates various data structures that are required for PRISM to operate as a programmable regular expressions engine.

This PRISM memory and the compiler for PRISM of this patent may be used for many applications like those for detecting intrusions, extrusions and confidential information disclosure (accidental or malicious or intended), regulatory compliance search using hardware for regulations like HIPAA, Sarbanes-Oxley, Graham-Leach-Bliley act, California security bills, security bills of various states and/or countries and the like, deep packet inspection, detecting spam, detecting viruses, detecting worms, detecting spyware, detecting digital rights management information, instant message inspection, URL matching, application detection, detection of malicious content, and other content, policy based access control as well as other policy processing, content based switching, load balancing, virtualization or other application layer content inspection for application level protocol analysis and processing for web applications based on HTTP. XML and the like and applying specific rules which may enable anti-spam, anti-virus, other security capabilities like anti-spyware, anti-phishing and the like capabilities. The content inspection memory may be used for detecting and enforcing digital rights management rules for the content. The content inspection memory may also be used for URL matching, string searches, genetic database searches, proteomics, bio informatics, web indexing, content based toad balancing, sensitive information search like credit card numbers or social security numbers or health information or the like.

Classification of network traffic is another task that consumes up to half of the processing cycles available on packet processors leaving few cycles for deep packet inspection and processing at high line rates. The described content search memory can significantly reduce the classification overhead when deployed as companion search memory to packet processors or network processors or TOE or storage network processors or the like.

BRIEF DESCRIPTION OF THE DRAWINGS

FIG. 1a illustrates Thompson's NFA (prior art)
FIG. 1b illustrates Berry-Sethi NFA (prior art)
FIG. 1c illustrates DFA (prior art)
FIG. 2a illustrates a left-biased NFA and state transition table (prior art)
FIG. 2b illustrates a right-biased NFA and state transition table (prior art)
FIG. 3a illustrates state transition controls
FIG. 3b illustrates configurable next state tables per state
FIG. 4a illustrates state transition logic (STL) for a state
FIG. 4b illustrates a state logic block
FIG. 5a illustrates state transition logic (STL) for a state in Left-Biased FSA
FIG. 5b illustrates state transition logic (STL) for a state in Right-Biased FSA
FIG. 6A illustrates Right-biased Tagged NFA Rule block in PRISM
FIG. 6B illustrates Left-biased Tagged NFA Rule block in PRISM
FIG. 7 illustrates PRISM Block Diagram
FIG. 7b illustrates PRISM Memory Cluster (PMC) Array
FIG. 8a illustrates PRISM Memory Cluster Block Diagram
FIG. 8b illustrates PRISM Memory Cluster Detailed Block Diagram FIG. 9 illustrates PRISM search compiler flow (full+incremental rule distribution)
FIG. 10 illustrates PRISM FSA Compiler flow
FIG. 11 illustrates PRISM Row-Wise FSA Extension
FIG. 11A illustrates PRISM Rule Group FSA Extension.
FIG. 12 illustrates PRISM Row-Wise FSA Extension Example #1
FIG. 13 illustrates PRISM Row-Wise FSA Extension Example #2
FIG. 14 illustrates PRISM Column-Wise FSA Extension
FIG. 15 illustrates PRISM FSA Extension Example #1
FIG. 16A illustrates an integrated circuit processor with embedded PRISM
FIG. 16B illustrates an integrated circuit processor with processor core using PRISM
FIG. 16C illustrates a multi-processor system with PRISM
FIG. 17A illustrates PRISM FSA without Interval Symbol
FIG. 17B illustrates PRISM FSA with Interval Symbol
FIG. 17C illustrates PRISM FSA interval Symbol State Counter Block
FIG. 18A illustrates State transition logic (STL) for a state in PRISM with interval symbol
FIG. 18B illustrates a State Logic Block for a state in PRISM with interval symbol
FIG. 19 illustrates PRISM Search Engine with Interval Symbol
FIG. 20 illustrates PRISM Signature Computer Flow
FIG. 21 illustrates PRISM Signature Search Flow
FIG. 22 illustrates Signature Search Engine for variable length signatures
FIG. 23 illustrates Signature Search Engine using PRISM FSA for variable length signatures

DESCRIPTION

I describe a FSA extension architecture, a complex regular expressions with interval architecture, signature recognition architecture and a regular expression compiler for a high performance Programmable Intelligent Search Memory for searching content with regular expressions as well as other pattern searches like signatures. The regular expressions may optionally be tagged to detect sub expression matches beside the full regular expression match. The regular expressions are converted into equivalent FSAs that may optionally be NFAs and may optionally be converted into tagged NFAs. The PRISM memory also optionally supports ternary content addressable memory functionality. So fixed string searches may optionally be programmed into the PRISM memory. PRISM memory enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. A compiler for compiling these regular expression rules into PRISM compatible data structure is described in this invention to enable PRISM to perform the content inspection using the compiled rules. The PRISM memory performs simultaneous search of regular expressions and other patterns. The content search memory can perform high speed content search at Line rates from 1 Gbps to 10 Gbps and higher, when the best of class server microprocessor can only perform the same tasks at well below 100 Mbps. The content search memory can be used not only to perform layer 2 through layer 4 searches that may be used for classification and security applications, it can also be used to perform deep packet inspection and layer 4 through layer 7 content analysis.

Following are some of the embodiments, without limitations, that can implement PRISM memory:

The PRISM memory may be embodied inside network interface cards of servers, workstations, client PCs, notebook computers, handheld devices, switches, routers and other networked devices. The servers may be web servers, remote access servers, file servers, departmental servers, storage servers, network attached storage servers, database servers, blade servers, clustering servers, application servers, content/media servers, VoIP servers and systems, grid computers/servers, and the like. The PRISM memory may also be used inside an I/O chipset of one of the end systems or network core systems like a switch or router or appliance or the like.

The PRISM memory may also be embodied on dedicated content search acceleration cards that may be used inside various systems described in this patent. Alternatively, PRISM memory may also be embodied as a content search memory inside a variety of hardware and/or integrated circuits like ASSPs, ASICs, FPGA, microprocessors, multi-core processors, network processors, TCP Offload Engines, network packet classification engines, protocol processors, regular expression processors, content search processors, mainframe computers, grid computers, servers, workstations, personal computers, laptops, handheld devices, cellular phones, wired or wireless networked devices, switches, routers, gateways, XML accelerators, VoIP servers, Speech recognition systems, bio informatics systems, genetic and proteomics search systems, web search servers, electronic vault application networks and systems, Data Warehousing systems, Storage area network systems, content indexing appliances like web indexing, email indexing and the like, chipsets and the like or any combination thereof. Alternatively, PRISM memory blocks may be embedded inside other memory technologies like DRAM, SDRAM, DDR DRAM, DDR II DRAM, RLDRAM, SRAM, RDRAM, FCRAM, QDR SRAM, DDR SRAM, CAMs, Boundary Addressable Memories, Magnetic memories, Flash or other special purpose memories or a combination thereof or future derivates of such memory technologies to enable memory based content search.

One preferred embodiment of the invention is in an integrated circuit memory chip that may support around 128,000 8-symbol regular expression rules in current process technologies. A second preferred embodiment of the PRISM technology is an integrated circuit memory chip that may support around 8,000 regular expression rules in current process technologies to support applications where a lower content search memory cost is required. Each process generation may provide ability to store around twice as many PRISM memory bits as the previous generation. Thus in one preferred embodiment the PRISM memory would be able to support tens of thousands of eight state FSA and can potentially support over 100,000 FSAs. There are many variations of the PRISM memory architecture can be created that can support more or less FSAs depending upon various factors like the number of states per FSA, the chip die area, cost, manufacturability expectations and the like which will be appreciated by a person with ordinary skill in the art.

DETAILED DESCRIPTION

I describe a FSA extension architecture: a complex regular expressions with interval architecture, signature recognition architecture and a regular expression compiler for a high performance Programmable Intelligent Search Memory for searching content with regular expressions as well as other pattern searches like signatures. The regular expressions may optionally be tagged to detect sub expression matches beside the full regular expression match. The regular expressions are convened into equivalent NFAs or FSAs and optionally into tagged NFAs. The PRISM memory also optionally supports ternary content addressable memory functionality. So fixed string searches may optionally be programmed into the PRISM memory of my invention. PRISM memory of this invention enables a very efficient and compact realization of intelligent content search using FSA to meet the needs of current and emerging content search applications. Unlike a regular expression processor based approach, the PRISM memory can support tens of thousands to hundreds of thousands of content search rules defined as regular expressions as well as patterns of strings of characters. The PRISM memory performs simultaneous search of regular expressions and other patterns. The content search memory can perform high speed content search at line rates from 1 Gbps to 10 Gbps and higher using current process technologies. The description here is with respect to one preferred embodiment of this invention in an integrated circuit (IC) chip, it will be appreciated by those with ordinary skill in the art that changes in these embodiments may be made without departing from the principles and spirit of the invention. The illustrations are made to point out salient aspects of the invention and do not illustrate well understood IC design elements, components and the like implementation of the invention in integrated circuits so as not to obscure the invention.

Ability to perform content search has become a critical capability in the networked world. As the network line rates go up to 1 Gbps, 10 Gbps and higher, it is important to be able to perform deep packet inspection for many applications at line rate. Several security issues, like viruses, worms, confidential information leaks and the like, can be detected and prevented from causing damage if the network traffic can be inspected at high line rates. In general, content search rules can be represented using regular expressions. Regular expression rules can be represented and computed using FSAs. NFAs and DFAs are the two types of FSAs that are used for evaluation of regular expressions. For high line rate applications a composite DFA can be used, where each character of the input stream can be processed per cycle of memory access. However, this does have a limit on how fast the search can be performed dictated by the memory access speed. Another limiter of such approach is the amount of memory required to search even a modest number of regular expression rules. As discussed above, NFAs also have their limitations to achieve high performance on general purpose processors. In general, today's best of class microprocessors can only achieve less than 100 Mbps performance using NFAs or DFAs for a small number of regular expressions. Hence, there is a clear need to create targeted content search acceleration hardware to raise the performance of the search to the line rates of 1 Gbps and 10 Gbps. PRISM memory is such a high performance content search hardware that can be targeted for high line rates. The invention of this patent describes a compiler to make PRISM memory structures useful for processing content against a large number of regular expressions compiled to leverage PRISM capabilities.

As described earlier, regular expression can be represented using FSA like NFA or DFA. FIG. 1a illustrates Thompson's construction for the regular expression (xy+y)*yx. Thompson's construction proceeds in a step by step manner where each step introduces two new states, so the resulting NFA has at most twice as many states as the symbols or characters and operators in the regular expression. An FSA is comprised of states, state transitions, and symbols that cause the FSA to transition from one state to another. An FSA comprises at least one start state, and at least one accept state where the start state is where the FSA evaluation begins and the accept state is a state which is reached when the FSA recognizes a string. Block 101 represent the start state of the FSA, while block 105 is an accept state. Block 102 represents state 2 and 104 represents state 3. The transition from state 2 to state 3 is triggered on the symbol x, 103 and is represented as a directed edge between the two states. Thompson's NFA comprises of 'ϵ' transitions, 116, which are transitions among states which may be taken without any input symbol.

FIG. 1b illustrates Berry-Sethi NFA for the regular expression (xy+y)*yx. Berry and Sethi described an algorithm of converting regular expressions into FSA using a technique called 'marking' of a regular expression. It results in an NFA which has a characteristic that all transitions into any state are from the same symbol. For example, all transitions into state 1, 107, are from symbol 'x'. The other characteristic of the Berry-Sethi construct is that number of NFA states are the same as the number of symbols in the regular expression and one start state. In this type of construction, each occurrence of a symbol is treated as a new symbol. The construction converts the regular expression (xy+y)*yx to a marked expression $(x_1y_2+y_3)*y_4x_5$ where each $x_1$ leads to the same state, 107. The figure does not illustrate the markings. Once the FSA is constructed the markings are removed. The FIG. 1b illustrates the NFA with the markings removed. As can be seen from the figure, in Berry-Sethi construction all incoming transitions into a state are all dependent on the same symbol. Similarly, a duality of Berry-Sethi construct also has been studied and documented in the literature as discussed earlier, where instead of all incoming transitions being dependent on the same symbol, all outgoing transitions from a state are dependent on the same symbol. The Berry-Sethi construct is also called a left-biased type of construct, where as its dual is called a right-biased construct.

Finite State Automaton can evaluate incoming symbols or characters against the regular expression language of the automaton and detect when an input string is one of the strings recognized by it. However, it is advantageous in certain conditions to know if a certain sub-expression of the regular expression is also matched. That may be enabled by tagging the NFA as described in the paper by Ville Laurikari referred earlier. Following description illustrates how the inventions of this patent enable tagged NFA realization in PRISM memory. The tagging for sub-expression checking may involve further processing of the FSA to uniquely identify sub-expression matching. However for illustration purpose, if in the regular expression "(xy+y)*yx" if one desires to detect if the sub-expression "xy" is in the recognized string, one can tag the state 4, 110, as a tagged state. Thus, whenever the regular expression transitions through state 4, 110, the sub-expression match or tag match may be indicated. There may also be need to detect if a specific transition leads the regular expression through a desired sub-expression. In such a case a tag start state and a tag end state may be marked. For instance, if it is desired to detect if the transition from state 0 to state 2, 117, is taken then the state 0 may be marked as a tag start state and state 2 may be marked as a tag end state. The tagged FSA implementation may then indicate the beginning of the tag transition when the FSA reaches the tag start state and then indicate the end of the tag transition when the FSA reaches the tag end state. If the FSA moves from the tag start state immediately followed by transitioning into tag end state, then the tagged FSA can indicate the match of a tagged transition. The illustrations in the description below do not illustrate this aspect of tagged NFA, though it may optionally be supported in PRISM and may be easily implemented as follows or other means for example by adding a tag start and tag end state flags (as memory bits or flip-flops) and the logic for the tag transition detection to follow the steps described above as can be appreciated by those with ordinary skill in the art. The patent of this disclosure enables detection of sub-expressions using tagging.

FIG. 1c illustrates a DFA for the same regular expression (xy+y)*yx. DFA is deterministic in that only one of its states is active at a given time, and only one transition is taken dependent on the input symbol. Whereas in an NFA, multiple states can be active at the same time and transitions can be taken from one state to multiple states based on one input symbol. There are well known algorithms in the literatures like subset construction, to convert a RE or NFA to a DFA. This DFA may be realized in the PRISM Memory using the constructs described below to represent an FSA, using a left-biased realization. Thus PRISM memory of this invention may also be used to program certain DFAs where all incoming transitions to each state are with the same symbol like the DFA of this illustration.

FIG. 2a illustrates a left-biased NFA and its state transition table (prior art). The illustration is a generic four state Berry-Sethi like NFA with all transitions from each node to the other shown with the appropriate symbol that the transition depends on. For example, state A, 201 has all incoming transitions dependent on symbol 'a' as illustrated by example transitions labeled 202 and 203. When the FSA is in State A, 201, an input symbol 'd', transitions the FSA to state D with the transition, 204, from state A to state D. The table in the figure illustrates the same FSA using a state transition table. The column 'PS', 211, is the present state of the FSA, while the row 'sym', 212, is a list of all the symbols that the state transitions depend on. The table 213, illustrates the next state (NS) that the FSA will transition to from the present state (PS) when an input symbol from those in the sym header row is received. In this FSA, state 'A' is the start state and state C is an accept state. Hence, if the FSA is in the present state 'A' and an input symbol 'b' is received, the FSA transitions to the next state 'B'. So when the next input symbol is received, the FSA is in present state 'B' and is evaluated for state transition with the row corresponding to present state 'B'.

FIG. 2b illustrates a right-biased NFA and its state transition table (prior art). The illustration is a generic four state dual of Berry-Sethi NFA with all transitions from each node to the other shown with the appropriate symbol that the transition depends on. For example, state 'A', 205 has all outgoing transitions dependent on symbol 'a' as illustrated by example transitions labeled 208 and 209 where as unlike the left-biased NFA described above, each incoming transition is not on the same symbol, for example transitions labeled 206 and 207 depend on symbols 'b' and 'd' respectively. The state transition table in this figure is similar to the left biased one, except that the FSA transitions to multiple states based on the same input symbol. For example if the FSA is in the present state 'B' and a symbol 'b' is received, then the FSA transitions to all states 'A', 'B', 'C' and 'D'. When an input symbol is received which points the FSA to an empty box, like 216, the FSA has received a string which it does not recognize. The FSA can then be initialized to start from the start state again to evaluate the next string and may indicate that the string is not recognized.

The FIG. 2a and FIG. 2b, illustrate generic four state NFAs where at the transitions from each state to the other are shown based on the left-biased or right-biased construct characteristics. However not all four state NFAs would need all the transitions to be present. Thus if a symbol is received which would require the FSA to transition from the present state to the next state when such transition on the received input symbol is not present, the NFA is said to not recognize the input string. At such time the NFA may be restarted in the start state to recognize the next string. In general, one can use these example four state NFAs to represent any four state RE in a left-biased (LB) or right-biased (RB) form provided there is a mechanism to enable or disable a given transition based on the resulting four states NFA for the RE.

FIG. 3a illustrates state transition controls for a left-biased and right-biased NFA. The figure illustrates a left-biased NFA with a state 'A', 300, which has incoming transitions dependent on receiving input Symbol 'S1' from states 'B', 301, 'C', 302, and 'D', 303. However, the transitions from each of the states 'B', 'C' and 'D' to state 'A', occur only if the appropriate state dependent control is set besides receiving the input symbol 'S1'. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs depending on the received input symbol being 'S1' and if the state dependent control for the appropriate transition is set. Thus, one can represent any arbitrary four states NFA by setting or clearing the state dependent control for a specific transition. Thus, if a four states left biased NFA comprises of transition into state 'A', from state 'B' and 'C' but not from the states 'A' or 'D', the state dependent controls can be set as $V_1=0, V_2=1, V_3=1$ and $V_4=0$. Hence if the NFA is in state 'D' and a symbol 'S1' is received, the NFA with not transition into state 'A', however if the NFA is in state 'B' and a symbol 'S1' is received the NFA will transition into state 'A'.

Similarly, FIG. 3a also illustrates states and transitions for a right-biased NFA. The figure illustrates a right-biased NFA with a state 'A', 306, which has incoming transitions from state 'B', 307, state 'C', 308, and state 'D', 309, on receiving input symbols 'S2', 'S3' and 'S4' respectively. However, the transitions from each of the states 'B', 'C' and 'D' to state 'A', occur only if the appropriate state dependent control is set besides receiving the appropriate input symbol. The state dependent control for transition from state 'B' to state 'A' is $V_2$ while those from states 'C' and 'D' to state 'A' is $V_3$ and $V_4$ respectively. Transition to the next state 'A' is dependent on present state 'A' through the state dependent control $V_1$. Thus transition into a state 'A' occurs based on the received input symbol and if the state dependent control for the appropriate transition is set. Thus, one can represent any arbitrary four states right-biased NFA by setting or clearing the state dependent control for a specific transition, All state transition controls for a given state form a state dependent vector (SDV), which is comprised of $V_1, V_2, V_3$, and $V_4$ for the illustration in FIG. 3a for the left-biased and the right-biased NFAs.

FIG. 3b illustrates configurable next state table per state. The left-biased state table for 'NS=A', is shown by the table 311, whereas the right-biased state table for 'NS=A', is shown by the table 312. The state dependent vector for both left-biased and right-biased NFA state is the same, while the received input symbol that drive the transition are different for the left-biased vs. right-biased NFA states. Thus a state can be represented with properties like left-biased (LB), right-biased (RB), start state, accept state, SDV as well as action that may be taken if this state is reached during the evaluation of input strings to the NFA that comprises this state.

FIG. 4a illustrates state transition logic (STL) for a state. The STL is used to evaluate the next state for a state. The next state computed using the STL for a state depends on the current state of the NFA, the SDV, and the received symbol or symbols for a left-biased NFA and right-biased NFA respectively. The InChar input is evaluated against symbols 'S1' through 'Sn' using the symbol detection logic, block 400, where 'n' is an integer representing the number of symbols in the RE of the NFA. The choice of 'n' depends on how many states are typically expected for the NFAs of the applications that may use the search memory. Thus, 'n' may be chosen to be 8, 16, 32 or any other integer. The simplest operation for symbol detection may be a compare of the input symbol with 'S1' through 'Sn'. The output of the symbol detection logic is called the received symbol vector (RSV) comprised of individual detection signals 'RS1' through 'RSn'. LB/RB# is a signal that indicates if a left-biased NFA or a right-biased NFA is defined. LB/RB# is also used as an input in evaluating state transition. The STL for a state supports creation of a left-biased as well as right-biased NFA constructs. The LB/RB# signal controls whether the STL is realizing a left-biased or a right-biased construct. The state dependent vector in the form of 'V1' through 'Vn', is also applied as input to the STL. The SDV enables creation of arbitrary 'n'-state NFAs using STL as a basis for a state logic block illustrated in FIG. 4b. Present states are fed into STL as a current state vector (CSV) comprised of 'Q1' through 'Qn'. STL generates a signal 'N2' which gets updated in the state memory, block 402, on the next input clock signal. 'N1' is logically represented as N1=((V1 and Q1 and (LB/RB# OR RS1)) OR (V2 and Q2 and (LB/RB# OR RS2)) OR . . . (Vn and Qn and (LB/RB# OR RSn)) AND ((NOT LB/RB# OR RS1). Similar signal for another state 'n', would be generated with similar logic, except that the signal 401, feeding into the OR gate, 415, would be 'RSn', which is the output of the 'n'-th symbol detection logic, changing the last term of the node 'N1' logic from ((NOT LB/RB# OR RS1) to ((NOT LB/RB# OR RSn). The state memory, 402, can be implemented as a single bit flip-flop or a memory bit in the state logic block discussed below.

FIG. 4b illustrates a state logic block (SLB). The SLB comprises the STL, 406, Init logic, 408, state memory, 410, the accept state detect logic, 411, the SDV for this state, 407, start flag, 409, accept flag, 412, tag associated with this state, 419, or action associated with this state, 413 or a combination of the foregoing. The SLB receives current state vector and the received symbol vector which are fed to STL to determine the next state. The realization of a state of an arbitrary NFA can then be done by updating the SDV for the state and selecting the symbols that the NFA detects and takes actions on. Further, each state may get marked as a start state or an accept state or tagged NFA state or a combination or neither start or accept or tagged state through the start, tag and accept flags. The init logic block, 408, receives control signals that indicate if the state needs to be initialized from the start state or cleared or disabled from updates, or loaded directly with another state value, or may detect a counter value and decide to accept a transition or not and the like. The init block also detects if the FSA has received a symbol not recognized by the language of the regular expression and then may take the FSA into a predefined initial state to start processing the stream at the next symbol and not get into a state where it stops recognizing the stream. The Init block can be used to override the STL evaluation and set the state memory to active or inactive state. The STL, 406, provides functionality as illustrated in FIG. 4a, except that the state memory is included in the SLB as independent functional block, 410. The state memory, 410, can be implemented as a single bit flip-flop or a memory bit. When the state memory is set it indicates that the state is active otherwise the state is inactive. The accept detect logic, 411, detects if this state has been activated and if it is an accept state of the realized NFA. If the state is an accept state, and if this state is reached during the NFA evaluation, then the associated action is provided as an output of the SLB on the A1 signal, 416, and an accept state activation indicated on M1, 417. If the FSA reaches a state which is flagged as a tagged state using the tag flag, then the match detect logic may indicate a tag match, not illustrated, which another circuit can use to determine the action to be taken for the particular tag. The action could be set up to be output from the SLB on the state activation as an accept state as well as when the state is not an accept state, like a tagged state, as required by the implementation of the NFA. This can enable the SLB to be used for tagged NFA implementation where an action or tag action can be associated with a given transition into a state.

If there are 'n' states supported per FSA rule, then each SLB needs 'n'-bit SDV which can be stored as a n-bit memory location, 3-bits allocated to start, tag and accept flags, 1-bit for LB/RB#, m-bit action storage. Thus if n=16 and m=6, then the total storage used per SLB would be a 26-bit register equivalent which is a little less than 4 bytes per state. If tag start flag and tag end flags are supported, not illustrated, then the number of memory bits would be 28-bits. If multiple tagged expressions need to be enabled then the number of bits for tagging may be appropriately increased. When the number of states in a resulting FSA of a RE is more than 'n' supported by the FSA of PRISM, a mechanism is required that would allow the PRISM memory to support such rules. The patent of this application describes such a mechanism and an architecture for that as described below.

FIG. 5a illustrates State transition logic (STL) for a state in a left-biased FSA. This figure illustrates state transition logic for a state of an FSA when the logic illustrated above for FIG. 4a is simplified with the LB/RB# set to active and symbol detection logic for one of the states illustrated. The symbol bits are illustrated as 'm-bit' wide as $S_{1m} \ldots S_{11}$ illustrated in block 502. The input character symbol bits are labeled as $cIn_m \ldots cIn_1$, 501. The symbol detection logic illustrated in FIG. 4a, 400, is illustrated as individual bits labeled $E_m \ldots E_1$, 503, and is also referred to as symbol evaluation logic in this patent. The symbol dependent vector is labeled $V_{n1} \ldots V_{11}$, 504 which indicates the symbol dependent vector bit enabling transition into state 1 from each of the 'n' states that represent the CSV, $Q_n \ldots Q_1$, 509, of the FSA. RS1, 505, is the result of the evaluation of the input character symbol with one symbol of the FSA $S_{1m} \ldots S_{11}$ illustrated in block 502. The logic gates, 506 and 507, are NAND gates that form the logic function to generate the next state, Q1, based on the RS1, SDV, $V_{n1} \ldots V_{11}$, and CSV, $Q_n \ldots Q_1$. States $Q_n \ldots Q_2$ would be generated using similar circuit structure as the one illustrated in FIG. 5a, except the RSV bit SDV and the symbol specific to the particular state will be used. For example, for the generation of state $Q_n$ the Symbol would be $S_{nm} \ldots S_{n1}$, the SDV vector would be $V_{nm} \ldots V_{1n}$, and the RSV bit would be RSn instead of RS1.

FIG. 5b illustrates State transition logic (STL) for a state in a right-biased FSA. This figure illustrates state transition logic for a state when the logic illustrated above for FIG. 4a is simplified with the LB/RB# set to inactive state and symbol detection logic for one of the states illustrated. Key differences between the right biased FSA circuit illustrated in this figure and the left-biased FSA illustrated in FIG. 5a, is that the next state generation logic depends on all received symbol vector bits, RS1, 505, through RSn, 505n, which are the result of the evaluation of the input character symbol with each of the 'n' symbols of the FSA instead of only one RSV bit, RS1, 505, illustrated in FIG. 5a. The logic gates, 506a and 507b, represent the right-biased FSA logic function to generate the next state based on the RSV, RS1, 505, through RSn, 505n, SDV, $V_{n1} \ldots V_{11}$, and CSV, $Q_n \ldots Q_1$, States $Q_n \ldots Q_2$ would be generated using similar circuit structure as the one illustrated in FIG. 5b, except the SDV and the symbol specific to the particular state will be used. For example, for the generation of state $Q_n$ the Symbol would be $S_{nm} \ldots S_{n1}$, the SDV vector would be $V_{nm} \ldots V_{1n}$, and the RSV vector would be the same, RS1, 505, through RSn, 505n.

PRISM memory allows various elements of the FSA blocks to be programmable such that the compiler of this invention can accept a regular expression and compile it with information for various PRISM state elements to make the general purpose programmable state machine of PRISM FSA to implement the specific regular expression rule. The compiler can compile other rules and later replace the current rule with another rule in the same PRISM FSA or may use another PRISM FSA or a combination of the like.

FIG. 6A illustrates Right-biased Tagged NFA Rule block in PRISM. As discussed earlier the FSA of PRISM are optionally Tagged. For clarity, FSA rule block, PRISM FSA rule block, PRISM FSA rule memory block, rule block, rule memory block, are used interchangeably in this application. Further, NFA rule block or PRISM NFA rule block or NFA rule memory block, are also used interchangeably and mean a PRISM FSA rule block where the FSA type is an NFA in this patent. The discussion below is with respect to tagged NFA, though it is also applicable for non-tagged NFAs where the tagging elements, described below, are not used or not present. This figure illustrates state block 1, 601, which comprises of some elements of the state transition logic illustrated in FIG. 5b. The figure illustrates other state blocks, 602 and 603, that represent state blocks 2 through n, where 'n' is the number of states of the NFA. These blocks are illustrated without details unlike state block 1. The primary difference between the blocks is that each state block generates its own RSV bit and uses only its own state bit from the CSV. For instance state block 2, generates RS2 by evaluating the received character with the symbol programmed in its symbol logic block which is similar to block 502. The state blocks are organized slightly differently than the illustration in FIG. 5b. The logic for one state illustrated in FIG. 5b, is illustrated to be organized in a vertical slice like, 614, where each state block holds portion of the logic necessary to form the final state. In this illustration the state Qn, 508n is generated by processing the outputs from each state blocks' 'n'-th slice. The SDV vector bits held in each state block are for transition control from the specific state to all other states. For instance the blocks, like 504a, hold different members of the SDV vectors compared to the blocks, like 504. Thus the SDV for each state is distributed amongst multiple state blocks unlike that illustrated in FIG. 5b. For example state block 1, holds SDV vector bits $V_{1n}$, $V_{1(n-1)}$ through $V_{11}$ indicating state transition vector bits for transitioning out of state 1 to the 'n' states, unlike FIG. 5b which are transposed where the state transition logic for a state holds bits $V_{n1}$, $V_{(n-1)1}$ through $V_{11}$ for transition into state 1. The indices $V_{XY}$ indicate the state dependent vector bit that enables or disables transition from state X to state Y where each X and Y may have a range from 1 through n, where n is the number of states of the FSA. Thus the SDV of a state indicates the controls for enabling transitions from any state to itself as illustrated in 504, which indicates SDV transition controls from states n through 1 to state 1. As can be noticed the indices of the vector bits are reversed between the FIG. 5b and FIG. 6a. Thus a specific state's SDV is distributed in multiple state blocks and is illustrated aligned vertically like slice 614. This figure also illustrates the initialization logic, 408, illustrated in FIG. 4b as block 605 that affects what value gets loaded in the state memory bit, 508n, under different conditions like initialization, startup, error state, store and toad or context switch and the like. Thus SDV vectors for an FSA are written to the NFA block in a state transposed manner as described above. The initialization block comprises of initialization/start state vector memory bits. Thus the input into the init block, 605, is logically equivalent to the node N1b in FIG. 5b, adjusted for the appropriate state bit. The state control block, 604, comprises of the logic gates, 507a, which logically NANDs the partial state output, like 615, from the state blocks 1 through state block n. The state control block, 604, further comprises of the init logic blocks, like 605, and the state memory blocks, like 508. The NFA Ruse block also comprises of tagged match detect block, 613, which may optionally comprise of tagging elements for supporting tagged NFAs. The tagged match detect block comprises of Accept vector blocks, like 610, which comprise of accept vector memory bits and may optionally comprise of tag memory bits. The tagged match detect block further comprises of accept detect blocks, like 611, which comprise of accept state detection and may optionally comprise of tagged state or state transition detection logic. The state memory blocks, like 508, may be controlled be clock or enable or a combination signals to step the FSA amongst its states as new input characters are evaluated. The clocked enable signals may provide more control over simple clock by enabling when the FSA should be evaluated. For instance upon finding a match, the FSA controller, 802, described below may be programmed to hold further evaluation of any symbols for this FSA until the match information is processed. The NFA rule block generates multiple output signals that can be used to indicate the progress of the FSA. The NFA rule block outputs comprise of a Rule Match, 609, which indicates when the regular expression rule programmed in the NFA rule block is matched with characters of the input stream. The Rule Match signal may be used by the local or global priority encoder and evaluation processor, blocks 815 and 713 respectively described below, to decide on next steps to be taken based on user programmed actions and/or policies. The priority encoder and evaluation processors may optionally comprise of counters that may be triggered upon specific rule matches. The counters may be used for several purposes like statistical events monitoring, match location detection in the input stream and the like. The priority encoders may also decide the highest priority winner if multiple matches are triggered and then the output may be used to find the appropriate action associated with the matched regular expression rule. The NFA rule block output may optionally comprise of Tag Match signal(s) that may be used by the priority encoders and evaluation processors to detect partial regular expression matches. The number of tag match signals per NFA rule block may depend on the number of sub-expressions that are allowed to be detected in a given NFA. The NFA rule block is organized as a series of memory locations that each hold a portion of the NFA rule evaluation information using memory circuits like the SDV memory, Symbols memory, Mask vectors (discussed below) memory, initialization or start state vector memory, accept state vector memory, optionally tag state flag or vector memory, the NFA states memory or current state vector memory and the like. The NIA rule block comprises of NFA evaluation circuits interspersed amongst the memory blocks storing the NFA programmable information like the SDV, start state, accept state, symbols and the like. The NFA rule blocks evaluate multiple symbols against input stream for matches to step the FSA.

Each symbol evaluation block like 504, may optionally output an indication of a pattern comparison between the input character and the programmed symbol. These output signals, like 617, 615, 616, can be treated as local content addressable memory match signals. The PRISM memory may optionally support logic that enables generating merged CAM match signals from multiple NFA blocks to support larger width pattern matches. Thus the PRISM memory can be used as content addressable memory when enabled to process the CAM match signals. The PRISM memory can be optionally configured such that portions of the memory support CAM functionality while other portions may support FSA functionality or the entire PRISM memory may optionally be configured to behave like FSA memory or CAM memory. The CAM memories typically support functionality to detect 4 byte patterns, 18 byte patterns or even 144 byte patterns. PRISM memory may optionally provide configuration mechanisms to support similar large pattern evaluation by chaining multiple NFA rule blocks' CAM match signals using appropriate logic to generate composite CAM match signals for desired pattern width.

FIG. 68 illustrates Left-biased Tagged NFA Rule block in PRISM. As discussed earlier the FSA of PRISM are optionally Tagged. The discussion below is with respect to tagged NFA, though it is also applicable for non-tagged NFAs where the tagging elements, described below, are not used or not present, Left-biased NFA Rule blocks are similar in functionality as those discussed above for the Right-biased NFAs except for a few minor differences that enable the NFA rule block to behave as a Left-biased NFA. The state blocks, 601a, 602a, 603a, in the left-biased NFAs receive all RSV vector bits, like 505n, unlike a specific RSV bit per state block in the right-biased NFA. The input to NAND gates like 506b, is the specific RSV bit depending on the bit slice at the bit location in the state block of the NAND gate. Thus bit location 'p' where 'p' can range from 1 through 'n', uses RSp (Received Symbol Vector bit 'p') to generate the partial state block output, 615a. By making such a change in the blocks the NFA may now function as a left-biased NFA. The rest of the blocks perform similar functions as described above for a right-biased NFA.

PRISM memory may comprise of left-biased NFAs, right-biased NFAs or a combination of them or may be comprised as selectable left-biased or right-biased NFAs with logic similar to FIG. 4a. All such variations are within the scope of this invention, as may be appreciated by one with ordinary skill in the art.

FIG. 9 illustrates PRISM search compiler flow which is used for full and incremental rules distribution. For clarity the PRISM search compiler is also referred to as search compiler or compiler in this patent application and the terms are used interchangeably. The search compiler of FIG. 9 allows an IT manager or user to create and compile search and security rules of different types as illustrated by 901, 902 and 903, without limitations. Even though, the illustrated rules list primarily security type rules though there may be regular expression rules for any other application that needs content search like many applications listed in this patent application. The compiler flow would optionally be provided with information about the specific nodes or networked systems or otherwise that may use PRISM and the characteristics of these nodes, like the security capability, the rules communication method, the size of the rule base supported, the performance metrics of the node, deployment location e.g. LAN or SAN or WAN or other, or the like for specific security or network related search applications. The compiler flow may optionally use this knowledge to compile node specific rules from the rule set(s) created by the IT manager or the user. The compiler comprises a rules parser, block 904, for parsing the rules to be presented to the PRISM FSA Compiler Flow, block 906 illustrated further in FIG. 10, which analyzes the rules and creates rules database that needs to be programmed into PRISM memory of the specific nodes or systems for analyzing the content. The rules parser, block 904, also parses signature pattern rules like those for anti-virus solutions and presents them to the PRISM Signature Compiler Flow, block 911, illustrated further in FIG. 20, which analyzes the signature patterns or rules and creates a signature rules database that needs to be programmed into PRISM signature search engines for analyzing content. The rule parser may read the rules from files of rules or directly from the command line or a combination depending on the output of the rule engines like blocks 901, 902 and 903. The rules for a specific node are parsed to recognize the language specific tokens used to describe the signature pattern rules or regular expression tokens and outputs signature pattern rules, 910, or regular expression (RE) rules, 905. The parser then presents the REs to the PRISM FSA compiler flow which processes the REs and generates NFA for RE. Optionally if tagging is supported by the specific PRISM instance, and if REs use tagging, the PRISM FSA compiler then decides whether the RE will be processed as a NFA or tagged NFA based on the PRISM memory capability. It then generates the NFA or tNFA rule in a format loadable or programmable into PRISM memory and stores the database in the compiled rules database storage, 908.

Rules distribution engine, block 909, then communicates the rules to specific system or systems that comprise of PRISM memory. The search rules targeted to specific systems may be distributed to a host processor or a control processor or other processor of the system that comprises PRISM memory. A software or hardware on the receiving processor may then optionally communicate the rules to the PRISM memory by communicating with the bus interface, block 702, and the PRISM controller, block 703, described below to configure and/or program the PRISM memory with the FSA rules and signature search engines with signature rules. The Rules distribution engine, 909, may optionally communicate directly with the PRISM controller through the bus interface block, block 702, if the bus interface and PRISM controller optionally support such functionality. The rules may be distributed using a secure link or insecure link using proprietary or standard protocols as appropriate per the specific node's capability over a network.

FIG. 7 illustrates PRISM block diagram. As may be appreciated by one with ordinary skill in the art, that many different variations of these blocks and their configuration, organization and the like can be created from the teachings of this patent and are all covered without limitations. PRISM controller, block 703, communicates with the rules distribution engine, block 909, or with a master processor or a companion processor like a host system microprocessor or a control processor or a network processor or a switch processor or an ASIC based controller or processor or the like to receive appropriate compiled rule tables prior to starting the content inspection. It programs the received rules into the appropriate PRISM NFA rule blocks, described earlier, by working with the address decode and control logic block 704, coupled to the PRISM controller, block 703, and the PRISM memory cluster arrays, block 710. The PRISM controller, 703, also programs signature rules that need to be searched by signature search engines, 722, to signature search engines, 722 and signature rules that need to be searched as FSA rules to the NFA rule memory blocks in PRISM PSE arrays. There may be multiple rules being stored in each PRISM memory cluster array NFA search blocks. There may optionally be multiple application specific contexts, not illustrated, supported by the PRISM memory cluster arrays. Once the rules distribution engine provides the compiled rules to the control processor and scheduler and they are setup in their respective NFA rule blocks, PRISM memory is ready to start processing the data stream to perform content inspection. The PRISM memory state configuration information is received via the bus interface block, 702, which may communicate on a system bus or a network or the like with a master processor or companion processor, not illustrated. The PRISM memory of this patent may be deployed in various configurations like a look-aside configuration or flow-through configuration or an accelerator adapter configuration or may be embedded inside variety of processors or logic or ASICs or FPGA or the like as discussed earlier as well others not illustrated. In a look-aside or an accelerator adapter configuration, the PRISM memory is under control of a master processor which may be a network processor or a switch processor or a TCP/IP processor or classification processor or forwarding processor or a host processor or a microprocessor or the like depending on the system in which such a card would reside. The PRISM controller, 703, receives the configuration information under the control of such master processor that communicates with the rule engine to receive the configuration information and communicates it on to the PRISM memory. Once the configuration is done, the master processor provides packets or data files or content to the PRISM memory for which content inspection needs to be done. The bus interface, 702, used to communicate with a master processor may be standard buses tike PCI, PCI-X, PCI express, Processor Direct Connect bus, RapidIO, HyperTransport or LA-1 or DDR or RDRAM or SRAM memory interface or SPI4 or Interlaken Protocol or their derivatives or internal processor bus or the like or a proprietary bus. The bandwidth on the bus should be sufficient to keep the content search memory operating at its peak line rate to fully utilize the capability of PRISM, however a tower bandwidth bus or higher bandwidth bus may be used as well. If a lower bandwidth bus is used the total throughput may not be higher than the bus throughput. When a higher throughput bus is utilized, the bus interface may need to stall the bus or drop some packets, or the like and process the content at the maximum bandwidth supported by that implementation of PRISM. The PRISM memory may preferably be a memory mapped or may optionally be an to mapped device in the master processor space for it to receive the content and other configuration information in a look-aside or accelerator configuration. PRISM memory optionally may be polled by the master processor or may provide a doorbell or interrupt mechanism to the master to indicate when it is done with a given packet or content or when it finds a content match to the programmed rules.

The PRISM controller receives incoming data for examination using regular expression rules or for examination using patterns to be matched, and may optionally store them into data buffer/memory, block 707, before presenting it to the PRISM memory cluster arrays, 710 and signature search engines, 722. The PRISM memory may optionally directly stream the content to be examined to the content stream logic, block 708, which may stage the content for examination by the PRISM memory cluster arrays, block 710 and signature search engines, 722. The PRISM controller maintains the record of the content being processed and once the content is processed it informs the master processor. The PRISM memory cluster arrays inform the global priority encoder and evaluation processor, block 713, of the results of the search. When a match to a rule is found the priority encoder and evaluation processor may retrieve an action associated with the rule from the global action memory, block 717, depending on programmable policies and may optionally provide this to the PRISM controller. The PRISM controller may optionally inform the master processor about the search results. The PRISM controller may execute the specific action or policy defined for the rule match. The actions may optionally comprise to stop further content evaluation, enable a certain set of rules to be examined by enabling appropriate cluster array and pass the content through that PRISM memory cluster array for further examination, or inform the master processor of the result and continue further examination or hold the match result in on-chip or off-chip memory or buffers for the master processor to request this information later or any combination thereof or the like. If the PRISM memory is configured to examine network traffic in a flow-through configuration, not illustrated, it may also be programmed to drop the offending packet or stop the specific TCP connection or the session or the like. Optionally the master processor may receive the match information and may take specific actions on the content stream.

The address decode and control logic, block 704, is coupled to the PRISM controller, 703, the bus interface, 702, the PRISM memory duster arrays, 710, the global priority encoder and evaluation processor, 713, the database expansion port, 718 as well as other blocks through a coupling interface, 715. The PRISM memory may support a large number of regular expressions in some preferred embodiments as discussed above, however if there are applications that need more rules, then there may optionally be a database expansion port, 718, which would enable the expansion of the rules by adding additional PRISM memory(ies) to the database expansion port. The database expansion port may provide a seamless extension of the number of rules and may use additional memory space in the host or master processor. There are multiple ways of enabling the database expansion as may be appreciated by those with ordinary skill in the art. The address decode and control logic is also coupled to optional, cluster address decode and FSA controller, block 802, and decodes addresses for the PRISM memory locations which are used to hold FSA rule block programming information as well as the FSA state information. It may perform the address decode, memory read, memory write and other PRISM memory management control functions by itself or working in conjunction with cluster address decode and FSA controller. The blocks 704 and optionally 802, may be programmed to provide configuration information for the clusters. The configuration information may optionally comprise of size of the NFAs e.g. 8-state or 16-state or the like, CAM functionality enabling, tagged NFA related configuration, context addresses if appropriate for local cluster context addressing and/or global context addresses, clusters specific configurations that may support a mixed CAM and Regular Expression functionality at the PRISM memory level, action memory association for specific FSA rules or clusters or a combination thereof and the like. The PRISM memory cluster arrays and other blocks like global and local priority encoder and evaluation processor, blocks 713 and 815, local (not illustrated) and global action memories, block 717, and the like may get configured and programmed with information before the content inspection begins. Further, since PRISM memory supports dynamic reconfiguration of rules, its programming and configuration may be updated during the content inspection as well for example when a new security threat has been discovered and a new rule to catch that security violation needs to be programmed. The PRISM memory may provide multiple content streams to be processed through the PRISM memory cluster arrays, using context mechanism which associates each content stream with a specific context, which may optionally be assigned a specific context ID.

FIG. 7b illustrates PRISM Memory Cluster (PMC) Array. The PRISM Memory Cluster Array comprises of an array of PRISM Memory clusters, illustrated and described below, which further comprise of PRISM Search Engines (PSEs) which are also referred to as NFA rule blocks or NFA memory rule blocks or NFA rule memory blocks or the like in this patent. In one preferred embodiment the PMC Array may comprise of 128 PRISM Memory clusters, arranged in 8 rows and 16 columns where each PMC may comprise of 1024 PSEs, each providing 10 Gbps content search performance, and providing a capacity of over 128,000 rules being searched at 10 Gbps. Today's applications like intrusion detection or application layer security rules processing comprise of an equivalent of around 4000 to 5000 8-char RE rules. Thus the total number of RE rules available in this preferred embodiment can support a large number of such applications for security processing or search processing or the like. The packet stream controller, block 726, presents the content to be searched to the PMCs after the address decode and control logic, block 704, programs configuration information and compiled PRISM RE rules in the PRISM memory clusters, block 705(11) through 705(nm). A packet header or content or other information data or the like to be searched is held in the content staging buffer, block 709, from where it may be retrieved by the packet stream controller, 726. The packet stream controller presents the packet or data or content or the like to be examined to each of the PRISM memory clusters, 705(11) through 705(nm), on buses like 724(1) through 724(m). The results of the examination or search by the PMC are presented to the Global priority encoder and evaluation processor on the buses, 711(1) through 711(n), which determines if there is any rule match and if so which rule has matched. It may then communicate the results of the match to the PRISM controller, 703, or a master controller of PRISM or the like as described in this patent. The buses 725(1) through 725(n) may be used to save and restore specific PMC context during context switch. Although the buses, 724(1) through 724(m) are illustrated to couple the packet stream controller to the first row of PMCs, 705(11) through 705(1m), they may optionally run through all the PMCs and couple the packet stream controller to all PMCs. The packet stream controller may present each PMC with the same content or packet or data or the like to examine. However, the packet stream controller may also present different packets or content or the like on each of the busses, 724(1) through 724(m). If all the PMCs in a horizontal row, like 705(11) through 705(1m) where m=16 in one preferred embodiment, are programmed with the same rules and if an application like intrusion detection and prevention system (IDS/IPS) application with around 4000 rules which can fit in PMCs in one vertical column like 728(1) comprising PMCs, like 705(11) through 705(1m) where n=8 in this embodiment which provide 8095 RE rules between 8 PMCs with 1024 PSEs each, then for this embodiment 16 times 10 Gbps (or 160 Gbps) content search performance can be achieved. In this embodiment, each vertical column of PMCs are programmed with the same application rules which are then applied to packets or data or flows or content or the like presented to the PMCs in that column. Thus for the embodiment above, there can be 16 columns of PMCs providing IDS/IPS rules which may be repeated in each column of PMCs as described above. Under such a configuration it is feasible to achieve content search performance of well over 100 Gbps as discussed above when each of the PMC column examines content at 10 Gbps against the rules programmed, which is very feasible with integrated circuits designed with today's process technologies like 90 nm, 65 nm and beyond. Each PSE can be designed to easily process content at 2.5 Gbps or 5 Gbps using integrated circuit chips made in today's silicon process technology. Coupling two PSE to achieve 10 Gbps per coupled PSE is enabled in PRISM Memory Clusters under the control of the Cluster search control, block 807, and Cluster Address decode and FSA controller, block 802, discussed below. Thus each PMC can readily enable 10 Gbps content search performance as discussed above. For PRISM chip to be able to fully realize the content search performance of over 100 Gbps, PRISM chip is designed with multiple 10 Gbps bus interfaces or higher line rate bus interfaces to be able to bring in the 100 Gbps of data or content or packet traffic to be able to keep the PRISM search engines busy at their peak performance. Thus various blocks illustrated in FIG. 7 like the bus interface 702, the PRISM controller 703, Address decode and control logic 704, the global priority encoder and evaluation processor 713, and the like are designed to handle the appropriate traffic throughput as may be appreciated by one with ordinary skill in the art.

Further PRISM memory cluster array comprises of power control signal buses, like 737(1) through 737(n), which may be used to control which PMC or PMCs are operational when content for a specific type of traffic or flow or packet or the like is being examined. The power control signal buses 737(1) through 737(n), may optionally be coupled to the clocks or other control signals of all the PMCs and individually control which PMCs are active and which PMCs are in a power down mode of operation. For example, if all PMCs in column 728(1) are programmed with rules to perform anti-spam regular expression searches, while PMCs in other columns are programmed for other applications like XML rule processing or the like, then if a received packet or content is an email that needs to be examined against anti-spam rules, the PMCs in column 728(1) can be turned active by the power control signals, 737(1) through 737(n), however all the other PMCs can be turned to a power down mode by their respective control signals from the power control signal buses, 737(1) through 737(n). Hence, while the email is being examined for anti-spam rules, all other PMCs do not use power and can significantly reduce the power consumption of PRISM integrated circuit chip.

To operate the PRISM integrated circuit chip at the desired frequency, the right level of repeaters or buffers or the like may be used as appropriate for the silicon process technology used, the desired operating frequency as may be obvious to one with ordinary skill in the art. The clocks, power, reset, buffers, repeaters and the like needed to design such a PRISM IC are not illustrated so as to not obscure the invention and would be obvious to one with ordinary skill in the art.

FIG. 8a illustrates PRISM Memory cluster block diagram. There may be options to have multiple content streams and hence multiple contexts may optionally be simultaneously operated upon in different memory FSA clusters, illustrated in FIG. 8a. For clarity, PRISM Memory cluster, memory FSA cluster, a cluster, memory cluster and memory FSA cluster are used interchangeably in this patent. A given cluster and its associated FSAs may also be able to support multiple content streams using the context information. When a new content stream starts getting processed by a FSA rule block or a cluster or the like, it may traverse through various FSAs whose states may need to be saved, if the content stream is not fully processed, when the same FSAs need to start processing another content stream. The local context memory, block 812, or global context memory, block 712, or external memory (not illustrated) coupled to external memory controller, block 1221, or a combination thereof may be used to save the state of active FSAs for a given context before the FSAs are switched to operate on a different context. Further, the new context may have its saved context restored in the specific FSAs before content from that context starts to be processed. The local context memory along with global context memory affords the benefit of very fast context switching for active contexts simultaneously across multiple clusters and FSAs without creating a context switch bottleneck. The number of contexts being store locally per cluster and those stored globally or externally is a function of the manufacturing cost and other tradeoffs which will be apparent to the one with ordinary skill in the art. Typically the amount of information that needs to be stored and retrieved per context may be limited to the NFAs that are in the process of recognizing a specific string defined by its regular expression. In general most NFAs may be continuously be starting to analyze the input streams from a start state if the strings being searched are not very frequent in the content being search. The FSA controller, block 802, coupled with blocks 704, and the local and global context memories and their respective memory controllers as well as the blocks 713 and 815, the local priority encoder and evaluation processor, takes the steps to perform the context switch if contexts are enabled before processing a new context.

The cluster address decode and FSA controller, block 802, may decode incoming addresses for configuring, reading or writing from PRISM memory locations or the like of the cluster PRISM array, block 808 which is comprised of an array of PRISM NFA rule blocks illustrated above in FIG. 6A and FIG. 6B, and also referred to as PRISM Search Engines (PSE), block 803, in this patent, and activates memory location's word line and/or bit lines or other word lines or content lines or mask times or the like or a combination thereof, described below to read, write and/or access the specific PRISM memory location. There may optionally be cluster specific bit line drivers and sense amplifiers, block 809, and bit line control logic, block 810, which may be used to read or write specific bits in the PRISM cluster memory array, block 808. These circuits are well understood by memory designers with ordinary skill in the art. The sense amplifiers and drivers may optionally be present at the global PRISM memory level illustrated in FIG. 7 depending on the tradeoffs of die area, performance, cost, power and the like which one with ordinary skill in the art can easily appreciate. The benefit of having local sense amps and drivers is potentially creating lower interconnect toad for individual memory bits, which in turn can help improve the performance. Typically the block 802 may be operating during the configuration, context switching or other maintenance operations like storing and retrieving specific NFA state information, or refreshing specific PRISM FSA memory bits if appropriate and the like. Generally during content processing the block 802 may be dormant unless there is a match or an error or the like when it may start performing the necessary tasks like communicating the match, action, policy, error or the like to the PRISM controller, initiating context switching and the like. The PRISM controller, block 703, coupled with the content stream logic, block 708, content staging buffer 709, address decode and control logic, block 704, and the cluster FSA controllers, block 802, may present the content to be examined to the PRISM NFA rule blocks. The content to be examined may be streamed by the block 708 from the data buffer or memory, 707, or from external memory, or a combination into the content staging buffer. The content staging buffer, 709, is coupled to cluster search buffer, 806, and cluster search control, 807 to align the appropriate content to the clusters for searching. The content staging buffer may hold content from the same context or multiple contexts depending on the configuration of the clusters and the like. The content is presented to the cluster PRISM array, 808, that comprises of the PRISM NFA rule blocks for examination in a sequence timed using a control signal like a clock or enable or a combination. The NFA rule blocks perform their inspection and indicate whether there is any rule match or optionally if there is any CAM pattern match or optionally any tag match and the like. The match signals are looked at by cluster level local priority encoder and evaluation processor, block 815, which may determine if there is a match and if there are multiple matches which match should be used, or all matches should be used or the like depending on the configuration. This block 815, may be coupled to global priority encoder and evaluation processor, block 713, which may perform a similar operation by examining match signals from multiple clusters. The local and global evaluation processors of these blocks may optionally generate address(es) for the winning match(es) to the global action memory or external memory or a combination that may store appropriate action information that needs to be retrieved and processed to determine action(s) that need to be taken as a result of specific rule match(es). There may be optional cluster level action memory, not illustrated, for fast retrieval of action information. This cluster level action memory may act as a cache of the global and/or external memory based action storage. As described earlier the FSA controller, block 802, coupled with local context memory, block 812, its memory controller, block 813, along with the local and global evaluation processor and priority encoders coupled to global action and context memories, may be used to store and retrieve context information from and to configure the PRISM cluster arrays with appropriate FSA states.

FIG. 8b illustrates PRISM Memory cluster detailed block diagram. This figure illustrates more details of the PRISM memory cluster block diagram illustrated in FIG. 8a and described above. The PRISM clusters comprise of PRISM Search Engines (PSE), blocks 803, which comprise the right-biased or left-biased or a combination thereof NFA rule blocks which may optionally be tagged as illustrated in FIG. 6A and FIG. 68 and described above. The PSEs may optionally comprise row-wise, column-wise or a combination there of or the like mechanisms described below to enable PRISM FSA extension and optionally allow creation of PRISM based FSA rule groups. The FIG. 8b illustrates the PSEs arranged in an array with 'n' rows and 'm' columns where 'n' and 'm' may be any integer value and may depend on design, cost, process technology, performance, power and other parameters that one with ordinary skill in the art will appreciate. One exemplary embodiment may comprise of 'n=128' and 'm=8' providing 1024 PSEs per PRISM cluster. The PSEs may optionally comprise of mechanisms for extending the ESAs using methods described below. The PSEs may comprise row-wise FSA extension, column-wise USA extension or a combination thereof. The PSEs are coupled to each other and may optionally be coupled to the local priority encoder and evaluation processor, block 815, for row-wise FSA extension using one or more signals, illustrated by lines 821(1) through 821 (*n*). The PSEs may also be coupled to each other in a column-wise manner using one or more signals represented as a group of lines, 820 (21) through **820(*nm*), coupling PSEs to their column-wise neighbors. Such signals may be used to provide a column-wise FSA extension using mechanism and architecture described below. The PRISM memory cluster priority encoder and evaluation processor, block 818, may further comprise configurable controls that would allow any group of extensible FSAs to be coupled to other groups of FSAs local to the PRISM memory cluster or inter-clusters (i.e. between multiple PRISM memory clusters) or a combination thereof. Cluster Address Decode and FSA Controller, block 802, provides controls, 804(1) through 804(*n*) like wordline address and the like for each PSE and its internal memory elements like the SDV, Symbols and the like which are used to configure the PSEs with appropriate RE rules converted or compiled in to programmable FSA data structures. It may also be coupled to the cluster search controller, block 807, and sense amps and read buffers, block 819. The cluster search controller may receive the byte values to be configured into the PSEs and may comprise the bit line drivers for the PSE memories. The sense amps and read buffers may comprise the sense amplifiers and data read buffers to read and store the information retrieved from the PSE array. Once the PRISM memory clusters are configured with the RE rules, the content to be processed may be presented to the cluster search controllers. The cluster search controller, block 817, is coupled to the columns of PSEs using signals, 822(1) through 822(*m*), that may comprise bit lines for each of the 'm' columns of the PSE array. The cluster search controller may present the same content symbols or characters or bytes or the like, to each column of the array such that every FSA can process each incoming symbol and be evaluated simultaneously. However, if the PRISM cluster is configured to be used as content addressable memory, the content search controller may present the content in chunks of 'm' symbols or chunks of two 'm2' symbols or the like to the PSE array. The PSEs provide the indication of whether a match with the programmed rule is detected or not or if a tag is matched or not or the like in a row-wise manner to the local priority encoder and the evaluation processor, block 815, using the signals, 811(1) through 811(*n*), that couple the PSEs in a row with the block 815. The local priority encoder and evaluation processor may receive the match signals and based on optional policy programmed, provide the winning match if multiple match signals are asserted simultaneously or may record each match or a combination. It may also provide counters to keep track of the specific location in the incoming content stream where a match or a set of matches were generated. It may further provide actions associated to specific rules being activated and may comprise of stopping the processing of the specific content flow, or content stream or content session or the like, or generating an alert or activating a .new rule group or stopping a certain rule group from further examination or a combination there of or the like. It also communicates with the global priority encoder and evaluation processor, 713, to take appropriate actions similar to those described above. The content read into the read buffers of block 819, may be coupled to the local cluster context memory, 812, or global context memory, 712, or external memory controller, 721, through the signals 817, block 815, signal 814, signals 711 and signals 715 for storage to the appropriate memory location internal to the PRISM chip or an external memory coupled to the block 721 using the memory bus interface signals 720**.

Each PSE of a PRISM memory cluster may be addressed using one PRISM Memory location or a set of PRISM memory locations or a combination thereof. All internal memory elements of a PSE like the each state dependent symbol memory, mask vector memory, SDV memory, or the initialization vector memory and the like may each be mapped as individual memory locations in the PRISM memory address space or may each be addressable in a PSE address space once the PSE is selected from a PRISM memory address or the like as may be appreciated by one with ordinary skill in the art. One preferred embodiment may comprise of 22 PRISM Memory address bits where in the upper 17 address bits are used to select a specific PSE in an embodiment with 128,000 PSEs and the lower 5 address bits are used to select a specific memory element of the selected PSE as described above. Other variations of such an arrangement are within the scope and spirit of this invention as may be appreciated by one with ordinary skill in the art. The number of address bits allocated to select PSEs depends on the number of PSEs and the number of address bits allocated to select memory elements of a PSE depend on the number of memory elements in one PSE, which may in turn depend on the number of states per PSE, FSA extension mechanisms per PSE, symbol size and the like as may be appreciated by one with ordinary skill in the art. Further, a specific PSE within a cluster may be addressed or selected by PRISM memory cluster row address and a column address which would be derived from the PSE address bits. One preferred embodiment of PRISM memory with 128,000 PSEs may use 128 rows and 8 columns of PSEs per PRISM memory cluster, there by supporting 1024 PSEs per PRISM memory cluster. In such a PRISM memory embodiment, upper 7-bits of the 22-bits for PSE address may be allocated to select a specific PRISM memory cluster, and the next 10 bits of the PSE address may optionally be used to select a specific PSE in a PRISM memory cluster while the lower 5 bits may optionally be used to select a specific memory element of the selected PSE of the selected PRISM memory cluster. The 10-bit address for selecting a specific PSE of a PRISM memory cluster, may further be allocated such that upper 7-bits of that may be used as a PSE row address selection and the remaining 3-bits of the address used as a PSE column address selection. There are multiple other ways to perform the addressing of PRISM memory as may be appreciated by one with ordinary skill in the art and all such variations are within the spirit and scope of the teachings of this invention.

FIG. 11 illustrates PRISM row-wise FSA extension. The figure illustrates PRISM Search Engines as FSA 1, 1101 (1), FSA 2, 1101(2) through FSA M, 1101 (M), which may optionally be PSEs in a row of a PRISM cluster. The FSAs are similar to those illustrated in FIG. 6A and FIG. 6B with some additional blocks described below that enable the PRISM FSAs to become extensible. The State Blocks 1 through N, 1102 (1) through 1102 (N) are similar to state blocks 601, 602, 603 of the left-biased or right-biased tagged NFAs or FSAs described above. The State Control and Match detect blocks, 1105(1) through 1105(N) and 1106(1) through 1106 (N), are also similar in functionality to state control, block 604, and match detect, block 613, described above for FIG. 6A and FIG. 6B, with some minor addition to accept another term of partial state transition control feeding into the transition logic illustrated in block 507a or 507n or the like. The additional state transition control is based on a global state transition described below. Row-wise FSA Extension architecture in PRISM comprises of a Global State Dependent Vector (GSDV), block 1103(1) through 1103 (N). It may optionally comprise of a Global Control Vector (GCV), blocks 1107 (1) through 1107 (N), and may optionally comprise of a Global Transition Logic (GTL), blocks 1108(1) through 1108(N). They may optionally be coupled to the state transition logic of each FSA being extended using a Global Control Network (GCN) which may comprise of multiple circuits like those illustrated by blocks 1113, 1114, 1115, 1116, 1121, 1122, 1123, 1124, 1104(1) through 1104 (N) per FSA block or the like or a combination thereof. The GSDV may optionally be an N-bit Vector, where each bit of the vector may enable a transition into the corresponding state of the FSA. It is possible to restrict the number of Global entry points into an FSA, in which case the GSDV may be a vector with fewer than N-bits corresponding to the states that may be entered from other FSAs using the FSA extension mechanisms described in this patent. Similarly GCV and GTL may also be N-bit vectors or vectors with fewer bits. The decision to use N-bits or less bits for these vectors may depend on the RE characteristics, application requirements, device size, implementation costs and the like as will be apparent to those with ordinary skill in the art. The GSDV and GCV vectors are memory locations and realized using memory circuits similar to other memory bit vectors like SDV, Symbols, the mask vectors and the like of this patent as may be appreciated by one with ordinary skill in the art. The specific memory bits circuits are not illustrated to avoid obscuring the invention. When a bit of GSDV is set to '1' or an active state, the input to the logic gate, like 1104 (1), from GSDV is set and would then enable a transition to the corresponding state if symbol associated with that state is received like RS11, and the state from another FSA that controls the extended FSA state transition is set to '1' or active state. Descriptions below illustrate a few examples to clarify the GSDV controls. Thus the GSDV controls the transition into a particular state of the associated FSA from another FSA. Similarly GCV, controls the transition out of a specific state of an FSA to another FSA that is coupled to it using the FSA extension mechanisms described in this patent. When a GCV vector bit, like 1107 (1) is set to an active state like '1', and if the corresponding state 1106(1) of the FSA, 1101(1) is set, then the GTL logic, 1108(1) would be activated. FIG. 11 illustrates a pre-charge and discharge circuit forming a wired-NOR logic between the GTL blocks of the FSAs coupled to form row-wise FSA extension. For example, the GTL blocks like 1108 (1) of each of the coupled FSA is coupled to a precharge line like 1109, 1110, 1111, 1112 or the like, which are precharged by transistors like 1113, 1114, 1115, 1116 or the like. When any of the GTL receives its inputs like 1125(1) and 1126(1) as active, it pulls the coupled precharge line 1109 to a low value. When none of the GTL outputs pull the precharge lines like 1109, they stay at their precharged high value that has been precharged by the corresponding precharge transistor like 1113. The output of the precharged signals may optionally be buffered or inverted as illustrated by inverters like 1121, through 1124 which then drive those signals to all the FSAs coupled to the output signals, like 1117 through 1120, of the inverters with the corresponding FSA gates like, 1104(1) through 1104 (N). Hence when signal 1109 is pulled low, the output 1117 may be pulled high. Thus if the GSDV bit connected to the device, 1104(N) of an FSA is high and the received symbol is RSn1, the transition into that state is enabled. Although the figure illustrates the precharge signals, like 1109, to be coupled to inverters, like 1121 they may optionally be coupled to a multiplexer input, not illustrated, such that another input of the multiplexer may be used to control whether the value on the signals, like 1117, is from the local FSA group or from an input state external to the FSA group, not illustrated. Such a multiplexer or other logic or a combination may be used to create a rule group transition control network, where a rule group may be enabled when another event is detected by other PRISM FSAs or PRISM clusters.

FIG. 11A illustrates PRISM Rule Group FSA Extension. PRISM memory of this patent may optionally allow formation of a group of REs to be treated as a rule group, such that one group of REs may be enabled when another RE or RE group is evaluated to be active. This figure illustrates a mechanism to enable such rule group FSA extensions. The Ruse group architecture leverages all the features of the Row-Wise FSA Extension logic described above, with a small modification, where the inverters, 1121 through 1124, are replaced by Rule Group Transition Logic (RGTL), block 1128, which enables the transition to a set of FSAs from other Rows of PRISM cluster or other PRISM clusters. The Rule Group FSA Extension architecture further comprises of Rule Group Control Vector (RCV), 1126, which may be an N-bit vector or the same width as the width of the GTL of each FSA. When a bit of RCV is set, then the corresponding output signal in the group, 1127, is set which in turn may let the corresponding output signal, like 1117, of the RGTL block be coupled to a corresponding signal of External State Vector (ESV), line 1125 instead of the Row-wise FSA Extension precharge signal, like 1109. The ESV bits may be state output from a group of rules within the PRISM Cluster or another PRISM cluster. When such a group's state that indicates a transition to another rule group is activated, the global evaluation processor, block 713, or the local evaluation processor block 815, or a combination couple that state signal to the corresponding ESV bit which then enables the transition to the state enabled by the output of the RGTL. Optionally the PRISM local evaluation processor, block 815, or global evaluation processor, block 713, or PRISM controller, block 703, may set the appropriate ESV bits to cause the rule group to be activated. ESVs for various rule groups may be memory mapped such that by writing to such an ESV memory location a specific rule group may be activated. When a rule group transition like the one described here is enabled, the corresponding Symbol detection could optionally be ignored by setting the mask bits for that specific symbol, or the like, such that the rule group is activated once the corresponding ESV bit is asserted. Another output of the RGTL, may be ESV_out, signal 1129, which may be the outputs of this rule group that can be used to trigger transition into a state of another rule group. The ESV_out may be an N-bit or less vector as an output from RGTL which may optionally comprise an internal RCV_out vector, not illustrated, that may control which state bits are enabled on to ESV_out from this rule group. The RGTL may comprise a simple multiplexer based logic circuits, but may also comprise a mesh network connecting each precharge input or ESV input to the output or a combination there of or the like.

Although the description here and elsewhere within this patent may be with regards to precharge circuits, it will be appreciated by those with ordinary skill in the art that other non-precharge circuits or logic may be used to realize the same functionality and all such variations are within the scope and spirit of the teachings of this patent.

FIG. 12 illustrates PRISM Row-wise FSA extension example #1. The FSAs in FIG. 12 are assumed to be four state FSAs. Thus if a RE has more than four states it would not fit in a single FSA or PSE. In such a case FSA extension architecture and mechanisms described in this patent will need to be used. FIG. 12 illustrates a PRISM row with Four FSAs, FSA1, through FSA4, blocks 1201(1) through 1201(4), each with four states that can be used to represent a 16-state RE 'abcdefghijkLmnop' using the row-wise FSA extension. In this example, the RE is a simple 16-character string which is split up into four chunks of four characters each by the compiler and assigned each chunk to one of the FSAs. The states of each FSA state bits are illustrated to represent a specific symbol or character like 1202 (1) which is used to represent the state corresponding to the symbol 'a'. This state bit is set when the received input symbol is an 'a'. The value of the state bit is represented as the symbol in the description below for ease of explanation and would otherwise be a logical value like '1' or '0' or the like. The symbol 'a' is the start state indicated by the single circle around the symbol, 1202(1). Thus when the input content has a symbol 'a' the RE rule or FSA starts the evaluation of the content and enters the state 'a'. The figure does not illustrate the SDV for each of the states and the FSAs to avoid obscuring the description of the FSA extension as may be appreciated by those with ordinary skill in the art. The SDVs, symbols and other controls of the FSA 1, block 1201(1) are set such that the state transition within the FSA progresses from a to b to c to d, if a series of input symbols received is 'abcd'. Similarly, for FSA 2, block 1201 (2) through FSA 4, block 1201 (4) the internal transitions are implied and not explicitly illustrated. The FSA extension is created by setting the GSDV and GCV such that the sequence of states that are enabled detect the desired RE string 'abcdefghijkLmnop'. The GCV vector bit 4, 1203 (4) of FSA 1 is set to '1' while its other bits are set to '0'. Thus when the FSA 1 reaches the state 'd', block 1202 (4), the GTL bit 4, 1210, is pulled low, which indicates that the FSA 1 has reached a state that can now enable a transition to a state in another FSA. The GSDV bit 1, block 1214, of FSA 2, block 1201 (2) is set to '1' which enables the transition into state 'e', block 1218, when the received symbol is RS12 ('e') and the line 1204, coupled to the third input of NAND gate, 1217, through the inverter coupled to 1204 is activated. If the input string received so far is 'abcde' then the state 'e' of FSA 2 is activated. However, if the fifth character of the input string is not an 'e', the FSA 1 state 'd' is deactivated and thus even if the following symbol i.e. the sixth symbol is an 'e', the FSA 2 state 'e' is not activated. Assuming that the string received is 'abcde', then the state 'e' is activated. FSA 2 traverses through the states 'fgh' if the following three symbols received are 'fgh'. As may be noted in this illustration, the states are not sequentially arranged, for example the state 'h' appears as the third state, block 1208, instead of the fourth state in FSA 2. To enable such organization of the states, the SDV of the state "h" of FSA 2 is setup such that state 'h' is logically the fourth state that is entered after state 'g' is activated, where state 'g' is the third logical state entered from state 'f', setup to depend on state 'f' in SDV of state 'g'. Thus physical location of the symbol is not required to be in a sequential order because the state transition in PRISM depends on the current state, the received symbol and the state dependent vector. Similarly, the state 'h' of FSA 2 is coupled to state 'i' of FSA 3 using GCV bit 3, 1207, GTL bit 3, 1209, and signal 1205, coupled to the GSDV bit 2, 1215, coupled to the transition input gate for the state 'i' of FSA 3, 1201 (3). Similarly the state 'L' of FSA 3 is coupled to state 'm' of FSA 4 using the appropriate GCV and GSDV bits as illustrated. When the state 'p' of FSA 4 is reached, the RE is matched and the input string is recognized to be 'abcdefghijkLmnop'. The state 'p' is marked as the accept state by the compiler, illustrated by double circles, 1219, such that accept vector of the FSA 4 is set as '0100', so that 'p' is the accept state. When the accept state 'p' is reached a match signal, like 609, of FSA 4 is asserted which is then recognized by the cluster priority encoder, block 815, and a RE match is flagged and appropriate action associated with this RE match taken or initiated.

FIG. 13 illustrates PRISM Row-wise FSA Extension example #2. In this illustration, similar to that in FIG. 12, the FSAs are assumed to be four state FSAs. However the regular expression rule to be evaluated is: (abc|defghi)+jkL, which recognizes a string of characters that contain one or more occurrences of sequences 'abc' or 'defghi' followed by the sequence 'jkL', Note the one or more occurrences of sequence 'abc' followed by 'defghi' which is followed by 'jKL' once or one or more occurrence of sequence 'defghi' followed by 'abc' which is followed by 'jKL' may also be recognized by the regular expression. The expression (abc|defhi)+ indicates that the terms 'abc' or 'defghi' may occur one or more times or may occur one after the other one or more times. The FIG. 13 illustrates how such a RE be evaluated using a Row-wise FSA extension architecture and mechanisms of this patent. In this expression, whenever the states 'c' or 'i' are reached, the expression can start evaluating at states 'a', 'd' or 'j', since they are all the follow states of the states 'c' and 'i'. To enable such a transition the compiler assigns GCV vectors of FSA 1 and FSA 3 to be '0001', such that when state 'c' is reached, signal 1302 is coupled to precharged signal 1314, or when the state 'i' is reached, signal 1304, is coupled to precharged signal 1316, which is coupled to line 1314. These outputs are then coupled to the states 'a', 'd' and 'j' by the GSDV vectors for FSA 1, FSA 2 and FSA 4 where the bits, 1305, 1308 and 1312 are each set to '1' enabling a transition into the states 'a', 'd' and 'j' from the states 'c' or 'i'. The expression 'defghi' is compiled to occupy two FSAs, FSA2 and FSA3, which are coupled by the GCV and GSDV bits that couple the output 1315 from the state location 'g' of FSA 2 to input gate, 1310, which transitions into state 'h' when the received symbol is 'h' since the GSDV bit 2, block 1309, is set to '1'. When the FSA 4 reaches the state L, which is marked as an accept state the FSA 4 asserts the match signal like 609, which is then recognized by the cluster priority encoder, block 815, and a RE match is flagged and appropriate action associated with this RE match taken or initiated.

FIG. 14 illustrates PRISM Column-wise FSA extension. The figure illustrates a group of four FSAs on the left where each FSA is in one row. Each FSA is illustrated to comprise of eight states where each state and its state transition logic, match detection logic and the like is represented by a box each, like 1401(1) through 1401(8). The FSA state bits are illustrated to be aligned in columns labeled Bit 1 through Bit 8. Each state bit of an FSA is illustrated to be coupled to its neighbor using up and down control switches illustrated as lines 1403 (1), 1403 (2) and the like. Blocks 1404 (1), 1404 (2), 1405 (1) and 1405 (2) illustrate FSA state bits 1 and 2 of two FSAs, FSA 1 and FSA 2 illustrating the column-wise FSA extension architecture in detail and mechanism and do not illustrate all other components of PSE state like the RSV, SDV and the like. The state bits of adjoining FSA rows are coupled to transfer their state information to the neighbor in a column-wise manner. FSA bits 1 are illustrated to transfer the state information in the down direction from block 1404 (1) to block 1404 (2), while the FSA bits 2 are illustrated to transfer the state information in the up direction from block 1405 (2) to block 1405 (1). Each FSA state bit may comprise of both up and down transfer mechanisms or they may be alternating as illustrated in this figure or there may be other pattern like skipping one state bit to transfer the states or the like and all such variations are covered by this patent as may be appreciated by one with ordinary skill in the art. The illustrated column-wise FSA extension logic enables each bit to accept an incoming state, and originate the transfer of its state to the next neighbor. The column-wise FSA extension comprises a Forwarding vector (FV) which comprises of bits like FV11 of block 1404 (1). It may further comprise of local forwarding vector (LV) which comprises of bits like LV11. It may further comprise of circuits that allow the state bits to be merged and forwarded down or up or a combination thereof using gates like 1406, 1407 and 1408 that form an AND-OR logic function between the inputs, such that if FV11 is set to '1' and LV11 is set to '0', then signal GD11 of block 1404 (1) is coupled to output of gate 1408, onto the signal GD21 of block 1404 (2). Similarly, if FV11 is set to a '0' and LV11 is set to a '1', then the state Q11 of the FSA bit 1, block 1404 (1) is coupled to the signal GD21. Further, the gate 1409, may enable the transition into the state bit 1, if UC11 is set to '1' and the received symbol is RS11 when GD11 is 'set'. The Up Control Vector (UC), comprises of control bits like UC11 per FSA state bit, and enables that particular state bit to accept a transition into that state if the UC bit is set enabling FSA extension from another FSA. Similarly, the logic gates 1410, 1411, 1412 and 1413, coupled to the FV, LV and UC bits FV21, LV21 and UC21 respectively enable the column-wise FSA extension into and out of state bit 1 of FSA 2. The FV and LV vectors are not required to be mutually exclusive. Hence, an FSA state bit may accept an incoming state and allow the same state to be forwarded if FV and UC bits are set to '1'. It is also optionally feasible to merge the state bit output of the current bit to the incoming state bit, by setting both FV and LV vector bits to '1'. In such a case the forwarded output state is a '1' when either the incoming state bit is a '1' or the local state bit is a '1' or both. The FSA bits 2, illustrate a very similar mechanism as the one described above to transfer the state in the opposite direction. The upwards FSA column-wise extension mechanism may comprise of Forwarding Vector-Up (UV), Local Forwarding Vector-Up (LUV), Down Control Vector (DC) and may further comprise of the logic like gates 1418, 1419, 1420, 1421 and the like that enable the transfer of a local state like Q22, upwards as well as forward an incoming state, like GUP22, upwards, coupling to output GUP12, a well as accept an incoming state, GUP22, from a lower FSA to enable transition to its state bit by coupling through a gate like 1418 and the like. Again the LUV, UV and DC are not required to be mutually exclusive. The FV, LV, UC, UV, LUV, DC bits may each be setup as memory locations that get programmed like other control vectors for example the SDV, Symbols, mask vectors and the like. The memory circuits for these bits are not illustrated to not obscure the invention and are similar to any other memory bits of PRISM as may be appreciated by one with ordinary skill in the art.

FIG. 15 illustrates PRISM FSA Extension Example #1. This figure illustrates a Column-Wise Extension on the left and it also illustrates Row-Wise and Column-Wise Extension on the right. These figures illustrate PSE comprised of 8 states per FSA. The figures illustrate how four regular expressions may be programmed in PRISM using the FSA extension architecture and mechanism of this patent. Block 1501, illustrates how a regular expression RE1: (abc|defghi)+jkL may be programmed using the column-wise FSA extension. Each box like 1513 represents an FSA state bit and all the other associated circuits, similar to block 614 with circuits for FSA extensions described above added, and is labeled with the state that it represents using the states corresponding symbol like 'a'. Block 1504, illustrates how a regular expression RE2: 'abcdefghiJkLmnop' may be programmed using the column-wise FSA extension. The figure does not illustrate the GSDV, GCV, SDV and the like vector bits being setup to simplify the illustration and description, but are implied to be setup properly by the PRISM search compiler to enable the right transitions between multiple states. Further, the figures illustrating RE examples in this patent, local state transitions within an FSA are implied to exist and proper programming generated by the compiler but are not illustrated to not obscure the figures. The arrows in the figure, like 1508 and 1507 are used to indicate inter-FSA transitions enabled using the FSA extension mechanisms of this patent. The RE1 is programmed to include two terms 'abc' and 'jkL' of the RE1 in the FSA in Row1. However, the term 'defghi' is programmed using the column-wise FSA extension mechanisms described above and is distributed between FSAs in Row 1 and Row 2. For instance, the state 'd' is assigned to Row1 and column 83, block 1514. The local vector of this state bit is set to '1'. Thus when the state 'd' is activated the output from B3 Row1 to B3 Row 2, arrow 1508, is activated. The UC vector bit 3 for the Row 2 state bit 3 is set to a '1' which enables the transition into state 'e', Row 2 column 83, if the received symbol is 'e'. Thus if the input content is 'de', then the downward transition, arrow 1508, will be taken and the FSA in Row 2 will be in state 'e'. However, if the second symbol is not an 'e', then the state 'e' is not activated. The states of FSA in Row 2 are programmed such that they transition from 'e' to 'f' to 'g' to 'h' when a sequence of 'efgh' is received after a symbol 'd'. When FSA 2 reaches state 'h', the upward state forwarding mechanism between Row2 column B8 and Row1 column B8 is activated and the FSA in Row 1 will reach the state 'i' if the next symbol received is 'i'. For the upward transition, the local forwarding vector-up (LUV) bit for Row 2 column B8 is set to '1' and the down control vector (DC) bit for Row1 column B8 is set to '1', which enable the transition from Row2 FSA state 'h' to Row1 FSA state 'i'. When the state 'c' or 'i' of Row 1 is active, then the following states that the FSA may enter as per the RE1 are 'a', 'd' or 'j' depending on the received input symbol and so the SDV vectors for those states are set up to transition from the states 'c' or 'i'. When the Row 1 FSA reaches state 'L', which is programmed as an accept state, the RE1 is activated and the input string recognized by this RE has been received on the input. A match signal like 609 from this FSA is activated and send to the cluster priority encoder and evaluation processor which takes appropriate action based on this regular expression match. Block 1504, illustrates a regular expression RE2: 'abcdefghijkLmnop' programmed using the column-wise FSA extension mechanisms of this patent. The state 'a' which is the start state, block 1512, is assigned to Row 4 and column 81 and other seven states are assigned in the other state bit slice columns of FSA 4. Then the state 'h' is coupled to state 'i' of Row3 column 88 using the up column-wise FSA extension similar to block 1501 described above. As may be noticed the states 'jkLmnop' are assigned in a reverse order in Row3, though as discussed above the state assignment order is not critical in PRISM, since the state transition controls like SDV are set properly to follow the correct transitions. Thus for the Row 3, the FSA states are programmed to transition in the order 'ijkLmnop', if a string corresponding to that sequence is received after 'abcdefgh'. When the state 'p', 1511 is reached, the RE1 is matched and the match signal for this RE is asserted to the cluster local priority encoder and evaluation processor, block 815, which takes appropriate actions that are programmed based on activation of RE2.

Blocks 1502, 1505, 1503 and 1506 illustrate the programming of RE1 [(abc|defghi)+jkL], RE2 [abcdefghijkLmnop], RE3 [(xyz|defghi)+jkL] and RE1 [xyzdefghijkLmnop] respectively using the Row-wise and Column-wise FSA extension mechanisms of this patent. The block 1502, column 1, Row 1 FSA, programs the terms 'abc', and 'jkL' of RE1 where as the term 'defghi' is programmed in the column 2, Row 1 FSA. The Row-wise extension architecture and mechanisms described above and illustrated in FIG. 11 is used here except that the width of each FSA is 'S' states. In an exemplary 8-state FSA based FSA extension, there may be eight precharge lines like 1109, 1110 and the like which may each be activated by the corresponding state bit of the coupled FSAs which may provide a greater freedom for coupling various state terms of a large FSA. The transitions 1520 and 1519 take the FSA from one FSA to the next FSA as per the regular expression state transitions. Local state transitions within an FSA are not illustrated as described above. Thus when the FSA reaches state 'c', it may enable local transitions into states 'a' and 'j' and enable an inter-FSA transition 1520 into state 'd'. Similarly the state 'i' may enable a local transition within that FSA to state 'd' and enable an inter-FSA transition 1519 to states 'a' and 'j' of Column1 Row1 FSA. When the accept state 'L' is reached the match signal for the associated FSA is asserted and the cluster priority encoder and evaluation processor, block 815, takes the appropriate action that is programmed.

The compiler may assign various FSA states to appropriate state bit slices like 614 depending on the row-wise coupling architecture which may be different than that illustrated in FIG. 11 as may be appreciated by one with ordinary skill in the art and such variations are within the scope this invention. For instance instead of coupling precharge line 1109 to line 1117, another scheme could couple it to a signal like 1118, 1119 or 1120 or the like and any such variations are covered within the scope of this invention.

Block 1503, illustrates RE3 to be programmed using the column-wise FSA extension. The compiler may assign different terms of the RE to appropriate state bit slices of the FSAs to enable the transitions required to complete the correct RE state transitions between various terms of the RE, and may optionally do it based on the available FSA state bits and the like. For instance, in this assignment, the term 'defghi' is assigned to Row 3, Column1 FSA, where the state "d" is assigned to B3, which aligns directly below state 'z' of the term 'xyz' assigned to Row 2, Column1 FSA. This enables the column-wise state transition between these two terms of the regular expression when state 'z' is reached and the RE needs to transition to state 'd' based on the next received input symbol. One salient point to notice, is that the state 'i' of Row 3 Column1 is aligned with the accept state 'L' in BE of Row2. This would prevent a required transition from state 'i' to states 'x' or state 'j' of the RE using column-wise transition. This is avoided by creating a duplicate state 'i' in FSA in Row 2 Column1, B7, which is entered from state 'h' in Row3 Column1. Thus the column-wise FSA extension architecture enables the state 'i' to be reached in FSA in Row2 B7. Both states 'i' in both FSAs would be active simultaneously when a symbol 'i' is received following a string 'defgh'. The state 'i' in Row 2 is then locally enabled to cause transitions into states 'x' or states 'j' of the follow states as per the RE, where as the state 'i' in Row3 is enabled to cause a local transition to state 'd' in Row3 which is also required to be taken as per the regular expression. Thus, the PRISM compiler has freedom to align various RE terms to effect the proper transitions by duplicating the same state in multiple FSA bits and FSAs. When the accept state 'L' is reached the match signal for the associated FSA is asserted and the cluster priority encoder and evaluation processor, block 815, takes the appropriate action that is programmed.

Block 1506, illustrates RE1 to be programmed using column-wise FSA extension as well, where the freedom of assignments of various states to the compiler are illustrated using assignments between two rows of the Column 2 FSAs where multiple transitions are illustrated between various state bits distributed between the two FSAs.

In one exemplary embodiment, there may be column-wise FSA extension enabled between each group of four PRISM Memory cluster PSE rows, and the row-wise extension may be enabled between each of those rows and eight columns of PSEs. If a regular expression needs more states than the states enabled by such a large group of FSAs, such an RE may optionally be split into multiple FSAs or may optionally use rule group FSA extension architecture and mechanisms illustrated in FIG. 11A and described above. Thus by using the column-wise and row-wise FSA extensions of this patent any arbitrary FSA may be represented within PRISM, even when the individual PSE may support lot fewer FSA states as illustrated above.

FIG. 16A illustrates an integrated circuit processor with embedded PRISM. The figure illustrates a multi-core processor (also referred to as multiple processor core in this patent) however an integrated circuit processor with single processor core is also within the spirit and scope of the teachings of this invention as may be appreciated by one with ordinary skill in the art. The processor core, block 1604(1) through 1604 (M), may be complex instruction set core, reduced instruction set core, a very long instruction word core, a data flow architectural core, a cell processor core, a graphics processor core, an explicit parallel instruction core, a superscalar architecture core, a super pipelined architecture core, vector processor core or the like or a combination of the above and may also be a processor core with x86 instruction set, SPARC instruction set, POWER instruction set, ARM instruction set, ARC instruction set, Tensilica instruction set, MIPS instruction set or a combination or a derivative instruction set with n-bit instructions where n is any integer, preferably any power of 2. The design and implementation of such cores is well understood by those with ordinary skill in the art and hence are not illustrated in this patent to not obscure the invention. The integrated circuit processor cores are coupled to each other in this illustration to a processor interface, 1602, which is used to load and store data, instructions and the like to and from external memory, input/output devices, and other components of a system comprising the integrated circuit processor illustrated in FIG. 16A. The integrated circuit processor may further comprise of one or more PRISM blocks, 1603 (1) through 1603 (L), which are the PRISM memory described in this patent and illustrated as a high level block diagram in FIG. 7, described above. The integrated circuit processor may optionally comprise of one or more cache memory blocks, 1605 (1) through 1605 (N), and an optional memory controller, 1606, to control cache memory on this IC processor chip and optionally memory external to this IC processor chip with embedded PRISM. As noted above searching of a large number of strings in information content and particularly regular expression searches is a very slow process using current general purpose processors, microprocessors, network processors and the like. However a string search, regular expression search, database search using text strings or regular expressions or the like forms a significant portion of applications that can be accelerated if the regular expression and string search can be accelerated. The embedded PRISM search memory blocks, 1603(1) through 1603(L), accelerate and offload content search processing from the processor cores of the integrated circuit chip processor and thus provide acceleration for searching a large number of regular expressions, fixed text strings or a combination, to the processor cores of the integrated circuit processor illustrated in FIG. 16A and there by enable a huge boost in performance for applications that perform string search or regular expression search or the like that execute on the integrated processor chip with embedded PRISM illustrated in FIG. 16A. Although the illustration uses a common bus, 1608, coupling all blocks of this processor, it would be obvious to one with ordinary skill in the art to create many different variations of this block level architecture to increase operating frequency and performance, lower power consumption, reduce area or the like by various techniques like creating a network on a chip coupling various elements of this block diagram or having dedicated buses between various blocks or the like as may be obvious to one with ordinary skill in the art and all such variations and architectures are within the scope and the spirit of the teachings of this invention.

FIG. 16B illustrates an integrated circuit processor with processor core using PRISM. This figure illustrates one variation of the integrated processor architecture described above. In this illustration the integrated circuit processor comprises of one or more processor cores, 1607(1) through 1607(M), which are similar to the processor cores, 1604(1) through 1604 (M), except that each processor core embeds one or more PRISM blocks, 1613(1) through 1613(M), which are similar to PRISM blocks, 1603(1) through 1603(L), described above with appropriate changes to their bus interface blocks, 702, to integrate them in the processor cores, 1607(1) through 1607(M), as would be obvious to one with ordinary skill in the art. Such an integrated circuit processor may optionally further comprise of one or more processor cores, 1604(1) through 1604(L), which do not embed PRISM.

FIG. 16C illustrates a multi-processor system with PRISM. The figure illustrates a hardware system which comprises of one or more integrated circuit processors, 1609 (1) through 1609 (M), which are coupled to each other using a processor bus that also couples the processors to one or more chipset components, 1611, which may be coupled to system memory, 1612, as well as other input/output devices, accelerators, adapters, block 1614, like the network interface, the storage controllers, storage area network controllers, graphics controllers and the like. The one or more integrated circuit processors, 1609(1) through 1609(M), may each comprise of a single processor core or multi-processor cores which may optionally embed PRISM. These processors, 1609(1) through 1609(M), may be general purpose microprocessors or network processors or protocol processors or switching processors or routing processors or other processors described above or the like. The multi-processor system may further comprise of one or more PRISM integrated circuit chips, blocks 1610(1) through 1610(L), which may be coupled directly to the processor bus thereby providing a coprocessor solution to the processors, 1609(1) through 1609(M), to accelerate and offload string search, regular expression search, security applications, other search applications or the like from the processors and there by significantly improving the performance of the multi-processor system for such applications and significantly lowering the overall system cost of the multi-processor systems compared to systems where PRISM technology is not used for such applications and they suffer from a huge memory and state explosion by using DFA or composite DFA based solutions to achieve high performance.

As discussed above, modern programming languages and operating systems support a range or interval mechanism for regular expression symbols. For example if in a regular expression the symbol 'a' appears 5 consecutive times, then it may be possible to represent that as 'a[5]' instead of 'aaaaa'. In general such expressions can be 'a[x,y]', which means symbol 'a' must appear in the expression from 'x' to 'y' times or 'a[x,]' which means the symbol 'a' must appear at least 'x' times for this expression to be valid or 'a[x,]' which means the symbol 'a' must appear exactly 'x' times for this expression to be valid or the like. Such symbols represented with the interval for example 'a[x,y]' where x and y are integers and x is equal to or less than y, are referred to as the interval symbol in this patent. One way to support regular expressions with interval symbols is by fully expanding the interval and repeating the symbol to which the interval applies. This can be a very inefficient way of implementing such an expression in hardware. There is a need to represent such regular expressions in a compact manner to better utilize the integrated circuit chip area. My invention also describes an architecture that enables the creation of such complex regular expressions with interval representation in an efficient way without using up a large number of states for the interval range from 'x' to 'y'.

FIG. 17A illustrates a PRISM FSA without Interval Symbol. The regular expression 'ba[3,5]c' is represented by the FSA illustrated in this figure. In this figure the regular expression is expanded to a form like 'baaac|baaaac|baaaaac' where each term of this expanded regular expression includes exactly 3 or 4 or 5 occurrences of symbol 'a' in between the symbols 'b' and 'c' to cover each of the three possibilities defined by the regular expression 'ba[3,5]c'. The figure illustrates that the FSA would transition from start state 0, 1701, through accept state 7, 1708, only when one of the three sequences, 'baaac' or 'baaaac' or 'baaaaac', of symbols is received, if at any stage during the state transitions, if an input symbol is received which is not part of this regular expression, the FSA would transition to an error state, not illustrated, or to the start state without indicating a match. Only when the input content contains one of the three sequences above, is a match indicated. Thus for example if the input sequence is 'baaac', the FSA will transition from the start state 0, 1701, to state 1, 1702, to state 2, 1703, to state 3, 1704, to state 4, 1705 to state 7, 1708, where each transition from one state to the other is taken on the input symbol labeled on the edge connecting the two states. For example the transition from state 0 to state 1 is taken when the input symbol received is 'b'. States 5, 1706 or state 6, 1707 or combination are entered when the input sequence has 4 or 5 symbol 'a' in a sequence between the symbols 'b' and 'c'.

Such an FSA when implemented in PRISM search engines, can use up precious resources for the same symbol, in this case 'a', to facilitate the state transitions. This would be a very inefficient utilization of PRISM search engine resources particularly if the interval is wider or the number of symbol repetitions being expected is big. For example if the expression is 'ba[3,17]c', or 'ba[25]c' or the like, then PRISM FSA representation using the fully expanded regular expression as illustrated in FIG. 17A will be very inefficient.

FIG. 17B illustrates PRISM FSA with Interval Symbol. The figure illustrates a state 'Cnt', 1709, which acts as an interval symbol state, where an interval counter associated with this state is incremented each time the state is reached. Whenever the input sequence of the input symbol or symbols leading the transition into the interval symbol state is broken, the interval counter resets to zero or a predefined count. The state 3, 1710, is entered only if the interval symbol state 'Cnt'. 1709, indicates that a valid sequence of the symbols of interest, in this case symbol 'a', have been received and the new symbol is the one leading the transition into the state, in this case symbol 'c'. Thus the transition from state 'Cnt', 1709 to state 3, 1710, is taken only when the received input symbol is a 'c' and the counter associated with the interval symbol state 'Cnt', 1709, is either 3, 4 or 5 as required by the interval symbol based regular expression 'ba[3,5]c'. Similarly, other interval based regular expressions covering the conditions like 'a[x,y]' or 'a[x]' or 'a[x,]' or the like may all be constructed using the PRISM FSA with interval symbol mechanism illustrated in FIG. 17B, by adjusting the interval counter condition as required by the regular expression as may be appreciated by one with ordinary skill in the art.

FIG. 17C illustrates PRISM FSA Interval Symbol State Counter Block. The figure illustrates an interval symbol state, $Q_1$, 1718(1), which is entered when the received symbol 'RS1', 1725(1), is active and the FSA is in a state $Q_1$, 1718(1), through $Q_1$, 1718(n), whose associated state dependent vector bit $V_{11}$ through $V_{n1}$ is enabled, which enables transition from that state into state $Q_1$, 1718(1) coupled by the NAND gates 1712(1) through 1712(n) and 1713(1) through the signal, 1716. When the signal 1716 is asserted it acts as an increment input to an m-bit interval counter, 1719, referred to as the interval counter above, which is associated with the interval symbol state $Q_1$, 1718(1). The interval counter, 1719, is incremented in each clock cycle indicated by the clock signal, 1728, when the increment signal, 1716, into the interval counter 1719 is also asserted, Any clock cycle when the signal 1716 is not asserted, the output of the inverter device, 1715, is asserted and this signal acts as a reset signal to reset or preset the m-bit counter to zero or other pre-defined value. Thus, once the interval symbol state $Q_1$, 1718(1) is entered and the input symbol stream continues to have the symbol RS1, the state $Q_1$, 1718(1) stays active, when the state dependent vector bit $V_{11}$, 1731, is enabled. The interval counter, 1719, thus counts a sequence of the received symbol RS1 until the sequence is broken by a different input symbol. The count output of the interval counter is illustrated to be provided as input 1726, to the CSL (m-bit) block 1721 and as input 1727 to the CSH (m-bit), block 1722. The blocks CSL, 1721 and OSH, 1722 are interval symbol state low count limit and interval symbol state high count limit programmable comparators respectively. Thus to represent a regular expression with interval symbol 'a[x,y]', where 'a' is RS1, the memory value for the lower limit for the interval comparison in CSL, 1721, is programmed with value of 'x' and memory value for the upper limit for the interval comparison in CSH, 1722, is programmed with value of 'y'. Now when the count of the interval counter, 1719, provided to CSL, 1721, on the input signal 1726, reaches a value of 'x' or higher, the signal 1729 output from CSL block, 1721 is asserted. Similarly, as long as the count value of the counter, 1719, is equal to or less than 'y', the signal 1730 output from CSH block, 1722 is asserted. The Count Memory and Transition detection block 1723, detects when both 1729 and 1730 are asserted which indicates that the interval symbol state is active and the symbol sequence is within the interval of 'x' through 'y'. The block 1723 asserts the output signal CntV1, 1720, to indicate that the interval symbol state has reached its interval range specified by the regular expression. Thus any state of the FSA that dependents on such condition to be valid may be activated if the symbol after the sequence is the one leading the transition to that state. The count memory and transition detection block, 1723, holds a programmable operation mode memory value that enables it to decide which type of the interval symbol is being programmed for this regular expression from a set of interval symbols like 'a[x,y]' or 'a[x]' or 'a[x,]' or the like. When an exact count is expected, then both CSL and CSH may be programmed with the same interval value 'x'. For this condition the detection circuits in block 1723, would be activated only when both signals 1729 and 1730 are asserted and would assert the signal CntV1, 1720. Similarly, if the interval symbol programmed is like 'a[x,]', then the detection circuits will detect whenever the signal 1729 is asserted, and assert the signal CntV1, 1720. There are multiple ways of realizing the interval symbol state functionality as may be appreciated by one with ordinary skill in the art and hence all such variations or realizations are within the scope and spirit of the teachings of this invention. The m-bit interval counter, CSL, CSH, and the count Memory and transition detection logic and the associated logic described above form interval symbol counter block 1732.

The state transition circuits of the PRISM FSA are augmented to account for the interval symbol state as illustrated in FIG. 17C. The figure illustrates an n-bit interval symbol control vector (ISCV) 'C1', 1724(1) through 'Cn', 1724(n). This ISCV control vector can be of a different width as well as may be appreciated by one with ordinary skill in the art if the number of states that the interval symbol state can transition to is different than 'n'. The interval symbol control vector bits C1 through Cn are programmable and may be realized as a location in PRISM FSA memory space. The ISCV vector may also be realized as a register or any other storage mechanism. The state that depends on the interval symbol state to be valid before it is entered would have its appropriate interval symbol control vector bit set. The NAND gates 1714 (1) through 1714(n), couple the interval symbol state valid signal, CntV1, 1720 to the appropriate state when the corresponding interval symbol vector bit C1 through Cn is active and the received symbol is the one associated with the state. For instance, if the regular expression 'a[3,5]c' needs to be represented using the Interval Symbol State logic illustrated in the FIG. 17C, the compiler for the PRISM FSA may assign symbol 'a' to RS1, assign '3' to CSL, 1721, assign '5' to CSH, 1722, set state dependent vector bit $V_{11}$ to '1', assign symbol 'c' to RSn, assign the appropriate range selection in the count memory and transition detection block, 1723 and assign interval symbol control vector bit Cn, 1724(n) to '1' along with all the other programmable state dependent vector bits and other PRISM symbol bits and the like are also setup appropriately. When the state Q1 is entered on the receipt of the symbol 'a', (assuming that the previous FSA state from which this transition occurs is valid or this is a start state or the like), the counter, 1719, starts counting the number of times the symbol 'a' has been received in a sequence. When symbol 'a' is received 3 to 5 times, the output signals 1729 and 1730 are both asserted which is then detected by the block 1723 to indicate that the interval symbol state has matched the symbol 'a' in a sequence of 3 to 5 times, by asserting the signal CntV1, 1720. When the next symbol received is a 'c', the gate 1714 (n), has all its inputs, Cn, CntV1 and RSn, asserted which then couples a '1' to the state Qn which corresponds to the state for the symbol 'c' of the regular expression 'a[3,5]c'. If this state is an accept state and the appropriate accept state vector is set for the PRISM FSA as described above, then a regular expression match is flagged.

FIG. 18A illustrates State transition logic (STL) for a state in PRISM with interval symbol. The state transition logic for a state that can be entered when an interval symbol is recognized by the PRISM FSA is very similar to the state transition logic for a state in PRISM as illustrated in FIG. 4A with a few differences as described below. The state transition logic of a state of PRISM without support for an interval symbol as illustrated in FIG. 4A is augmented with a logic function gate, 1807, as illustrated in FIG. 18A. The logic gate 1807, coupled with logic gate 1808, couple the interval symbol state signal, CntV1 into the state transition logic of a PRISM state, creating a state transition logic for a state in PRISM with support for interval symbol. The inputs to the logic gate 1807, are one of the received symbol signal 'RS1' through 'RSn' modified with the left biased or right-biased signal, LB/RB#, the interval symbol state valid signal, CntV1, same as signal 1720, and one of the interval symbol control vector bit 'C' through 'Cn', same as signals 1724(1) through 1724(n). The index 'n' would correspond to the state index of the FSA. If the interval symbol control vector bit, C1 in this illustration, is '1', then if the interval symbol state indicates that a valid sequence is detected by asserting the signal CntV1, then if the next input symbol is 'RS1', then the state Q1 is asserted, meaning the FSA enters the next state that follows the interval symbol state. Multiple states of the PRISM FSA can be entered from an interval symbol state if each of those states have their associated interval symbol control vector bit set and the symbol required to transition in that state is received immediately following the interval symbol recognizes its sequence from the input symbols.

FIG. 18B illustrates a state logic block for a state in PRISM with interval symbol. The figure illustrates how various interval symbol state capabilities illustrated in FIG. 17C, may be coupled in a state logic block of a state in PRISM as illustrated in FIG. 48. If the state is an interval symbol state, the output signal N1, 1716 is used as an increment to the interval counter in the interval counter block, 1732 associated with this state. For all states that depend on the interval symbol state to match the sequence, a signal CntV1, 1720, generated by the interval counter block, 1732, is used as an input to the state transition logic as illustrated in FIG. 18A and is coupled to a bit of the ISCV bit like C1 through Cn, corresponding to the state of the FSA. Thus the state logic block of a state in PRISM is augmented to support transitions from interval symbol states as described above for the FIGS. 17A, 17B, 17C, 18A, 18B, 4A and 4B.

FIG. 19 illustrates PRISM Search Engine with Interval Symbol. This figure illustrates a left-biased Tagged NFA rule block in PRISM as illustrated in FIG. 68 coupled to interval symbol logic, 1914, that enables the creation of a PRISM Search Engine that supports interval symbol. Even though the illustration is with a left biased NFA, one with ordinary skill in the art will appreciate that similar functionality can be achieved with a right biased NFA as illustrated in FIG. 6A and such usage is within the scope and spirit of this invention. This figure does not illustrate the details of state block 1, as illustrated in FIG. 68. The PRISM Search Engine with interval symbol comprises of a counter, block 1901, which includes an m-bit interval counter, like 1719. The inverter, 1715, is not illustrated in this figure, but may either be part of the counter block 1901 or may be provided by another block. The PRISM search engine further comprises a count low evaluation memory, 1903, which is similar to CSL, block 1721, which holds a memory value for the low limit of the interval symbol and compares the output of the counter, 1901, with the value programmed in its memory. When the counter value is equal to or greater than the value programmed in the count low evaluation memory location the output signal 1913, like signal 1729, is asserted. The PRISM search engine further comprises a count high evaluation memory, 1905, which is similar to CSH block 1722, which holds a memory value for the high limit of the interval symbol and in this illustration may also comprise of the functionality of the count memory and transition detection block, 1723, and compares the output of the counter, 1901, with the value programmed in its memory. When the counter value is less than or equal to the value programmed in the count high evaluation memory location, an internal signal like 1730 not illustrated in this figure would be asserted. The count memory and transition block functionality, like block 1723, provided by the count high evaluation memory block couples this internal signal with the signal 1913 and generates the output signal 1915 of this block depending on the mode or type of the interval symbol programmed in this block as described above for block 1723. The output signal 1915 provides functionality similar to signal CntV1, 1720. The PRISM search engine further comprises an interval symbol control vector memory block 1906, which holds the ISCV value that is programmed for the specific interval symbol based regular expression being programmed in the PRISM search engine. The outputs of ISCV are the vector bits, C1 through Cn, 1724(1) through 1724(*n*) which are coupled to the state transition logic per state of the PRISM FSA. The PRISM search engine with interval symbol further comprises an Interval partial state logic block 1908, which couples the ISCV vector bits, C1 through Cn, with CntV1, signal 1915, and the RS1 through RSn. The block 1908 essentially implements the functionality similar to the logic gates, 1714(1) through 1714(*n*). The output bits of the interval partial state are coupled to the final state evaluation block 1909, which merges the interval symbol state count transition events with other FSA partial state transition events providing functionality similar to logic gate 507 illustrated in FIG. 5*a*. The interval counter has been described as an m-bit counter in the description above to highlight the difference that the counter width is not required to be the same as the number of states 'n' of the PRISM FSA. The counter width may be the same as the number of FSA states or lower or higher. In one preferred embodiment there may be the same number of bits in the counter as the number of states of the FSA i.e. m=n. In one other embodiment m may be half the number of states of the FSA. In such an embodiment, there may be two interval counters each with a width of half the number of states of the FSA and coupled to two different states of the FSA to receive their increment signal like 1716. In such an embodiment, the associated CSL, CSH and other interval symbol logic circuits would also be matched in width to the width of the counters and would also be present in two sets. Similarly each FSA state may be able to receive transition from either of the interval symbol states or may each be coupled to only one or the other interval symbol and the interval symbol control vector implemented appropriately as may be appreciated by one with ordinary skill in the art. The functionality of the rest of the PRISM search engine elements illustrated in the FIG. 19 are similar to corresponding elements illustrated in FIGS. 5*a*, 5*b*, 6*a* left-biased or right biased FSA realization.

All the memory blocks like count low evaluation memory, the count high evaluation memory, or the ICSV memory and the like described above comprise of typical memory architecture as all the other memory or storage elements of PRISM. The implementation details of such memory elements and storage are not illustrated so as not to obscure the invention as may be appreciated by one with ordinary skill in the art.

There are many variations of implementing PRISM Search engine with interval symbol as may be appreciated by one with ordinary skill in the art. Even though the above description of the interval symbol state and the PRISM Search engine is illustrated to be implemented in a specific way, one with ordinary skill in the art may appreciate that there are multiple ways to accomplish the interval symbol state representation and all such variations or mechanisms are considered to be within the scope of this invention.

FIG. 9 illustrates a PRISM search compiler flow (full and incremental rule distribution). The flow can be used for distributing search rules or security rules when the full set of rules are defined or when any updates or modifications are made to the rule set and incremental changes to the rule set need to be communicated and configured in the PRISM search memory. The search memory may be used in distributed security architecture within system nodes across a network which may be a LAN, WAN, MAN, SAN, wireless or wired LAN and the like. The rules like application layer rules, network layer rules or storage network layer rules or any other content search rules may be created using manual or automated means and provided as inputs to the search compiler flow in a predefined format. The rules may be created per each layer of a seven layer OSI networking stack or there may be other non OS layer specific rules. The search compiler's rule parser, 904, parses the rules and converts them into regular expression format if the rules are not already in that form and need to be evaluated as regular expression rules. The rules parser presents signature rules like anti-virus signature rules to PRISM signature compiler flow, 911. Then the regular expression rules are converted into FSA rules compiled to the node capabilities of the node that has the PRISM content search memory and signature rules compiled to PRISM signature search engine capabilities described below and stored in the rules database. The rules from the rule database are retrieved and distributed by the rules distribution engine to the appropriate node(s) with the PRISM search memory. The search or security rules may be distributed to the host processor or a control processor or a host microprocessor or a network processor or a master processor or a combination thereof as appropriate depending on the node capability. The rules may be distributed using a secure link or insecure link using proprietary or standard protocols as appropriate per the specific node's capability over a network. The network may be a local area network (LAN), wide area network (WAN), internet, metro area network (MAN), wireless LAN, storage area network (SAN) or a system area network or another network type deployed or a combination thereof. The network may be Ethernet based, internet protocol based or SONET based or other protocol based or a combination thereof.

FIG. 10 illustrates PRISM FSA Compiler flow. The regular expressions for the content search are presented to the PRISM FSA Compiler flow by the rules parser, block 904. PRISM compiler flow may optionally be implemented as a stand alone compiler as well and may read regular expressions for the content search rules or security rules or the like generated by an IT manager or a user or another tool or a combination or the like for compilation to PRISM. PRISM FSA compiler reads the regular expressions, block 1002, from a storage device like a disk drive or a file server or memory or the like or directly from the output of another tool or a combination and processes these regular expressions optionally in the order specified. Since PRISM processes RE rules using independent FSAs, the REs are compiled individually, however it may be possible for the PRISM FSA compiler to process more REs for one FSA when PRISMS supports multiple REs per FSA block. The PRISM compiler flow comprises of one or more of the steps illustrated in the FIG. 10 and described below which may be performed in the illustrated order or another order to compile the rules for PRISM as may be appreciated by one with ordinary skill in the art. PRISM compiler flow checks if all the regular expressions have been processed or not, block 1003, and if any expressions are left, it goes through the path, 1004, otherwise it follows the path, 1017. When a regular expression is read by the block, 1005, it is parsed, block 1006, to understand various constructs of the regular expression. The PRISM compiler flow may at this stage indicate an error if there are any issues with the regular expression like any syntax being invalid or the like. The error flow is not illustrated in the figure but may optionally comprise of logging the regular expression with an error, informing the user or the application or the like of the error, ignore the error and move on to the next regular expression, or stop the processing altogether or the like or a combination of the foregoing. However, if no errors are discovered, the regular expressions syntax tree is constructed, block 1007, and various symbols of the regular expression are extracted, block 1008. The regular expression symbols are then marked, block 1009, to make each symbol unique as per the requirement of the Berry-Sethi's FSA construction algorithm. For example a regular expression like (a|b)*cd(a|ef)* may be marked as $(a_0|b_1)^*c_2d_3(a_4|e_5f_6)^*$ there by making each symbol of the regular expression unique. This regular expression is now linear and is processed, block 1010, to find the determinants that extract whether empty string is part of the language of the regular expression and its components. The compiler flow may extract the first states that are entered from the start state of the regular expression, block 1011. For the above example the first states are: $a_0$, $b_1$, and $c_2$ which may all be entered on processing the first symbol from the start state. Then the PRISM FSA compiler flow may extract the follow states, block 1012 for each of the states or symbols of the FSA. For the example above the following may be the follow states per each state:

State $a_0$: Follow states: $a_0$, $b_1$, and $c_2$
State $b_1$: Follow states: $a_0$, $b_1$, and $c_2$
State $c_2$: Follow states: $d_3$
State $d_3$: Follow states: $a_4$ or $e_5$
State $a_4$: Follow states: $a_4$, or $e_5$
State $e_5$: Follow states: $f_6$
State $f_6$: Follow states: $a_4$, or $e_5$ The PRISM compiler flow then creates the state transition list per state, 1013, from the follow states above which essentially form the state transition list from each state. The PRISM compiler flow then extracts terminal or accept states, 1014 of the regular expression. For the example expression above the accept states are: $d_3$, $a_4$, and $f_6$. Once all the processing of the FSA states is done, the marked symbols are converted back to their unmarked form and the appropriate PRISM programmable FSA data structures generated, block 1015 for example, SDV per state, FSA state symbols, symbol mask if any, initial or first states, accept states as well as optional tag states if the regular expression is tagged, a left biased or right-biased control if PRISM implements such option, any associated action to be taken, the FSA ID that will hold this RE and the like. If the regular expression needs to use more states than those supported in a single PSE, the compiler assigns the RE to multiple FSAs and couples them together using row-wise, column-wise, or rule group FSA extensions or a combination there of or may split the RE into multiple rules to fit the specific embodiment of PRISM, its characteristics and the like. Further, if the regular expression being represented has an interval symbol and the PRISM search engine with support for interval symbol is present, the compiler sets up the appropriate memory values in the interval symbol logic, like the CSL, CSH, ICSV and the like to realize the regular expression with interval symbol in PRISM using the methods described above. If the PRISM search engines with interval symbol do not exist, then the compiler may expand the interval symbol and then program the expanded regular expression in appropriate PRISM search engine. The interval symbol programming in PRISM may also be coupled with the FSA extension mechanisms of PRISM described above. This RE in the PRISM compiled form may either be kept in memory or storage or the like and once all such REs are processed they may all be stored compiled rules database, block 1018. Each compiled RE may be deposited individually in the database or all rules may be deposited once they are all processed or a combination. The compiled rules database may be an actual database or a file or a storage element or the like that records the compiled rules data that may then be programmed into an appropriate PRISM device by the rules distribution engine, 909, working with the PRISM controller of the corresponding PRISM device.

FIG. 20 illustrates PRISM signature compiler flow. This flow may be used for compiling signatures of applications like anti-virus that have a large number of signatures that are typically represented as a string of 8-bit characters some of which may also comprise of regular expressions. Anti-virus signatures mostly comprise of strings of characters, however, there may be a portion of the signatures that also have regular expressions. Such signatures that have regular expressions are processed by the PRISM FSA Compiler Flow illustrated in FIG. 10 described above.

The signature search on a large number of fixed signatures has been suggested in literature using a technique called bloom filters, Bloom filters compress a large number of fixed signatures (for clarity fixed signatures mean signatures without regular expressions in this patent) using multiple (e.g. k, where k is an integer) uncorrelated hash functions applied on each signature and set a memory bit corresponding to each hash index generated by each hash function. When looking for content belonging to the set of signatures, the same hash functions are applied to the content and hash indices generated. These hash indices are used to extract the memory bit values at those locations. If each memory bit value is set, then there is a chance that the processed content stream may be part of the signatures being searched. Once, such a determination is made an exact match function is applied on the content stream and the fully expanded signature or signatures associated with the bloom filter match to ascertain that the content being processed indeed matches one of the signatures in the set of signatures. If all the bytes of the signature match the appropriate number of bytes of the content a signature match is flagged which may then be used to take appropriate actions associated with such a signature match. For example, in an anti-virus application, such a match indicates presence of a virus and hence the content may be quarantined or removed or cleaned or if it is streaming content, the stream dropped or the like based on the anti-virus policy.

PRISM uses bloom filters with modifications to support regular expression signatures and variable length signatures to overcome some of the key limitations of bloom fitters. When implementing signature search rules in hardware using bloom fitters for high performance, like from multi-100 Mbps through 10 Gbps and higher, a number of bytes of content have to be processed simultaneously. For example, if operating frequency of a hardware processor implementing bloom fitter is 125 MHz, and it processes one byte per clock cycle, one search engine can process up to 1 Gbps, and hence to process incoming stream of content at 10 Gbps, 10 simultaneous search engines are required, where each search engine's search is at one byte offset from the other. Thus if there are 10 search engines, then the first search engine may process the stream at byte number 1, while fifth search engine may process the stream at byte number 5 and the like, with each search engine skipping 10 bytes from one cycle to the next to achieve 10 Gbps. Multiple complexities arise in such an implementation. First each search engine requires a dedicated memory with the bloom fitter database to check membership of the content being processed in the set of signatures. Second, typically the signature rules are variable length, and hence each signature length needs to be processed separately which causes additional search engines and memories. For instance, anti-virus signatures may be from couple of bytes to over a hundred bytes, with majority of them being over 12 to 15 bytes. Since bloom filters, are essentially hash functions that have to operate fast, a fixed number of content bytes are processed by each hash engine. Hence, the signature database is separated in same length signature sets up to a certain length, for example from 2 bytes to 15 bytes, and then all signatures longer than 15 bytes are truncated at 15 bytes and placed in the same set. Then each signature set is processed by a set of hash functions to generate a bloom filter for each length of signature bytes. There are search engines implemented to process each signature length of bytes from the content. Thus if there are 14 sets of signature lengths, then 14 sets of search engines are implemented with their dedicated bloom filter database memory. As indicated above if the line rate to be processed is 10 Gbps, and each search engine only operates at 1 Gbps, then for each set 10 search engines are required and for all 14 sets a total of 140 search engines are required. Thus the requirement of the number of search engines can explode depending on the type of the signatures.

One preferred embodiment of PRISM signature search engines avoid the explosion in the number of search engines driven by the signature length sets by picking a number 'N' as the length of the signatures that get implemented using the signature search engines. Any signatures that are less than 'N' bytes, get realized using the PRISM FSA Search Engines (PSE) described above. This may save significant integrated circuit chip area and resources.

PRISM signature compiler flow illustrated in FIG. 20 reads signatures, 2002 and processes them until all the signatures presented to it by the rules parser are processed, 2003. It retrieves each signature, 2004, and checks the length of the signature, 2005, by comparing it to a length 'N' where 'N' is an integer. Typically for an anti-virus application 'N' may be 12, 13, 14 or 15 or like. If the number of bytes in the signature is less than 'N', then that signature is presented to PRISM FSA compiler flow, 2013, illustrated in FIG. 10, which treats the signature as a simple regular expression of character string and compiles it for evaluation by PRISM FSA search engines. However, if the length of the signature is equal to or more than 'N', then 'N' bytes of the signature are extracted, 2006, and k different hash functions are applied to those bytes, 2007, which then generate k hash indices H1 through Hk, 2008. These hash indices are then used to create a compressed signature database table which gets implemented in PRISM as a memory array. The compressed signature database table entries (which translates to associated memory locations of PRISM memory) corresponding to the indices are set to '1', 2009. The width of the hash indices depends on the number of the signatures in the rules. For one embodiment, if the number of signatures is 128,000, k may be 4, and the number of memory locations or compressed signature database table entries may be 512,000. For another embodiment, for 128,000 signatures, k may be 4 and the number of memory locations or compressed signature database table entries may be 1,024,000. There may be multiple signatures that may result in some of the Hash indices, H1 through Hk, to be the same. Also, different signatures may set the memory locations H1 through Hk to '1' which can cause a false positive when content search is being performed. During content search, k hash indices, H1 through Hk, are generated from 'N' bytes of content using the same hash functions used to generate the compressed signature database and then the values at the memory locations H1 through Hk are looked up. If all the locations have a value '1', then that means the content is likely to contain a signature from the signature set used to generate the compressed signature database. However, due to the reasons outlined above, multiple different signatures could have set the memory locations H1 through Hk for the content being examined to '1'. To ensure that there indeed is a match, an exact match of the content has to be performed with the signatures that could set one of the index like H1 to a '1', when all the memory locations H1 through Hk return a value '1'. To perform this exact match, each signature is also stored with all its bytes in a PRISM memory or an external memory coupled to PRISM. Each signature is associated with one index location where for example hash index H1 computed for each signature can always be used as a memory address or index to store the corresponding signature. However, since multiple signatures can map to the same hash index, those signatures are used in PRISM to form a deterministic Finite State Automaton (DFA) or an Aho-Corasick (AC) Finite State Automaton or the like to perform exact match. Thus, when a match is found through the compressed signature database lookup using hash indices, one of the hash index, for example H1, is used as a reference to point to the root of the automaton in an internal or external memory location where the DFA or Aho-Corasick (AC) FSA for all signatures that map to this hash index are stored. Then content bytes are used to traverse the DFA or AC FSA or the like to see if there is a match with one of the signatures that also generate H1 as a hash index value. If an exact match comparison finds a match, the content is declared to have matched a specific signature otherwise there is no match or the compressed signature database match is referred to as a false match. Such compressed organization of signatures may produce false positives but never generates false negatives i.e. if the content indeed contains a pattern that matches one of the signatures, it will always be flagged as a match during the compressed signature database lookup as well as during exact match evaluation and will never be missed, however, anytime a match is found from the compressed signature database does not always mean that an exact match will be found. Thus to facilitate the exact match operation the signature search compiler flow generates a DFA or an AC FSA or the like and sets up a pointer to that at a location in internal or external memory associated with index H1 or Hn used for performing exact match as illustrated in 2011. One preferred embodiment may use DFAs for storing exact match signatures. Another preferred embodiment may use AC FSA for storing exact match signatures. Other ways of storing and retrieving exact match signatures are all within the scope and spirit of the teachings of this patent as may be appreciated by one with ordinary skill in the art. A signature database entry for each signature with its compressed database and the exact match database (comprised of DFA or AC FSA or the like) is then generated as illustrated in 2012. Once all the signatures have been processed, a complete signature database comprising the compressed signature database as well as the exact match DFA or AC FSA or the like is generated, block 2014, which is then used by the rules distribution engine, 909, to program it in PRISM nodes that support signature searches.

The width of the hash indices generated depends on the size of the compressed signature database. In one preferred embodiment, there may be at least k times the total number of signatures, where k is the number of hash functions and is an integer, as the database size to provide adequate dispersion of hash results from various signatures.

FIG. 21 illustrates PRISM Signature search flow. When PRISM is used to examine content against signatures programmed in its signature search engines, 722, the content search follows a flow similar to that illustrated in FIG. 21, however, several steps illustrated may be optionally performed simultaneously for optimizing the performance of the hardware solution. The PRISM signature search engines receive or read, 2102, the content or packet or the like to be examined from the PRISM controller, 703 and examine each byte of the content or the packet against the compressed signature database to find a match in the content. Each byte of the content is presented to the PRISM FSAs, 2105, which have regular expression rules programmed as well as optionally portions of the signature database programmed as described above. If the PRISM FSAs with signatures programmed in them indicate a match, 2106, then a signature match is flagged, 2115, which is an exact match that indicates the presence of one of the signatures in the content. An action associated with the matching signature, which may be programmed as a policy associated with the signature rules, is taken, 2116. The action may be to drop the packet, stop examining the content, flag the location of the match to the PRISM controller and/or a master processor, drop the entire session, or the like, PRISM may take the action or may just alert a master processor about the matched signature and associated action, and the master processor may take the appropriate action. Once a packet is fully processed or a match is found, PRISM signature search engine may retrieve another packet or flow or content to process from the PRISM controller. When "N" bytes of content have been received by the PRISM signature search engines, 2107, k hash functions used to generate the compressed signature database are applied to the content and k hash indices generated, 2108 and 2109. A memory holding the compressed signature database in the signature search engines is then looked up with hash indices as addresses, 2110. If the values at locations H1 through Hk are all '1', 2111, then an initial match or coarse match is found and the content needs to be further examined to verify if an exact match with one of the signatures is found. A pointer to the content is assigned, 2112, to an exact match controller, 2309, described below with H1 or Hn as the index to DFA or AC FSA or the like that hold the signatures for that hash index. The exact match controller, 2309, performs an AC or DFA table walk (i.e. traverse the FSAs) by examining each of the 'N' content bytes and more if necessary until a match is found or the table reaches a leaf node indicating no match, 2113. If there is no match, 2114, first byte of the content is shifted out or discarded, 2118, and a new byte 'N+1' is retrieved and during the next iteration through the loop, 'N' bytes starting the second byte in the content are used to determine a match. If an exact match is found during the AC or DFA table walk, 2113 and 2114, then a signature match is flagged, 2115, and appropriate action taken as described above. Thus the PRISM signature search flow can examine the content for signature presence starting at each byte location of the content until a match is found or the content is exhausted.

FIG. 22 illustrates PRISM Signature search engine for variable length signatures. As discussed above, applications like anti-virus have a large number of signatures whose lengths vary from a few bytes to over 100 bytes. To perform a high speed, from 100 Mbps to 10 Gbps or higher, virus signature lookup in network traffic or other content, hardware implementation is used in PRISM signature search engine to examine content against compressed signature database described above. In one embodiment all signatures other than regular expression based signatures are evaluated by PRISM signature search engines. Since there can be variable signature lengths, compressed signature database for a set of signature lengths are created, where the signatures may be separated into signature of lengths "X" bytes through 'Y' bytes. Any signatures that are larger than 'Y' bytes are truncated to 'Y' bytes and included in the signature set with 'Y' bytes for generating the compressed signature database. However for the exact match step, the signatures with more than 'Y' bytes, retain their full length to ensure that the content hash that maps to the compressed signature database and is found to match indeed has the full signature match. Thus, to support variable length signatures, PRISM signature search engines may optionally comprise of byte length specific signature search engines, 2203(1) through 2203(M), which handle X-byte signatures through Y-byte signatures where Y-X is M, and X and Y are any integers. For one embodiment X may be 2 and Y may be 13. As illustrated each byte-length specific signature search engine may comprise a buffer like, 2204(1) through 2204(M) which collect appropriate number of bytes to be searched from the input stream presented to the signature search controller 2201, by the PRISM controller, 703, on the interface, 715. The signature search controller, 2201, controls the flow of the content to be examined through the byte-length specific signature search engines. It also is used to setup all byte length specific search engines with the compressed signature database values in the byte-length specific signature hash memory, like 2206(1) through 2206(M). The signature search controller also is coupled to exact match controller, 2209, which is used to perform an exact match on signatures where the compressed signature match is flagged to be valid. The signature search controller may be used to communicate the results of the signature search to the PRISM controller, 703, and/or a master controller as any exact matches are found. It may also be programmed with policies that may indicate what action should be taken when a signature match is found. For example, if a signature match is found the policies may indicate whether the packet or the content or the flow or the like be stopped from further examination or dropped or the like or should the examination continue and report all matches in the content or the like. The Figure illustrates that the signature search engine presents one stream of content in buffers, 2202, from which specific number of bytes are coupled to the byte length specific signature search engines. In such architecture the performance of the signature search is limited to the rate at which a single byte is processed. Hence if the signature search engines operate at 125 MHz, then the line rate of search supported is 1 Gbps (125 MHz times 8-bits/clock cycle). To achieve a 10 Gbps line speed, either the operating frequency of the integrated circuit or hardware has to be increased by a factor of 10 or multiple bytes have to be examined in parallel or multiple bytes have to be examined and the operating frequency has to be raised or the like. The signature search controller is capable of supporting all of the above needs to accommodate the increase in search performance. For multiple simultaneous bytes being searched, all blocks other than the signature search controller may be replicated and coupled to the signature search engine. It is also possible to replicate the signature search engine and have the PRISM controller, 703, provide the proper scheduling of content or packets to each of the replicated signature search engines as may be appreciated by one with ordinary skill in the art.

Byte length specific signature search engine 2203(1) retrieves X-bytes of content being examined and then generates k hash indices using k hash engines that use X-bytes, 2205(1,1) through 2205(1,k). The hash engines each perform a different hash function on the retrieved X-bytes. The hash functions being used are the same as those used on the signature rules to create the compressed signature database. The output index of each hash engine, is then used to lookup the compressed signature database setup in the Signature Hash Memory for X-byte length signatures, 2206(1). Since there are k hash functions, k separate memory ports are used to simultaneously access the memory values at each of the hash index, H1 through Hk, for a high speed implementation. For a lower performance solution, k memory look-ups through a single memory port may optionally be used. The signature hash memory, 2206(1) through 2206(M), may be multi-ported with k ports or signature hash memory block may be replicated such that each of the hash index location is read simultaneously. The outputs of the signature hash memory corresponding to the hash indices are coupled to match logic, 2207(1). If all outputs of match logic are set, a coarse level match is generated by the match logic, which indicates that there is a good probability that a signature match has occurred. However, since hashing is a many to one function, it is possible that the coarse match may not mean an actual match exists with all bytes of a signature, and to ascertain the match an exact match needs to be performed. To enable an exact match operation the search engine creates a coarse match descriptor which comprises of information like the flow ID or content ID or packet ID or the like, the byte offset where the coarse match was flagged, one hash index that was generated for the coarse match, and the like. It puts the coarse match descriptor in an exact match queue, 2208(1), from which the exact match controller, 2209, retrieves it and performs an exact match. The exact match controller, 2209, retrieves the coarse match descriptors from the exact match queues like 2208(1) through 2208 (M) in an order like round-robin or smallest length signature search engine to higher length search engine or the like. As described above, full signatures are processed by the signature search compiler flow to create an exact match data structure or data base in memory using either a DFA or Aho-Corasick FSA or the like algorithm which can then be traversed or walked using a sequence of characters from the input content. All signatures that map to a specific hash index are all used to generate an exact match data structure for that hash index. Thus every hash index which has any signatures that map to it has an exact match data structure associated with it which may either provide the root node of the FSA or the like or can provide a pointer to the root node which may then be used to traverse the FSA based on the sequence of the input content where a coarse match is found. The exact match controller, 2209, implements an exact match logic which enables the traversal of exact match data structure stored in memory coupled to the exact match controller through the memory interface, 2210. The exact match controller may start retrieving the packet bytes from the signature search controller, 2209, starting at an address from the packet information retrieved from the coarse match descriptor. Then each byte of the content is used to walk through the exact match data structure by retrieving the root node of the FSA of the signatures stored at the hash index used as an offset in to the memory table storing the exact match signatures. The exact match data structure walk progresses one or more bytes per clock cycle, retrieving the next state of the FSA based on the currently received input byte or bytes. Once a leaf node is reached it indicates the completion of the search and if the leaf node is not an empty node, it indicates that the signature is completely matched and an exact match is flagged. However, if the leaf node is an empty node, then it means that the content stream at the flagged location does not meet any of the exact match signatures. If an exact match is detected by the exact match controller, it may communicate this to the signature search controller, 2201, and the PRISM controller, 703, which may then take an appropriate action as described by the policy associated with the matched signature. The exact match controller walks through the exact match queues of each of the byte-length specific signature search engines to ensure that if more than one coarse match is found from a byte location of the content, all such matches are processed. However, if one of the coarse match results in an exact match, the other match requests for that content may or may not be performed as per the policy programmed in the signature search controller for the application like anti-virus.

One issue with architecture like the one illustrated in FIG. 22 is that there is a need to have multiple byte-length specific signature search engines to process all the variable size signatures which can result in an inefficient utilization of the hardware resources. Further, when the line rate of the signature search engine needs to be increased by replication, all byte-length specific engines also have to be replicated as many times as the multiple in the time rate performance improvement. Additionally, when developing a hardware solution that can be used for a variety of applications whose signatures may change over a period of time, it is difficult to estimate how large the byte-length specific signature hash memory, 2206(1) through 2206(M), should be to accommodate all applications that can use the signature search engines.

FIG. 23 illustrates PRISM Signature Search Engine using PRISM FSA for variable length signatures. As discussed above, applications like anti-virus have variable length signatures and for examining content against those signatures multiple byte-length specific signature search engines are needed which can result in inefficient hardware resource utilization and implementation. Since PRISM enables support of a large number of FSAs in a single chip, it is possible to assign signatures less than 'N' bytes, where N is an integer, to the FSAs along with signatures that comprise regular expressions for evaluation in parallel to the signature search engines. All signatures that are equal to or greater than 'N' bytes in length are treated in a single set of signatures, where all of the signatures are truncated to 'N' bytes for creating a compressed signature database for coarse matching and full signatures are retained as described above for exact matching. By partitioning the signatures in this manner and leveraging the large number of FSA resources that are enabled by PRISM for smaller length signatures, only a single signature search engine for 'N' byte length is required to perform the coarse match generation as illustrated in FIG. 23. In such an architecture 'N' bytes from the content are retrieved and used to generate k hash indices as described above and used to find the compressed signatures. If the compressed signatures retrieved from the N-byte signature hash memory, 2306, are all set as detected by the match logic, 2307, a exact match descriptor like the one described above for illustration in FIG. 22 is entered in the exact match queue, 2308. The exact match controller, 2309, provides the functionality similar to the exact match controller, 2209, described above except that the exact match controller, 2309, needs to operate on a single exact match queue unlike the exact match controller for illustration in FIG. 22. When a higher line rate search performance is required, the 'N' byte length signature search engine can be replicated and the exact match controller modified to operate on multiple exact match queues as necessary to achieve the desired speed up as may be appreciated by one with ordinary skill in the art. Thus a significant amount of hardware resources can be saved by this invention compared to the illustration in FIG. 22.

The PRISM memory of this invention may be manufactured into hardware products in the chosen embodiment of various possible embodiments using a manufacturing process, without limitation, broadly outlined below. The PRISM memory in its chosen embodiment may be designed and verified at various levels of chip design abstractions like RTL level, circuit/schematic/gate level, layout level etc. for functionality, timing and other design and manufacturability constraints for specific target manufacturing process technology. The design would be verified at various design abstraction levels before manufacturing and may be verified in a manufactured form before being shipped. The PRISM memory design with other supporting circuitry of the chosen embodiment at the appropriate physical/layout level may be used to create mask sets to be used for manufacturing the chip in the target process technology. The mask sets are then used to build the PRISM memory based chip through the steps used for the selected process technology. The PRISM memory based chip then may go through testing/packaging process as appropriate to assure the quality of the manufactured product.

Thus the inventions of this patent cover various aspects like:

A memory architecture comprising programmable intelligent search memory (PRISM) for content search wherein the PRISM memory provides search capability for regular expression based search and a regular expressions are compiled into a format recognized by PRISM and that follows the PRISM FSA algorithm.

The regular expression compiler comprises of one or more of the following steps in no specific order:
1. Read mechanism to read regular expressions and a read process to do the same
2. Parse mechanism to parse RE and a parse process to do the same
3. Syntax tree generation mechanism to generate syntax tree and a syntax tree generation process to do the same
4. RE error handling mechanism to handle RE errors and a process to handle RE errors
5. RE symbol extraction mechanism to extract RE symbols and an RE symbol extraction process to do the same
6. RE marking mechanism to mark RE symbols with unique integers and a RE marking process to do the same
7. A FSA linearization mechanism to create a linear FSA and create its determinants to extract presence or absence of empty string in the language defined by the RE and a process to do FSA linearization
8. A mechanism to find and extract first states of the linear FSA and a process for first state identification and extraction
9. A mechanism to find and extract follow states of the linearized FSA and a process for follow state identification and extraction
10. A mechanism to find and extract the state transition list per state and a process for state transition list identification and extraction
11. A mechanism to find and extract the accept or terminal states and a process for accept or terminal states identification and extraction
12. Create PRISM programmable FSA data programmable database structure for the RE comprises one or more of SDV, state symbols, LB/RB, Accept state, Initial States or initial vector, tag states, FSA ID, GSDV, GCV RCV, ESV, LUV, UV, FV, DC, UC, LV, CSL CSH, interval Symbol mode, ISCV or a combination of the foregoing
13. A mechanism to generate the Compiled RE expressions rules data base comprising the PRISM programmable FSA data structures and a method for the compiled RE rules data base generation,
14. A mechanism to provide the compiled rules data base to a rules distribution engine or other agent to program these rules in the target PRISM device and a method to do the same
15. A mechanism to generate a programmable FSA rule ID for programming the linear FSA in one specific memory location of PRISM memory locations that are randomly accessible to access, store or program the programmable FSA rule memory circuits
16. A mechanism to generate specific actions that need to be taken when a particular regular expression programmed in the PRISM FSA rule blocks is matched or
17. a combination of the foregoing.

The PRISM memory comprises of FSA extension architecture and mechanisms to enable programming of regular expressions that are larger than the basic PSE FSA search states. The FSA extension architecture may optionally comprise of Row-wise FSA extension mechanisms or column-wise FSA extension mechanisms or FSA rule groups extensions or a combination thereof to support large regular expressions and optionally to support groups of regular expressions that can be used to enable execution of other groups of regular expressions when a certain event in the first rule group is activated.

The PRISM memory Rule group FSA extension architecture may comprise of External state vectors, and may optionally comprising of rule group control vectors. The ESVs and RCVs may optionally be addressed as memory locations that may be programmed by the PRISM controller, or an external master processor or the cluster evaluation processor or a global evaluation processor or a combination to enable transitions into and out of rule groups in PRISM.

The Column-wise FSA architecture may further comprise of Forwarding vector-up or down, local forwarding vectors-up or down, up control vector, down control vector, or a combination there of.

The row-wise FSA architecture may further comprise of global state dependent vectors, global control vectors, global state transition controls, global control network or a combination.

The PRISM control vectors like GSDV, GCV, FV, LV, LUV, UV, DC, UC, RCV, or the like may be implemented as memory locations accessed for from programming from the PRISM address decode and control logic or PRISM cluster address decode and FSA controller or PRISM controller or a combination there of.

PRISM memory architecture that enables replicating states of an FSA that may enable proper FSA extensions of REs using FSA extension architecture and mechanisms described above.

The PRISM memory comprises of architecture and mechanisms to enable programming of regular expressions that comprise interval symbols like 'a[x,y]' and the like. The PRISM search engine with interval symbol comprises of at least one interval counter block that is used to count a number of times an event or a symbol or the like has been received. The PRISM search engine with interval symbol further comprises at least one count low evaluation memory which is used to program the interval symbol low limit and is used to compare the interval counter value with that programmed in the count low evaluation memory. The PRISM search engine with interval symbol further comprises at least one count high evaluation memory which is used to program the interval symbol high limit and is used to compare the interval counter value with that programmed in the count high evaluation memory. The PRISM search engine with interval symbol further comprises at least one interval symbol control vector memory to hold the interval symbol state dependent transition control vector bits that enable the transition from an interval symbol state to other ISCV enabled states of the PRISM FSA.

The PRISM memory with interval symbol memory compiler may further comprise of programming interval symbol state parameters like the state symbol, the state low count limit, the state high count limit, the interval symbol type or the mode or a combination of the foregoing to enable programming of regular expressions with interval symbols into one or more PRISM search engines. If the regular expression being compiled by the compiler needs more interval symbol states than those provided by a PRISM search engine, the compiler may also use FSA row-wise or column-wise or a combination FSA extension architecture mechanisms as described above.

The PRISM memory further comprises an array of search memory circuits that provide the regular expression search functions for searching content from documents, messages or packets or other data received from the network or the local host or a master processor or a network processor or TCP Offload Engine or Processor or Storage Network processor or a security processor or other processor or a combination thereof.

The PRISM memory further comprises of a plurality of clusters of the search memory circuits that provide regular expression search functions for a plurality of regular expressions. The search memory circuits comprise of memory elements to store symbols of finite state automata representing the regular expressions. The search memory circuits further comprise memory elements to store mask vectors (MV) that may be applied to the stored symbols. The mask vectors are coupled to the symbol memory elements and the content being searched through symbol evaluation circuits that detect whether the received content comprises of the symbols being searched. The search memory circuits further comprise of memory elements to store elements of state dependent vectors (SDV) which are used to decide the state traversal by the search memory for the finite state automata. The search memory circuits further comprise of match detect circuits that operate by coupling with the memory elements for symbols, MVs, SDVs, and the symbol evaluation circuits for multiple states of the FSAs to decide on the traversal of the states in the FSA based on the content being searched and the programmed symbols, SDVs, and MVs. The search memory circuits may further comprise tag and match detect circuits that operate to provide tagged FSA and regular expression search, wherein the tagged FSA is used to detect sub-string or partial regular expression match beside a full regular expression match.

The memory elements of the PRISM memory comprise of static memory cells. The memory elements are each independently addressable in a random order. The PRISM memory further comprises of circuits to couple the content search memory with other logic to provide coupling with processors that can interface to the PRISM memory integrated circuits. The PRISM memory further comprises of a controller for interfacing with the processors to receive the content to be searched. The PRISM memory may further comprise of address decode logic circuits which decode the received address to select the specific static memory cells location to be read or written. The memory elements of the search memory may each be uniquely addressed to read or write appropriate values in the memory elements. The address decoding logic and the controller generate control signals necessary to address the appropriate memory locations of the static memory cells based search memory. The control signals are coupled to the PRISM arrays as a series of word lines and bit lines that can randomly be used to access desired memory locations.

The memory elements of PRISM support detection of character pattern strings. The PRISM memory comprises of symbol detection circuits and may optionally comprise of mask vectors per symbol bits, that may be used to evaluate received character string using simple XOR based compare or other logic function and create a match indication. The PRISM match signal processing circuits may logically combine multiple match signals from each symbol detection block to generate a composite match signal which would be activated only if all the symbols have a match. The composite match signal creates a match functionality like a traditional CAM chip and thus enable PRISM chip to be partially or fully configured to behave like a CAM provide a pattern matching functionality beside regular expression search.

The PRISM memory further comprises of signature search engines for searching content against a large set of signatures like those for anti-virus. The PRISM signature search engines are coupled to the PRISM regular expression search engines to support applications that have fixed character signatures as well as regular expression signatures. The said PRISM search engines further comprise of fixed length signature recognition hardware. The fixed length signature search engines may comprise of a content buffer for content to be examined. It may further comprise of 'k' hash generators to generate 'k' hash indices to be used as memory addresses to retrieve the compressed signatures from a hash signature memory. The PRISM search engine may further comprise of a hash signature memory to store and retrieve a compressed signature database generated by applying 'k' different hash functions to the said signatures. The PRISM signature search engines further comprise of exact match queues to store exact match descriptors used by an exact match controller to perform an exact match on a data structure associated with the hash index of the coarse match. The said exact match descriptors may comprise of the packet identification, or flow ID or content ID or the like. The exact match descriptor may further comprise of the byte offset where the coarse match is detected. The said exact match descriptor may further comprise of the number of bytes used to generate the coarse match.

A PRISM signature compiler used for processing the signatures generates a compressed signature database and optionally a full signature database used for coarse match and exact match respectively. The full signature database comprises of a data structures for all signatures and when multiple signatures whose hash value maps to the same hash index, the signature database for that hash index uses all signatures that map to that location to create the said data structure. The said data structure may be realized as a FSA like a DFA or AC FSA or the like. The PRISM memory further comprises of an exact match controller to perform exact match of content with signatures when a coarse match is flagged. The PRISM signature search engines may further comprise of policies to take actions when an exact match is detected. The policies may be programmed by a PRISM controller or a master controller coupled to PRISM.

While the foregoing has been with reference to particular embodiments of the invention, it will be appreciated by those with ordinary skill in the art that changes in these embodiments may be made without departing from the principles and spirit of the invention.

The invention claimed is:

1. A hardware processor comprising an integrated circuit chip processor, said integrated circuit chip processor comprising programmable intelligent search memory for content search, wherein said programmable intelligent search memory simultaneously performs regular expression based search and signature pattern based search, said programmable intelligent search memory for content search using a plurality of regular expressions, said regular expressions comprising a plurality of symbols or characters, said plurality of regular expressions further comprising a plurality of interval symbols, said regular expressions converted into a plurality of finite state automata(FSA) representing the functionality of said regular expressions for programming in said programmable intelligent search memory, said finite state automata comprising a plurality of states, said states derived from said symbols or characters of said regular expressions, said content comprising a plurality of input symbols provided as input to said programmable intelligent search memory, said programmable intelligent search memory comprising a plurality of FSA rule blocks to program said plurality of finite state automata and to search said content using said plurality of finite state automata to detect a match of said regular expressions in said content, said FSA rule block of the plurality of FSA rule blocks to program a finite state automata of said plurality of finite state automata and to search said content using said finite state automata to detect a match of a regular expression of said plurality of regular expressions in said content, said regular expression corresponding to said finite state automata, said FSA rule block further comprising:
- a) an interval symbol evaluation circuit to store and evaluate said plurality of interval symbols;
- b) a plurality of state blocks for evaluating state transitions and to generate a plurality of partial state transition signals;
- c) a state control block to store a current state vector, said current state vector to represent the current state of the evaluation of said finite state automata; and
- d) a match detect block to detect match of said regular expression with said content.

2. A finite state automata of the claim 1 comprising 'n' states corresponding to 'n' symbols of said regular expression, said 'n' symbols comprising 'm' bits wherein 'n' and 'm' are each integer values greater than one.

3. A state block of the plurality of state blocks of claim 2 coupled to a current state of said current state vector, said state block further comprising:
- a) a symbol memory circuit to store said 'm' bit symbol;
- b) a symbol evaluation circuit coupled to said symbol memory circuit to evaluate a match of said 'm' bit symbol stored in said symbol memory circuit with said plurality of input symbols of said content;
- c) a state dependent vector memory circuit to store a 'n' bit state transition control corresponding to said 'n' states; and
- d) a partial state transition control circuit coupled to said symbol evaluation circuit, said current state and said state dependent vector memory circuit to perform partial state transition evaluation and generate a partial state transition signal for transition of said current state from a first state of said 'n' states to a second state of said 'n' states.

4. A state control block of claim 3 further comprising:
- a) a state transition control circuit coupled to said plurality of partial state transition signals to perform state transition evaluation for transition of said current state from a first state of said 'n' states to a next state of a second state of said 'n' states;
- b) a 'n' bit initialization vector memory circuit to store an initial or start state value for said 'n' states of said finite state automata; and
- c) a 'n' bit current state vector memory circuit coupled to said 'n' bit initialization vector memory and said state transition control circuit to load and store a current state value from a set of said 'n' states of said finite state automata.

5. At least one match detect block of claim 1 further comprising:
- a) a 'n' bit accept state vector memory circuit to store which of said 'n' states are accept states, said accept states used to detect when said regular expression has matched with said content; and
- b) a match detect circuit to detect a match in said content with said regular expression.

6. A match detect block of claim 5 further comprising:
- a) a 'n' bit tag state vector memory circuit to store which of said 'n' states are tag states, said tag states used to detect when said regular expression has partially matched with said content; and
- b) a tag match detect circuit to detect a tag match in said content with said regular expression to detect: a partial regular expression match; or a sub-string match, or a combination thereof.

* * * * *